(12) United States Patent
Sakauchi et al.

(10) Patent No.: US 7,848,340 B2
(45) Date of Patent: Dec. 7, 2010

(54) SYSTEM AND METHOD FOR TRANSMISSION OF DATA IN PACKET RING NETWORK SYSTEM

(75) Inventors: Masahiro Sakauchi, Tokyo (JP); Daisaku Ogasahara, Tokyo (JP); Kazuo Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 349 days.

(21) Appl. No.: 11/816,149

(22) PCT Filed: Jan. 26, 2006

(86) PCT No.: PCT/JP2006/301225
§ 371 (c)(1),
(2), (4) Date: Aug. 13, 2007

(87) PCT Pub. No.: WO2006/092915
PCT Pub. Date: Sep. 8, 2006

(65) Prior Publication Data
US 2009/0022168 A1 Jan. 22, 2009

(30) Foreign Application Priority Data
Feb. 28, 2005 (JP) ............................... 2005-054301

(51) Int. Cl.
*H04L 12/56* (2006.01)
(52) U.S. Cl. .................... 370/406; 370/222; 370/390
(58) Field of Classification Search ........................ None
See application file for complete search history.

(56) References Cited

U.S. PATENT DOCUMENTS
2002/0024931 A1 2/2002 Chikazawa et al.
(Continued)

FOREIGN PATENT DOCUMENTS
JP 2002-077208 A 3/2002
(Continued)

OTHER PUBLICATIONS
IEEE Std 802.17-2004 "Part17; RPR Access Method and Physical. Layer Specifications", "9. Frame format" pp. 211-225.
(Continued)

*Primary Examiner*—Daniel J Ryman
*Assistant Examiner*—Tito Pham
(74) *Attorney, Agent, or Firm*—Sughrue Mion, PLLC

(57) ABSTRACT

A packet ring network system is disclosed which enables plurality of packet rings to perform packet transfer via a plurality of links while preventing multiple reception of packets and broadcast stream in a normal state where no failure has occurred. The packet ring network system includes a first packet ring and a second packet ring, each packet ring having a plurality of inter-ring connecting nodes, and each of the plurality of inter-ring connecting nodes in the first packet ring is connected with each of the plurality of inter-ring connecting nodes in the second packet ring in a one to one relationship so that the packet rings are connected with each other. When one of the inter-ring connecting nodes receives a packet to be broadcasted via a link connecting the first and second packet rings the node performs bidirectional flooding of the broadcast packet such that the packet arrives at a predetermined cleave point, and the node uses the source address of the other node so as to falsify the source.

13 Claims, 40 Drawing Sheets

U.S. PATENT DOCUMENTS

2003/0012129 A1* 1/2003 Lee et al. .................... 370/216
2003/0147345 A1 8/2003 Takagi et al.
2004/0170184 A1* 9/2004 Hashimoto ................. 370/401
2005/0226265 A1* 10/2005 Takatori .................... 370/452

FOREIGN PATENT DOCUMENTS

| | | |
|---|---|---|
| JP | 2003-258822 A | 9/2003 |
| JP | 2004-242194 A | 8/2004 |
| WO | WO 2004/095779 A1 | 11/2004 |

OTHER PUBLICATIONS

IEEE802.17(Draft3.3), 2004, p. 117, p. 60, p. 190.

* cited by examiner

SYSTEM AND METHOD FOR TRANSMISSION OF DATA IN PACKET RING NETWORK SYSTEM

TECHNICAL FIELD

The present invention relates to a packet ring network system, a network system, a packet transfer method, a signal transmitting/receiving method and an inter-ring connecting node. In particular, the present invention relates to a redundant packet ring network system and a network system, and a packet transfer method, a signal transmitting/receiving method and an inter-ring connecting node, which are applied to a redundant packet ring network system and a network system.

BACKGROUND ART

Conventional art relating to a redundant connecting method between a plurality of packet rings will be described.

Conventionally, in a network adopting the Ethernet (registered trademark), there is a case where an Ethernet switch is connected with redundancy so as not to be affected by failures in links or nodes. In the case of involving such redundancy, the Spanning Tree Protocol is used for constructing a topology not causing a loop. The Spanning Tree Protocol is a protocol which always maintains a loop-free logical topology even if a topology change is caused in association with operation or a topology change is caused by any failure. When a loop is caused in a network adopting the Ethernet (registered trademark), problems such as multiple arrival of packets and pressure on band due to an increase in packets are caused. Further, an upper layer application may be inversely affected by unconvergence of FDB (forwarding database), or system down may be caused. In order to prevent such problems, it is necessary to prevent a loop from being caused in a network adopting the Ethernet (registered trademark). By applying the Spanning Tree Protocol, a loop-free logical topology can be constructed and maintained, which enables to prevent problems caused by a loop as described above.

In the Spanning Tree Protocol, when a failure occurs in links or nodes, reconstruction of logical topology starts in all switches, and data transmission becomes impossible until the reconstruction is completed. It may take several minutes for topology convergence, depending on the scale of the network.

Ring-type redundancy protocols include EAPS (Ethernet Automatic Protection Switching), MRP (Metro Ring Protocol), and MMRP (Multi Master Ring Protocol). The ring-type redundancy protocol such as EAPS, MRP or MMRP is a simple and inexpensive system in which Ethernet switches are arranged in a ring, and a Hello packet is flown to the ring so as to monitor link shutdown to thereby control a blocking port so as not to cause a loop.

In each of the ring-type redundancy protocols, monitoring of a link failure is performed with a Hello packet, so the failure recovery time is determined depending on the transmission interval time of the Hello packet. This generally requires a failure recovery time of not longer than several seconds. Further, in the normal operating state, one port is always in a blocking state, so the shortest path transfer cannot be provided, causing low usability of the ring band.

Further, in the network redundancy in the layer 3, a routing protocol in the router is used generally. RIP (Routing Information Protocol) and OSPF (Open Shortest Path First), generally used, recognize a topology change in association with operation or a topology change caused by a failure, and recalculate a routing table to thereby maintain communications in a new topology.

Processing from detection of a change in the network topology by these routine protocols up to reconstruction is generally performed as processing by software. Therefore, the time required from detection of topology change up to the completion of reconstruction may take several minutes depending on the scale of the network.

Further, the packet ring network includes RPR (Resilient Packet Ring). RPR is standardized by IEEE802.17. RPR is a MAC layer protocol providing an access to a ring-shape transmission medium, providing a high-speed failure recovery in the carrier class, effective utilization of the network band, and shortest path transfer.

FIG. 37 is an illustration showing an exemplary network configuration of RPR. As shown in FIG. 37, a packet ring included in the RPR network includes two ringlets 701 and 702 which transfer a packet in opposite directions to each other. Further, in the packet ring, a plurality of nodes are connected to be in a ring shape. FIG. 37 shows a case where four nodes 703a, 703b, 703c and 703d are connected in the packet ring. To each node on the packet ring, an RPR MAC address is given respectively. When the network is constructed, a control packet is exchanged between nodes, and each node collects information about the number of hops between nodes and acquires topology information of the network.

Further, to each node on the packet ring, a user terminal may be connected. The example shown in FIG. 37 illustrates a case where a user terminal 704a is connected to the node 703a, and a user terminal 704b is connected to the node 703b.

FIG. 38 illustrates an RPR packet format. When a user terminal transmits a packet to a node, it transmits a user data packet 711. The user data packet 711 includes an MAC address (MAC DA) 712 of the destination user terminal of the user data packet, an MAC address (MAC SA) 713 of the source user terminal of the user data packet, transmission data 714, and an FCS (Frame Check Sequence) 715. When a node receives a user data packet from a user terminal, the node encapsulates the user data packet to thereby generate an RPR packet 721, and transmits/receives the RPR packet 721 between nodes. The user data packet 711 is encapsulated, and in the RPR packet 721, it is stored as data 726. Further, the RPR packet 721 includes the MAC address of the destination node (RPR MAC DA) 724, the MAC address of the source node (RPR MAC SA) 725, a Base Control field 723, a TTL (Time To Live) field 722, and an FCS 727. The Base Control field 723 includes information designating the ringlet used for transfer, and identification information for identifying the packet type of the control packet and the like. The TTL field 722 is used to prevent a packet from endlessly rotating the ring. The detail of the RPR packet format is described in Non-Patent Document 1.

Operations of transmitting, receiving and transferring the RPR packet at each node on the ring will be described below. First, the case of a unicast packet will be described. Each node receives an RPR packet transferred on the ring, and if the RPR MAC DA of the RPR packet coincides with the RPR MAC address of itself, the node eliminates the RPR packet from the ring. If the RPR MAC DA of the received RPR packet differs from the RPR MAC address of itself, the node decrements the TTL and then retransmits the RPR packet to the same ringlet from which the node received the packet. When the source node receives the unicast packet transmitted by the source node itself, the source node eliminates the unicast packet from the ring. Further, when the TTL becomes 0, each node eliminates the RPR packet from the ring.

In the case of a broadcast packet, each node first decrements the TTL of the received broadcast packet, and then transfers it to the next node. When the source node of the broadcast packet receives the broadcast packet transmitted by itself, the source node eliminates the broadcast packet from the ring. Further, when the TTL becomes 0, each node eliminates the RPR packet from the ring.

Note that control packets to be used for band control, topology detection, failure recovery and the like have no relationship with the present invention, so their detailed description is omitted.

Next, in the RPR network shown in FIG. 37, an operation of transmitting data from the user terminal 704a, connected to the node 703a, to the user terminal 704b, connected to the node 703b, will be described. Each node studies the MAC SA 713 (see FIG. 38) of the source user terminal encapsulated in the received RPR packet and the source RPR MAC SA 725 (see FIG. 38) while corresponding them with each other, and holds an RPR MAC address database, that is, an FDB, in which the MAC address of the user terminal is used as the search key. When the user terminal 704a transmits data (user data packet) to the ring, the node 703a receives the user data packet. The node 703a searches the FDB by using the MAC DA 712 (see FIG. 38) in the received user data packet as the search key, and sets the result as RPR MAC DA 724 (MAC address of the destination node, see FIG. 38). Further, the node 703a sets the MAC address of itself as RPR MAC SA 725 (MAC address of the source node, see FIG. 38). Then, the node 703a encapsulates the user data packet received from the user terminal 704a. Further, the node 703a searches the topology database, selects a ringlet providing the shortest path from the source node to the destination node and sets the TTL value, and transmits the RPR packet to the ring.

Further, as a result of searching the FDB, if correspondence between the MAC address of the destination user terminal and the RPR MAC address corresponding to the MAC address has not been studied, the node 703a performs flooding. To the RPR MAC DA of the RPR packet transmitted by flooding, a broadcast address is set, and the RPR packet is received by all nodes on the ring. Further, as a result of the flooding, a user data packet transmitted by the user terminal 704a is received by the destination user terminal 704b. Then, the user terminal 704b sends a reply to the user terminal 704a. When replying, the user terminal 704b is the source of the user data packet, and the user terminal 704a is the destination. Further, the node 703b is the source of the RPR packet. When a reply from the user terminal 704b is sent, the correspondence between the MAC address of the user terminal 704b and the RPR MAC address of the user terminal 703b is studied in the node 703a. Accordingly, when the user terminal 704a transmits the user data packet to the user terminal 704b again, the node 703a searches for the RPR MAC address of the node 703b by using the MAC DA 712 included in the user data packet as the key, whereby it can perform unicast transfer by using the search result as the RPR MAC DA 724.

Next, referring to FIG. 39, the protective operation of the RPR will be described. In the IEEE802.17, a steering mode and a lap mode are defined as the protective operations when a failure occurs. The steering mode is defined as a mandatory function, and the lap mode is defined as an optional function. The steering mode and the lap mode are also introduced in Patent Document 1 for example.

FIG. 39(a) shows the network operation in a normal state. FIG. 39(a) shows a state where a packet is transferred from the node 803a to the node 803b on the ringlet 801.

FIG. 39(b) shows the operation in the steering mode. As shown in FIG. 39(b), when a failure point 804 is caused, all nodes in the ring acquire the positional information of the failure point 804. That is, the nodes 803c and 803d connected to the link causing the failure point 804 notify all other nodes of the positional information of the failure point 804. As a result, each node recognizes the position of the failure point 804. Then, in transmitting a unicast packet, the source node selects a ringlet not including the failure point 804 between it and the destination node of the RPR packet, and transmits the unicast packet. For example, when the node 803a transmits a unicast packet to the node 803b, it changes the ringlet for transmitting the unicast packet from the ringlet 801 to the ringlet 802 since it recognizes the position of the failure point 804, so it transfers the packet to the node 803b. Further, in the case of transmitting a broadcast packet, the node 803a selects both ringlets 801 and 802, and sends the broadcast packet to each of the ringlets 801 and 802. As a result, the broadcast packet is transmitted to each node in the ring.

FIG. 39(c) shows the operation in the lap mode. In the lap mode, the source node selects the same ringlet as that in the normal state and transmits an RPR packet. For example, when the node 803a transmits an RPR packet to the node 803b, the node 803a selects the ringlet 801 same as the normal state (see FIG. 39(a)) and transmits the RPR packet. When the node 803c, which detects the failure since it is connected with the link causing the failure point 804, receives the RPR packet, it selects another ringlet 802 different from the ringlet 801 from which the packet was transmitted, and transfers the RPR packet by using the ringlet 802. That is, the node 803c transfers the RPR packet to the side where the failure point 804 does not exist. The packet is transferred on the ringlet 802 up to the node 803d which detects the failure since it is connected to the link causing the failure point 804. The node 803d also selects a ringlet other than that from which the packet is transmitted, and transfers the RPR packet using the ringlet. As a result, the destination node 803b receives the RPR packet. Further, methods of flooding a broadcast packet to a ring include a method of sending arbitrary one ringlet by the source node, and a method of sending a broadcast packet to both ringlets by the source node and transferring up to the arrival point previously set on the ring in order to prevent multiple transfer (bidirectional flooding). Note that the arrival point of a packet previously set on the ring for preventing multiple transfer is called a cleave point. In the case of bidirectional flooding, TTP calculation method is required to be changed in order to transfer a packet to all nodes and prevent duplicate arrival, depending on whether the number of nodes in the ring being odd number or even number. However, the TTL calculation method has a little relationship with the present invention, so it is not described.

Although description has been given with the example that a failure occurs in a link, the protective operation in the case that a failure occurs in a node is same as that of the case where a failure occurs in a link.

FIG. 40 is an illustration showing an example of a network system in which two rings are connected redundantly. In the network system shown in FIG. 40, two rings 901 and 902 are connected with two links 903 and 904. The link 903 connects a node 901a in the ring 901 and a node 902a in the ring 902. Similarly, the link 904 connects a node 901b in the ring 901 and a node 902b in the ring 902. Further, the ring 901 has ringlets 910a and 910b. Similarly, the ring 902 has ringlets 920a and 920b. In the network system shown in FIG. 40, a pair of rings 901 and 902 are connected with a plurality of links 903 and 904. Further, the ring 901 includes a node 901x other than the inter-ring connecting nodes 901a and 901b connected with the ring 902. Similarly, the ring 902 includes a node (not shown) other than the inter-ring connecting node 902a and 902b connected with the ring 901. It is assumed that a different RPR MAC address is assigned to each node.

A broadcast packet transmitted from a node on the ring 901 is transferred to the ring 902 via the inter-ring connecting node 901a, the link 903, and the inter-ring connecting node 902a. Similarly, the packet is transferred to the ring 902 via the inter-ring connecting node 901b, the link 904, and the inter-ring connecting node 902b. The nodes 902a and 902b in the ring 902 of the receiving side perform flooding, respectively. This causes a problem that one node receives the packet in a duplicate manner. If a multiple reception of packets in one node is caused, the upper layer application is adversely affected.

Further, there is another problem that a broadcast packet reciprocates between the ring 901 and the ring 902, causing a phenomenon that the packet will not be eliminated from the ring forever. This phenomenon is called a broadcast stream. Hereinafter, generating process of a broadcast stream will be described with reference to FIG. 40.

A broadcast packet transmitted from the node 901x goes around the ring 901, and is received by the inter-ring connecting node 901a. The inter-ring connecting node 901a receives the packet from the ring, and transfers it to the inter-ring connection node 902a via the link 903. Further, the inter-ring connecting node 901a also transfers the packet to the next node 901b on the ring 901. In the inter-ring transfer from the ring 901 to the ring 902, the inter-ring connection node 901a ends the RPR MAC address of the packet. Then, the inter-ring connecting node 902a transfers the broadcast packet in which the RPR MAC address of the node 902a itself is used as the RPR MAC SA, and the packet is received by the inter-ring connecting node 902b.

The inter-ring connecting node 902b transfers the packet to the inter-ring connecting node 901b via the link 904. Further, the inter-ring connecting node 902b transfers the packet to the next node 902a on the ring 902. The node 902a eliminates the broadcast packet transmitted by itself and received from the node 902b after rotation, from the ring 902. In the inter-ring transfer from the ring 902 to the ring 901, the inter-ring connecting node 902b ends the RPR MAC address of the packet. Then, the inter-ring connecting node 901b transmits the broadcast packet by using the RPR MAC address of the node 901b itself as the RPR MAC SA. The broadcast packet is received by the inter-ring connecting node 901a. Thereafter, the nodes 901a, 902a, 902b and 901b repeat the same operation, so a phenomenon that the broadcast packet will not be eliminated from the rings 901 and 902 forever (broadcast stream) is caused. This results in the network band being consumed unnecessarily.

Patent Document 2 discloses art to solve the problems described above (multiple reception of packets and broadcast stream). The packet ring network system described in Patent Document 2 includes first and second connecting nodes for connecting first and second packet rings to thereby make the connection between the rings redundant. In a normal state, only one of the nodes connecting the rings transmits a packet between the rings. As a result, there is only one relay for a broadcast packet, so an adverse effect on the upper layer application caused due to multiple transfer of the same packet and a system down caused by a broadcast stream can be prevented. Further, in the packet ring network system described in Patent Document 2, two nodes connecting the rings are allowed to be active (a state of transferring the packet), depending on the state of failure. Consequently, a flexible network operating mode becomes possible even if a failure occurs in the ring. Note that in the network system described in Patent Document 2, a node which becomes active eliminates the MAC address of the node, which was active, from the FDB with respect to the respective nodes in the ring. This prompts restudy of bridge without waiting for age out, enabling early recovery of communications.

Note that as the art relating to RPR, Non-Patent Document 2 describes a pulse through transfer function and bidirectional flooding.

Patent Document 1: Japanese Patent Application Laid-Open No. 2004-242194 (paragraphs 0004, 0012)

Patent Document 2: Japanese Patent Application Laid-Open No. 2003-258822 (paragraphs 0015-0085)

Non-Patent Document 1: IEEE Std 802.17-2004 "PART17: RPR ACCESS METHOD AND PHYSICAL LAYER SPECIFICATION", "9. Frame format"

Non-Patent Document 2: IEEE802.17 (Draft3.3), p. 117, p. 60, p. 190

DISCLOSURE OF THE INVENTION

Problems to be Solved by the Invention

In the packet ring network system described in Patent Document 2, rings are connected with two connecting nodes in order to make connection of a plurality of signal rings redundant. However, in order to prevent multiple reception of packets and broadcast stream, one connecting node can become active, so other connecting nodes are in a stand-by state. Therefore, there is room for improving the transfer efficiency of a unicast packet. Accordingly, it is preferable to make it possible to perform packet transfer between links connecting the rings while preventing multiple reception of packets and broadcast stream in a normal state where no failure has occurred.

Further, the conventional packet ring network system involves such a problem that a period required from the time that a failure is detected to the time that the communication is restored (failure recovery time) is long, so a failure recovery time of a carrier class (50 ms or less) cannot be achieved.

For example, in the Spanning Tree Protocol, if a failure occurs in a link or in a node, reconstruction of logical topology is started in every switch, so data transmission cannot be performed until the reconstruction is completed. It may take several minutes for convergence of topology, depending on the network scale.

Further, in a ring-type redundant protocol (EAPS, MRP, MMRP), a link failure is monitored by detecting whether a Hello packet arrives or not. Therefore, the failure recovery time is determined depending on the transmission interval time of Hello packets, which generally requires several seconds or less for failure recovery.

Further, in the layer 3 routing protocol, processing from detection of topology change in the network by the routing protocol to completion of reconstruction is performed by the CPU in accordance with software. Therefore, it takes time for failure recovery. The time required for failure recovery may take several minutes depending on the network scale.

Further, in the network system described in Patent Document 2, a node which becomes active eliminates the MAC address of a node, which was active, from the FDB with respect to each node in the ring to thereby promote restudy of a bridge without waiting for age out. However, communications will not be recovered until elimination of the MAC address of the FDB has been completed. Therefore, if the entry number of MAC is large in particular, the processing time required for eliminating the MAC address is long. This may cause a case in which the failure recovery time of 50 ms or less of the carrier class cannot be achieved.

Further, in the case where the RPR MAC address corresponding to the MAC DA of the user data packet cannot be specified so that an RPR packet where the RPR MAC DA is used as the broadcast packet is broadcast-transmitted in a packet ring, it is preferable to prevent multiple reception of packets in another packet ring.

In view of the above, it is an object of the present invention to enable packet transfer between a plurality of links connecting rings while preventing multiple reception of packets and broadcast stream in a normal state where no failure has occurred. It is another object of the present invention to reduce the time taken from failure to recovery. Further, it is still another object of the present invention, in a case where an RPR packet (unknown unicast packet) in which RPR MAC DA is used as a broadcast packet since the RPR MAC address corresponding to the MAC DA of a user data packet is unknown, is being broadcast-transmitted in a packet ring, to prevent multiple reception of packets in another packet ring.

Means for Solving the Problems

A packet ring network system, according to the present invention, is a network system in which each packet ring includes a plurality of inter-ring connecting nodes connected with another packet ring, and each of the plurality of inter-ring connecting nodes in one packet ring is connected with each of a plurality of inter-ring connecting nodes in another packet ring one to one so that the packet rings are connected with each other. Each of the inter-ring connecting nodes provided in each packet ring includes: a packet transfer unit that, when a packet or a broadcast packet in which the address of the inter-ring connecting node is set as the destination address is transferred from a packet ring, transfers a packet encapsulated in the packet or in the broadcast packet to another packet ring; an address falsifying unit that sets an address of another inter-ring connecting node provided in the same packet ring as the source address of the broadcast packet to be transmitted to the packet ring; an arrival point setting unit that sets a predetermined arrival point with respect to the broadcast packet to be transmitted to the packet ring; and a bidirectional broadcast packet transmitting unit that transmits the broadcast packet, in which the address of the other inter-ring connecting node is set as the source address by the address falsifying unit and the arrival point is set by the arrival point setting unit, in a direction of the other inter-ring connecting node and a direction opposite thereto, respectively.

With such a configuration, it is possible to realize packet transfer between a plurality of inter-ring connecting node connecting the rings while preventing multiple reception of packets and broadcast stream in a normal state where no failure has occurred.

Further, a packet ring network system, according to the present invention, is a network system in which each packet ring includes a plurality of inter-ring connecting nodes connected with another packet ring, and each of the plurality of inter-ring connecting nodes in one packet ring is connected with each of a plurality of inter-ring connecting nodes in another packet ring one to one so that the packet rings are connected with each other. Each of the inter-ring connecting nodes provided in each packet ring includes: a packet transfer unit that, when a packet or a broadcast packet in which the address of the inter-ring connecting node is set as the destination address is transferred from a packet ring, transfers a packet encapsulated in the packet or in the broadcast packet to another packet ring; a source address setting unit that sets the address of the inter-ring connecting node as the source address of the packet to be transmitted to the packet ring; an arrival point setting unit that sets a predetermined arrival point with respect to the broadcast packet transmitted to the packet ring; a bidirectional broadcast packet transmitting unit that transmits the broadcast packet, in which the address of the inter-ring connecting node is set as the source address by the source address setting unit and the arrival point is set by the arrival point setting unit, in a direction of another inter-ring connecting node provided in the same packet ring and a direction opposite thereto, respectively; and a packet elimination unit that, when the source address of the broadcast packet transferred from the packet ring is the address of the other inter-ring connecting node, eliminates the broadcast packet from the ring.

With such a configuration, it is possible to realize packet transfer between a plurality of inter-ring connecting nodes connecting the rings while preventing multiple reception of packets and broadcast stream in a normal state where no failure has occurred.

Each of the inter-ring connecting nodes provided in each packet ring may be so configured as to include: a failure detection unit that detects a failure in an inter-ring connecting node of another packet ring which is connected with the inter-ring connecting node, or a failure in a link with an inter-ring connecting node in the other packet ring; a pass-through transfer unit that, when the failure detection unit detects a failure, transfers a packet transferred from a packet ring to a next node in the packet ring; and a receiving unit that receives a packet in which the address of the inter-ring connecting node itself is set as the destination address, and also receives a packet in which the address of another inter-ring connecting node provided in the same packet ring is set as the destination address. The packet transfer unit may transfer the packet encapsulated in the packet received by the receiving unit to another packet ring.

With such a configuration, there is no need to perform an operation taken in the conventional art of eliminating the address of a node, which was active, from the FDB when a failure occurs. Therefore, the time taken from failure to recovery can be shortened.

Further, a network system according to the present invention is a network system in which a first ring network and a second ring network are connected via a plurality of links, including an inter-ring connecting node which is a first link end point among the plurality of links and belongs to the first ring network. The inter-ring connecting node includes: an inter-ring receiving unit that receives a broadcast signal from the first link; and a broadcast transmission unit that, when the inter-ring receiving unit receives the broadcast signal, broadcast-transmits the broadcast signal to the first ring network by using the address of the inter-ring connecting node which is an end point of an link other than the first link among the plurality of links and belongs to the first ring network, as the source.

With such a configuration, it is possible to realize packet transfer between a plurality of inter-ring connecting nodes connecting the rings while preventing broadcast stream in a normal state where no failure has occurred.

Further, a network system according to the present invention is a network system in which a first ring network and a second ring network are connected via a plurality of links, including an inter-ring connecting node which is a first link end point among the plurality of links and belongs to the first ring network. The inter-ring connecting node includes: an inter-ring receiving unit that receives a broadcast signal from the first link; a broadcast transmission unit that, when the inter-ring receiving unit receives the broadcast signal, broadcast-transmits the broadcast signal by using the address of the inter-ring connecting node itself as the source to the first ring network; and an eliminating unit that, if the source address of the signal transmitted from the first ring network is the address of an inter-ring connecting node which is an end point of a link other than the first link among the plurality of links and belongs to the first ring network, eliminates the signal from the first ring network.

With such a configuration, it is possible to realize packet transfer between a plurality of inter-ring connecting nodes connecting the rings while preventing broadcast stream in a normal state where no failure has occurred.

The inter-ring connecting node, which is an end point of the first link among the plurality of links and belongs to the first ring network, may be so configured as to include a pass-through transfer unit that transmits a signal received from the first ring network when a failure occurs in the first link or in an inter-ring connecting node which is an end point of the first link and belongs to the second ring network.

Further, a network system according to the present invention is a packet ring network system in which a first packet ring and a second packet ring are connected via a plurality of links, including an inter-ring connecting node at each end point of the plurality of links. Each inter-ring connecting node includes: a first transfer unit that receives a packet from the opposite side of another inter-ring connecting node provided in the same packet ring, and if the packet is a packet to be transferred to the other packet ring, transfers the packet to the other inter-ring connecting node, and transfers the packet encapsulated in the packet to the other packet ring; a second transfer unit that receives a packet from the other inter-ring connecting node provided in the same packet ring, and if the packet is a packet to be transferred to the other packet ring, transfers the packet encapsulated in the packet to the other packet ring; a source address setting unit that generates a packet in which the packet transferred from the other packet ring is encapsulated, and sets the address of the other inter-ring connecting node as the source of the packet; a transmitting direction selecting unit that selects a transmitting direction of the packet generated by the source address setting unit, based on the packet transferred from the other packet ring; and a transmission unit that transmits the packet in the transmitting direction selected by the transmitting direction selecting unit. With such a configuration, it is possible to prevent multiple reception of packets in the other packet ring when an unknown unicast packet is transmitted in one packet ring.

Further, a network system according to the present invention is a packet ring network system in which a first packet ring and a second packet ring are connected via a plurality of links, including an inter-ring connecting node at each end point of the plurality of links. Each inter-ring connecting node includes: a first transfer unit that receives a packet from the opposite side of another inter-ring connecting node provided in the same packet ring, and if the packet is a packet to be transferred to the other packet ring, transfers the packet to the other inter-ring connecting node, and transfers the packet encapsulated in the packet to the other packet ring; a second transfer unit that receives a packet from the other inter-ring connecting node provided in the same packet ring, and if the packet is a packet to be transferred to the other packet ring, transfers the packet encapsulated in the packet to the other packet ring; a source address setting unit that generates a packet in which the packet transferred from the other packet ring is encapsulated, and sets the address of the inter-ring connecting node itself as the source of the packet; a transmitting direction selecting unit that selects a transmitting direction of the packet generated by the source address setting unit, based on the packet transferred from the other packet ring; a transmission unit that transmits the packet in the transmitting direction selected by the transmitting direction selecting unit; and a packet elimination unit that eliminates the packet in which the address of the other inter-ring connecting node provided in the same packet ring is the source, from the packet ring. With such a configuration, it is possible to prevent multiple reception of packets in the other packet ring when an unknown unicast packet is transmitted in one packet ring.

Each inter-ring connecting node may be so configured as to include a failure detection unit that detects a failure in an inter-ring connecting node in the other packet ring connected with the inter-ring connecting node, or a failure in a link with an inter-ring connecting node in the other packet ring, and when the failure detection unit detects a failure, the first transfer unit and the second transfer unit may transfer the packet transferred from the packet ring to the next node in the packet ring.

Each inter-ring connecting node may be so configured as to include a destination address setting unit that sets a broadcast address as the destination of the packet generated by the source address setting unit when a failure occurs at a part other than an inter-ring connecting node in the packet ring to which it belongs, and when the failure occurs, the transmitting direction selecting unit may select both of the two directions in the packet ring.

Further, a packet transfer method according to the present invention is a method applied to a packet ring network system in which each packet ring includes a plurality of inter-ring connecting nodes connected with another packet ring, and each of the plurality of inter-ring connecting nodes in one packet ring is connected with each of a plurality of inter-ring connecting nodes in another packet ring one to one so that the packet rings are connected with each other. Each of the inter-ring connecting nodes provided in each packet ring: transfers, when a packet or a broadcast packet in which the address of the inter-ring connecting node is set as the destination address is transferred from a packet ring, a packet encapsulated in the packet or in the broadcast packet to another packet ring; sets an address of another inter-ring connecting node provided in the same packet ring as the source address of the broadcast packet to be transmitted to the packet ring; sets a predetermined arrival point with respect to the broadcast packet to be transmitted to the packet ring; and transmits the broadcast packet, in which the address of the other inter-ring connecting node is set as the source address and the arrival point is set, in a direction of the other inter-ring connecting node and a direction opposite thereto, respectively.

With such a method, it is possible to realize packet transfer between a plurality of inter-ring connecting nodes connecting the rings while preventing multiple reception of packets and broadcast stream in a normal state where no failure has occurred.

Further, the packet transfer method according to the present invention is a method applied to a packet ring network system in which each packet ring includes a plurality of inter-ring connecting nodes connected with another packet ring, and each of the plurality of inter-ring connecting nodes in one packet ring is connected with each of a plurality of inter-ring connecting nodes in another packet ring one to one so that the packet rings are connected with each other. Each of the inter-ring connecting nodes provided in each packet ring: transfers, when a packet or a broadcast packet in which the address of the inter-ring connecting node is set as the destination address is transferred from a packet ring, a packet encapsulated in the packet or in the broadcast packet to another packet ring; sets the address of the inter-ring connecting node as the source address of the packet to be transmitted to the packet ring; sets a predetermined arrival point with respect to the broadcast packet to be transmitted to the packet ring; transmits the broadcast packet, in which the address of the inter-ring connecting node is set as the source address and the arrival point is set, in a direction of the other inter-ring connecting node provided in the same packet ring and a direction opposite thereto, respectively; and if the source address of the broadcast packet transferred from the packet ring is the address of the other inter-ring connecting node, eliminates the broadcast packet from the ring.

With such a method, it is possible to realize packet transfer between a plurality of inter-ring connecting node connecting the rings while preventing multiple reception of packets and broadcast stream in a normal state where no failure has occurred.

Each inter-ring connecting node provided in each packet ring may: detect a failure in an inter-ring connecting node of another packet ring which is connected with the inter-ring connecting node, or a failure in a link with an inter-ring connecting node of the other packet ring; when the failure is detected, transfer a packet transferred from the packet ring to the next node in the packet ring; receive a packet in which the address of the inter-ring connecting node itself is set as the destination address, and also receives a packet in which the address of another inter-ring connecting node provided in the same packet ring is set as the destination address; and transfer the packet encapsulated in the received packet to another packet ring.

With such a method, there is no need to perform an operation taken in the conventional art of eliminating the address of a node, which was active, from the FDB when a failure occurs. Therefore, the time taken from failure to recovery can be shortened.

Further, a signal transmitting/receiving method according to the present invention is a signal transmitting/receiving method applied to a network system in which a first ring network and a second ring network are connected via a plurality of links, in which an inter-ring connecting node, which is a first link end point among the plurality of links and belongs to the first ring network, receives a broadcast signal from the first link, and upon receiving the broadcast signal, broadcast-transmits the broadcast signal to the first ring network by using the address of the inter-ring connecting node which is an end point of an link other than the first link among the plurality of links and belongs to the first ring network, as the source.

With such a method, it is possible to realize packet transfer between a plurality of inter-ring connecting nodes connecting the rings while preventing broadcast stream in a normal state where no failure has occurred.

Further, a signal transmitting/receiving method according to the present invention is a signal transmitting/receiving method applied to a network system in which a first ring network and a second ring network are connected via a plurality of links, in which an inter-ring connecting node, which is a first link end point among the plurality of links and belongs to the first ring network, receives a broadcast signal from the first link, and upon receiving the broadcast signal, broadcast-transmits the broadcast signal by using the address of the inter-ring connecting node itself as the source to the first ring network; and if the source address of the signal transmitted from the first ring network is the address of an inter-ring connecting node which is an end point of a link other than the first link among the plurality of links and belongs to the first ring network, eliminates the signal from the first ring network.

With such a method, it is possible to realize packet transfer between a plurality of inter-ring connecting nodes connecting the rings while preventing broadcast stream in a normal state where no failure has occurred.

The inter-ring connecting node, which is an end point of the first link among the plurality of links and belongs to the first ring network, may be so configured as to transmit a signal received from the first ring network when a failure occurs in the first link or in an inter-ring connecting node which is an end point of the first link and belongs to the second ring network.

A packet transfer method according to the present invention is a method applied to a packet ring network system in which a first packet ring and a second packet ring are connected via a plurality of links, in which an inter-ring connecting node provided at each end point of the plurality of links receives a packet from the opposite side of another inter-ring connecting node provided in the same packet ring, and if the packet is a packet to be transferred to the other packet ring, transfers the packet to the other inter-ring connecting node and transfers the packet encapsulated in the packet to the other packet ring, and receives a packet from the other inter-ring connecting node provided in the same packet ring, and if the packet is a packet to be transferred to the other packet ring, transfers the packet encapsulated in the packet to the other packet ring, and generates a packet in which the packet transferred from the other packet ring is encapsulated and sets the address of the other inter-ring connecting node as the source of the packet, and selects the transmitting direction of the generated packet, based on the packet transferred from the other packet ring, and transmits the packet in the selected transmitting direction. With such a method, it is possible to prevent multiple reception of packets in the other packet ring when an unknown unicast packet is transmitted in one packet ring.

Further, a packet transfer method according to the present invention is a method applied to a packet ring network system in which a first packet ring and a second packet ring are connected via a plurality of links, in which an inter-ring connecting node provided at each end point of the plurality of links receives a packet from the opposite side of another inter-ring connecting node provided in the same packet ring, and if the packet is a packet to be transferred to the other packet ring, transfers the packet to the other inter-ring connecting node and transfers the packet encapsulated in the packet to the other packet ring, and receives a packet from the other inter-ring connecting node provided in the same packet ring, and if the packet is a packet to be transferred to the other packet ring, transfers the packet encapsulated in the packet to the other packet ring, and generates a packet in which the packet transferred from the other packet ring is encapsulated and sets the address of the inter-ring connecting node itself as the source of the packet, and selects a transmitting direction of the generated packet, based on the packet transferred from the other packet ring, and transmits the packet in the selected transmitting direction, and eliminates the packet in which the address of the other inter-ring connecting node provided in the same packet ring is the source, from the packet ring. With such a method, it is possible to prevent multiple reception of packets in the other packet ring when an unknown unicast packet is transmitted in one packet ring.

Each inter-ring connecting node may detect a failure in an inter-ring connecting node in the other packet ring connected with the inter-ring connecting node, or a failure in a link with an inter-ring connecting node in the other packet ring, and when detecting the failure, may transfer the packet transferred from the packet ring to the next node in the packet ring.

Each inter-ring connecting node may set the broadcast address as the destination of the generated packet when a failure occurs at a part other than an inter-ring connecting node in the packet ring to which it belongs, and when the failure occurs, may select both of the two directions in the packet ring.

An inter-ring connecting node according to the present invention is a node applied to a packet ring network system in which each packet ring includes a plurality of inter-ring connecting nodes connected with another packet ring, and each of the plurality of inter-ring connecting nodes in one packet ring is connected with each of a plurality of inter-ring connecting nodes in another packet ring one to one so that the packet rings are connected with each other. The node includes: a packet transfer unit that, when a packet or a broadcast packet in which the address of the inter-ring connecting node is set as the destination address is transferred from a packet ring, transfers a packet encapsulated in the packet or in the broadcast packet to another packet ring; an address falsifying unit that sets an address of another inter-ring connecting node provided in the same packet ring as the source address of the broadcast packet transmitted to the packet ring; an arrival point setting unit that sets a predetermined arrival point with respect to the broadcast packet transmitted to the packet ring; and a bidirectional broadcast packet transmitting unit that transmits the broadcast packet, in which the address of the other inter-ring connecting node is set as the source address by the address falsifying unit and the arrival point is set by the arrival point setting unit, in a direction of the other inter-ring connecting node and a direction opposite thereto, respectively.

With such a configuration, it is possible to realize packet transfer between a plurality of inter-ring connecting node connecting the rings while preventing multiple reception of packets and broadcast stream in a normal state where no failure has occurred in the packet ring network system.

An inter-ring connecting node according to the present invention is a node applied to a packet ring network system in which each packet ring includes a plurality of inter-ring connecting nodes connected with another packet ring, and each of the plurality of inter-ring connecting nodes in one packet ring is connected with each of a plurality of inter-ring connecting nodes in another packet ring one to one so that the packet rings are connected with each other. The node includes: a packet transfer unit that, when a packet or a broadcast packet in which the address of the inter-ring connecting node is set as the destination address is transferred from a packet ring, transfers a packet encapsulated in the packet or in the broadcast packet to another packet ring; a source address setting unit that sets the address of the inter-ring connecting node as the source address of a packet to be transmitted to the packet ring; an arrival point setting unit that sets a predetermined arrival point with respect to the broadcast packet to be transmitted to the packet ring; a bidirectional broadcast packet transmitting unit that transmits the broadcast packet, in which the address of the inter-ring connecting node is set as the source address by the source address setting unit and the arrival point is set by the arrival point setting unit, in a direction of another inter-ring connecting node provided in the same packet ring and a direction opposite thereto, respectively; and a packet elimination unit that, when the source address of the broadcast packet transferred from the packet ring is the address of the other inter-ring connecting node, eliminates the broadcast packet from the ring.

With such a configuration, it is possible to realize packet transfer between a plurality of inter-ring connecting nodes connecting the rings while preventing multiple reception of packets and broadcast stream in a normal state where no failure has occurred in the packet ring network system.

The node may be so configured as to include: a failure detection unit that detects a failure in an inter-ring connecting node in another packet ring which is connected with the inter-ring connecting node itself, or a failure in a link with an inter-ring connecting node of the other packet ring; a pass-through transfer unit that, when the failure detection unit detects a failure, transferring a packet transferred from the packet ring to the next node in the packet ring; and a receiving unit that receives a packet in which the address of the inter-ring connecting itself is set as the destination address and also receives a packet in which the address of another inter-ring connecting node provided in the same packet ring is set as the destination address, and the packet transfer unit transfers the packet encapsulated in the packet received by the receiving unit to another packet ring.

With such a configuration, there is no need to perform an operation taken in the conventional art of eliminating the address of a node, which was active, from the FDB when a failure occurs in the packet ring network system. Therefore, the time taken from failure to recovery can be shortened.

Further, an inter-ring connecting node according to the present invention is a node which is an end point of a first link among a plurality links connecting a first ring network and a second ring network and belongs to the first ring network, including: an inter-ring receiving unit that receives a broadcast signal from the first link; and a broadcast transmission unit that, when the inter-ring receiving unit receives the broadcast signal, broadcast-transmits the broadcast signal to the first ring network by using the address of the inter-ring connecting node which is an end point of an link other than the first link among the plurality of links and belongs to the first ring network, as the source.

With such a configuration, it is possible to realize packet transfer between a plurality of inter-ring connecting nodes connecting the rings while preventing broadcast stream in a normal state where no failure has occurred.

Further, an inter-ring connecting node according to the present invention is a node which is an end point of a first link among a plurality of links connecting a first ring network and a second ring network and belongs to the first ring network, including: an inter-ring receiving unit that receives a broadcast signal from the first link; a broadcast transmission unit that, when the inter-ring receiving unit receives the broadcast signal, broadcast-transmits the broadcast signal by using the address of the inter-ring connecting node itself as the source to the first ring network; and an eliminating unit that, if the source address of the signal transmitted from the first ring network is the address of an inter-ring connecting node which is an end point of a link other than the first link among the plurality of links and belongs to the first ring network, eliminates the signal from the first ring network.

With such a configuration, it is possible to realize packet transfer between a plurality of inter-ring connecting nodes connecting the rings while preventing broadcast stream in a normal state where no failure has occurred.

The inter-ring connecting node may be so configured as to include a pass-through transfer unit that transmits a signal received from the first ring network when a failure occurs in the first link or in an inter-ring connecting node which is an end point of the first link and belongs to the second ring network.

Further, an inter-ring connecting node according to the present invention is a node which is an end point of a plurality of links in a packet ring network system in which a first packet ring and a second packet ring are connected via a plurality of links, including: a first transfer unit that receives a packet from the opposite side of another inter-ring connecting node provided in the same packet ring, and if the packet is a packet to be transferred to the other packet ring, transfers the packet to the other inter-ring connecting node, and transfers the packet encapsulated in the packet to the other packet ring; a second transfer unit that receives a packet from the other inter-ring connecting node provided in the same packet ring, and if the packet is a packet to be transferred to the other packet ring, transfers the packet encapsulated in the packet to the other packet ring; a source address setting unit that generates a packet in which the packet transferred from the other packet ring is encapsulated, and sets the address of the other inter-ring connecting node as the source of the packet; a transmitting direction selecting unit that selects a transmitting direction of the packet generated by the source address setting unit, based on the packet transferred from the other packet ring; and a transmission unit that transmits the packet in the transmitting direction selected by the transmitting direction selecting unit. With such a configuration, it is possible to prevent multiple reception of packets in the other packet ring when an unknown unicast packet is transmitted in one packet ring.

Further, an inter-ring connecting node according to the present invention is a node which is an end point of a plurality of links in a packet ring network system in which a first packet ring and a second packet ring are connected via a plurality of links: a first transfer unit that receives a packet from the opposite side of another inter-ring connecting node provided in the same packet ring, and if the packet is a packet to be transferred to the other packet ring, transfers the packet to the other inter-ring connecting node, and transfers the packet encapsulated in the packet to the other packet ring; a second transfer unit that receives a packet from the other inter-ring connecting node provided in the same packet ring, and if the packet is a packet to be transferred to the other packet ring, transfers the packet encapsulated in the packet to the other packet ring; a source address setting unit that generates a packet in which the packet transferred from the other packet ring is encapsulated, and sets the address of the inter-ring connecting node itself as the source of the packet; a transmitting direction selecting unit that selects a transmitting direction of the packet generated by the source address setting unit, based on the packet transferred from the other packet ring; a transmission unit that transmits the packet in the transmitting direction selected by the transmitting direction selecting unit; and a packet elimination unit that eliminates the packet in which the address of the other inter-ring connecting node provided in the same packet ring is the source, from the packet ring. With such a configuration, it is possible to prevent multiple reception of packets in the other packet ring when an unknown unicast packet is transmitted in one packet ring.

The node may be so configured as to include a failure detection unit that detects a failure in an inter-ring connecting node in the other packet ring connected with itself, or a failure in a link with an inter-ring connecting node in the other packet ring, and when the failure detection unit detects the failure, the first transfer unit and the second transfer unit may transfer the packet transferred from the packet ring to the next node in the packet ring.

The node may be so configured as to include a destination address setting unit that sets the broadcast address as the destination of the packet generated by the source address setting unit when a failure occurs at a part other than an inter-ring connecting node in the packet ring to which it belongs, and when the failure occurs, the transmitting direction selecting unit may select both of the two directions in the packet ring.

In the present invention, the address falsifying unit sets the address of another inter-ring connecting node provided in the same packet ring as the source address of the broadcast packet to be transmitted to the packet ring. Then, the bidirectional broadcast packet transmitting unit transmits the broadcast packet, in which the address of the other inter-ring connecting node is set as the source address by the address falsifying unit and the arrival point is set by the arrival point setting unit, in a direction of the other inter-ring connecting node and a direction opposite thereto, respectively. Accordingly, each inter-ring connecting node in the packet ring recognizes the broadcast packet transmitted by another inter-ring connecting node as a broadcast packet transmitted by itself, so it is possible to prevent the packet from being transmitted to another packet ring, whereby broadcast stream can be prevented. Further, since the arrival point setting unit sets the arrival point, the packet transmitted from each inter-ring connecting node will not go further over the arrival point. Therefore, multiple reception of packets can be prevented at each node. As a result, it is possible to perform packet transfer between a plurality of inter-ring connecting nodes connecting the rings while preventing multiple reception of packets and broadcast stream in a normal state where no failure has occurred.

Even in the case of a configuration including the broadcast transmission unit that, when the inter-ring receiving unit receives a broadcast signal, broadcast-transmits the broadcast signal to the first ring network by using the address of the inter-ring connecting node which is an end point of a link other than the first link among a plurality of links and belongs to the first ring network as the source, broadcast stream can be prevented similarly.

Further, in the present invention, the source address setting unit sets the address of the inter-ring connecting node as the source address of the packet to be transmitted to the packet ring. Further, the bidirectional broadcast packet transmitting unit transmits the broadcast packet, in which the address of the inter-ring connecting node is set as the source address by the source address setting unit and the arrival point is set by the arrival point setting unit, in a direction of another inter-ring connecting node provided in the same packet ring and in a direction opposite thereto. Further, if the source address of the broadcast packet transferred from a packet ring is the address of another inter-ring connecting node, the packet elimination unit eliminates the broadcast packet from the ring. Accordingly, each inter-ring connecting node in a packet ring eliminates a broadcast packet transmitted by another inter-ring connecting node so as not to transmit it to another packet ring. Therefore, broadcast stream can be prevented. Further, since the arrival point setting unit sets the arrival point, a packet transmitted from each inter-ring connecting node will not go further over the arrival point. Therefore, multiple reception of packets can be prevented at each node. As a result, it is possible to perform packet transfer between a plurality of inter-ring connecting nodes connecting the rings while preventing multiple reception of packets and broadcast stream in a normal state where no failure has occurred.

Even in the case of including the broadcast transmission unit that broadcast-transmits the broadcast signal to the first ring network by using the address of the inter-ring connecting node itself as the source when the inter-ring receiving unit receives the broadcast signal, and the eliminating unit that eliminates the signal from the first ring network when the source address of the signal transmitted from the first ring network is the address of an inter-ring connecting node which is an end point of a link other than the first link among a plurality of links and belongs to the first ring network, broadcast stream can be prevented.

Further, when the failure detection unit detects a failure, the pass-through transfer unit transfers a packet transferred from a packet ring to the next node in the packet ring. Then, the receiving unit receives the packet in which the address of the inter-ring connecting node itself is set as the destination address, and also receives a packet in which the address of another inter-ring connecting node in the same packet ring is set as the destination address. Further, the packet transfer unit transfers the packet encapsulated in the packet received by the receiving unit to another packet ring. Accordingly, even if a failure occurs in a link or in an inter-ring connecting node which is an end point of the link, the packet is transferred to another inter-ring connecting node by the pass-through transfer unit, and via the inter-ring connecting node, the packet can be transferred to another packet ring. In other words, even if a failure occurs in a link or in an inter-ring connecting node which is an end point of the link, the packet can be transferred to another packet ring via another link.

Further, in the present invention, if the first transfer unit in each inter-ring connecting node receives a packet from the opposite side of another inter-ring connecting node provided in the same packet ring and the packet is a packet to be transferred to another packet ring, the first transfer unit transfers the packet to another inter-ring connecting node, and also transfers the packet encapsulated in the packet to another packet ring. Further, when the second transfer unit receives a packet from another inter-ring connecting node provided in the same packet ring, and if the packet is a packet to be transferred to another packet ring, the second transfer unit transfers the packet encapsulated in the packet to another packet ring. Accordingly, a packet encapsulated in an unknown unicast packet is transferred to another packet ring via each of a plurality of links.

Then, the source address setting unit in each inter-ring connecting node to which the packet is transferred generates a packet in which the packet is encapsulated, and sets the address of another inter-ring connecting node as the source of the packet. Further, the transmitting direction selecting unit selects a transmitting direction of the packet generated by the source address setting unit based on the packet transferred from another packet ring, and the transmission unit transmits the packet to the direction. Accordingly, each inter-ring connecting node receiving each packet encapsulated in an unknown unicast packet sets the address of another inter-ring connecting node as the source, and transmits the packet in the same direction. Then, one inter-ring connecting node recognizes the packet transmitted by the other inter-ring connecting node as a packet transmitted by itself, so the one inter-ring connecting node can prevent the packet from being transmitted to another packet ring. As a result, multiple reception of packets can be prevented.

Alternatively, the source address setting unit in each inter-ring connecting node, to which the packet encapsulated in an unknown unicast packet is transferred, sets the address of itself as the source of the packet. Further, the transmitting direction selecting unit selects a transmitting direction of the packet generated by the source address setting unit based on the packet transferred from another packet ring, and the transmitting unit transmits the packet in such a direction. Then, the packet elimination unit eliminates a packet that the source is the address of another inter-ring connecting node provided in the same packet ring, from the packet ring. Accordingly, each inter-ring connecting node which received each packet encapsulated in the unknown unicast packet sets the address of itself as the source, and transmits the packet in the same direction. Then, one inter-ring connecting node eliminates the packet transmitted from the other inter-ring connecting node, so multiple reception of packets can be prevented.

EFFECTS OF THE INVENTION

The present invention is so configured as to include: an address falsifying unit that sets the address of another inter-ring connecting node provided in the same packet ring as the source address of a broadcast packet to be transmitted to the packet ring; an arrival point setting unit that sets a predetermined arrival point with respect to the broadcast packet to be transmitted to the packet ring; and a bidirectional broadcast packet transmitting unit that transmits the broadcast packet in which the address of another inter-ring connecting node is set as the source address by the address falsifying unit and the arrival point is set by the arrival point setting unit, in a direction of another inter-ring connecting node and a direction opposite thereto, respectively. Therefore, it is possible to perform packet transfer between a plurality of inter-ring connecting nodes connecting the rings while preventing multiple reception of packets and broadcast stream in a normal state where no failure has occurred.

Further, the present invention is so configured as to include: a source address setting unit that sets the address of the inter-ring connecting node as the source address of a packet to be transmitted to a packet ring; an arrival point setting unit that sets a predetermined arrival point with respect to the broadcast packet to be transmitted to the packet ring; a bidirectional broadcast packet transmission unit that transmits the broadcast packet in which the address of the inter-ring connecting node is set as the source address by the source address setting unit and the arrival point is set by the arrival point setting unit, in a direction of another inter-ring connecting node provided in the same packet ring and in a direction opposite thereto, respectively; and a packet elimination unit that eliminates the broadcast packet when the source address of the broadcast packet transferred from the packet ring is the address of another inter-ring connecting node. Therefore, it is possible to perform packet transfer between a plurality of inter-ring connecting nodes connecting the rings while preventing multiple reception of packets and broadcast stream in a normal state where no failure has occurred.

Further, since packet transfer can be performed between a plurality of inter-ring connecting nodes connecting the rings respectively, the number of paths between the packet rings is not limited to one when a unicast packet is transferred between the packet rings. In other words, a plurality of paths exist between the packet rings, and each path can be used for transferring a unicast packet. Therefore, the efficiency of transferring a unicast packet between the packet rings can be improved.

Further, the present invention includes a broadcast transmission unit that, when the inter-ring receiving unit receives a broadcast signal, broadcast-transmits the broadcast signal to a first ring network by using the address of an inter-ring connecting node which is an end point of a link other than the first link among a plurality of links and belongs to the first ring network as a source. Therefore, broadcast stream can be prevented.

Further, the present invention includes: a broadcast transmission unit that, when the inter-ring receiving unit receives a broadcast signal, broadcast-transmits the broadcast signal to the first ring network by using the address of the inter-ring connecting node itself as the source; and an elimination unit that, when the source address of the signal transmitted from the first ring network is the address of an inter-ring connecting node which is an end point of a link other than the first link among a plurality of links and belongs to the first ring network, eliminates the signal from the first ring network. Therefore, broadcast stream can be prevented.

Further, in the present invention, each inter-ring connecting node is so configured as to include: a first transfer unit that, when receiving a packet from the opposite side to another inter-ring connecting node provided in the same packet ring and the packet is a packet to be transferred to another packet ring, transfers the packet ring to the other inter-ring connecting node and transfers the packet encapsulated in the packet to another packet ring; a second transfer unit that; when receiving a packet from another inter-ring connecting node provided in the same packet ring and the packet is a packet to be transferred to another packet ring, transfers the packet encapsulated in the packet to another packet ring; a source address setting unit that generates a packet in which the packet transferred from another packet ring is encapsulated and sets the address of another inter-ring connecting node as the source of the packet; the transmitting direction selecting unit that selects a transmitting direction of the packet generated by the source address setting unit based on the packet transferred from another packet ring; and a transmission unit that transmits the packet in the transmitting direction selected by the transmitting direction selecting unit. Therefore, it is possible to prevent multiple reception of packets in another packet ring when an unknown unicast packet is transferred in one packet ring.

Further, according to the present invention, each inter-ring connecting node is so configured as to include: a first transfer unit that, when receiving a packet from the opposite side of another inter-ring connecting node provided in the same packet ring and the packet is a packet to be transferred to another packet ring, transfers the packet ring to the other inter-ring connecting node and transfers the packet encapsulated in the packet to another packet ring; a second transfer unit that, when receiving a packet from another inter-ring connecting node provided in the same packet ring and the packet is a packet to be transferred to another packet ring, transfers the packet encapsulated in the packet to another packet ring; a source address setting unit that generates a packet in which the packet transferred from another packet ring in encapsulated and sets the address of the inter-ring connecting node itself as the source of the packet; the transmitting direction selecting unit that selects the transmitting direction of the packet generated by the source address setting unit based on the packet transferred from another packet ring; a transmission unit that transmits the packet in the transmitting direction selected by the transmitting direction selecting unit; and a packet elimination unit that eliminates the packet in which the address of another inter-ring connecting node provided in the same packet ring is set as the source, from the packet ring. Therefore, it is possible to prevent multiple reception of packets in another packet ring when an unknown unicast packet is transferred in one packet ring.

BEST MODE FOR CARRYING OUT THE INVENTION

Hereinafter, the best mode for carrying out the present invention will be described with reference to the drawings.

A first exemplary embodiment and a second exemplary embodiment described below are based on any one of the following states (any one of first to third states). A first state is a state where the address tables (FDB) of all nodes included in a packet ring network thoroughly hold the corresponding relationships between the address of the user terminal and the RPR MAC addresses of the RPR nodes by manual setting or the like, and the contents (entry information) of the address tables of all nodes are common. A second state is a state where the corresponding relationships between the address of the user terminal and the RPR MAC addresses of the RPR nodes may be studied in the address tables of all nodes included in a packet ring network, and when the address table of a node studies a new corresponding relationship, the address table of the node which has studied is immediately shared by the address tables of all nodes. Note that in the second state, it is only necessary to provide a monitoring means which monitors whether the content of the address table of each node is changed, and if the address table of a node is changed, rewrites the address tables of all nodes to have the content of the address table in which the content has been changed. A third state is a state where broadcast transmission based on a user data packet in which the broadcast address is set in advance as the destination is performed by an upper level protocol enabling address settlement (e.g., ARP (Address Resolution Protocol) in the IP (Internet Protocol), etc.). As a result, it is ensured that an unknown unicast packet will not be transferred in the packet ring. An unknown unicast packet means an RPR packet that the RPR MAC address corresponding to the MAC DA of a user data packet cannot be searched from the address table when generating an RPR packet by encapsulating the user data packet, so the RPR MAC DA is set as the broadcast address. The unknown unicast packet is to be broadcast-transmitted. In other words, an unknown unicast packet is a kind of broadcast packet.

Exemplary Embodiment 1

Figure 1:
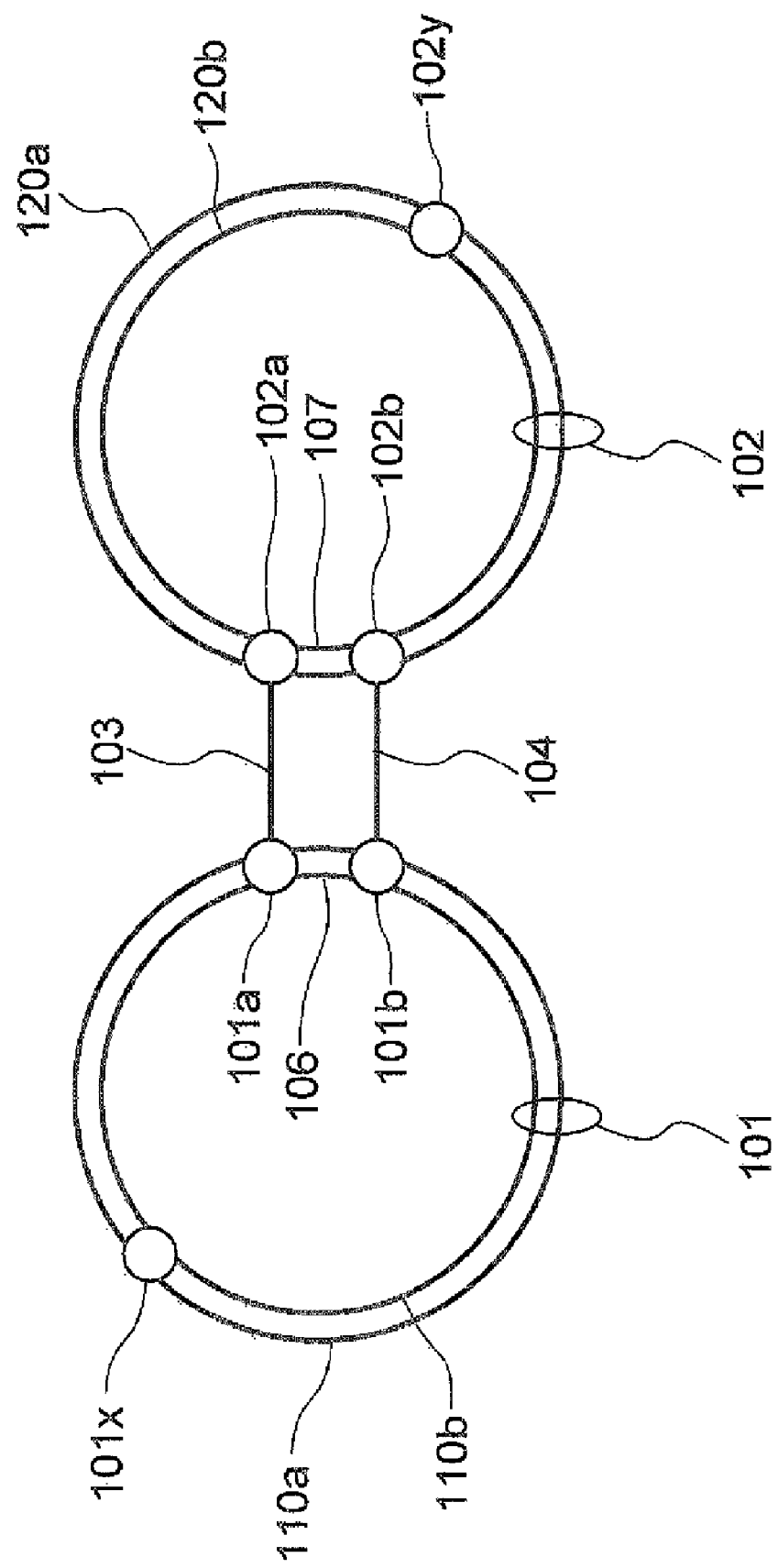
FIG. 1 is an illustration showing an exemplary configuration of a packet ring network system according to the present invention.

FIG. 1 is an illustration showing a configuration example of a packet ring network system according to the present invention. A packet ring network system according to the present invention includes a plurality of rings (packet ring in which nodes are connected in a ring shape) 101 and 102. The rings 101 and 102 are connected with a plurality of links 103 and 104. In this exemplary embodiment, the rings are connected with two links 103 and 104. The ring 101 includes a plurality of nodes 101a, 101b, 101x, etc. The respective nodes 101a, 101b and 101x are connected via ringlets 110a and 110b which transfer packets in opposite directions. Similarly, the ring 102 includes a plurality of nodes 102a, 102b, 102y, etc. The respective nodes 102a, 102b and 102y are connected via ringlets 120a and 120b which transfer packets in opposite directions. The node 101a in the ring 101 and the node 102a in the ring 102 are connected to thereby form the link 103. Similarly, the node 101b in the ring 101 and the node 102b in the ring 102 are connected to thereby form the link 104.

As described above, the present exemplary embodiment and the second exemplary embodiment described later are based on a premise that they are in any of the first to third states. In the first state, the corresponding relationships between the address of the user terminal and the RPR MAC address of the RPR nodes are thoroughly held in all nodes. Therefore, in any node, a unique RPR MAC DA can be determined from the MAC DA of a user data packet. In the second state, assuming that a user data packet is input from the node 101x to the ring 101 and is transferred to the node 102y, if the user data packet transferred to the node 101x is a broadcast packet, the RPR packet in which the user data packet is encapsulated becomes a broadcast packet. Further, if the user data packet transferred to the node 101x is a unicast packet and if there is an entry in the address table (that is, if the RPR MAC address corresponding to the MAC DA of the user data packet can be searched), the RPR packet in which the user data packet is encapsulated becomes a unicast packet. Further, if the user data packet transferred to the node 101x is a unicast packet and there is no entry in the address table, the RPR packet in which the user data packet is encapsulated becomes an unknown unicast packet. This operation is same in the case where a specific packet is transferred to the ring 102 via an interlink. That is, if the user data packet which became a unicast packet in the node 101x is transferred to the node 102a via the interlink, the RPR packet in which the user data packet is encapsulated in the node 102a also becomes a unicast packet. Further, if the user data packet which becomes an unknown unicast packet in the node 101x is transferred to the nodes 102a and 102b via the interlink, the RPR packet in which the user data packet is encapsulated in the node 102a and 102b also becomes an unknown unicast packet. Further, in the third state, by using the ARP in the IP which is typical as an upper layer protocol of the Ethernet, the MAC DA of the user data packet can be set as the broadcast address every time address solution is required. Then, the broadcast packet is transferred to each node. Thereafter, it is possible to prevent an unknown unicast packet from being generated.

In the following description, a node connected with a node in the other ring is called an inter-ring connecting node. In the packet ring network system shown in FIG. 1, the nodes 101a, 101b, 102a and 102b correspond to inter-ring connecting nodes, respectively. Each inter-ring connecting node is connected with an inter-ring connecting node in the other ring one to one.

Further, since the rings 101 and 102 are connected with each other via two links, each ring 101 or 102 has two inter-ring connecting nodes. A link linking the inter-ring connecting nodes provided in one ring is called an interval between ring connecting nodes. In the example shown in FIG. 1, a link 106 linking the inter-ring connecting nodes 101a ad 101b arranged in the ring 101 corresponds to an interval between ring connecting nodes. Similarly, a link 107 linking the inter-ring connecting nodes 102a and 102b arranged in the ring 102 corresponds to an interval between ring connecting nodes.

Further, a combination of inter-ring connecting nodes arranged in one ring is called a pair of inter-ring connecting nodes. In the example shown in FIG. 1, a combination of the inter-ring connecting nodes 101a and 101b arranged in one ring 101 corresponds to a pair of inter-ring connecting nodes. Similarly, a combination of the inter-ring connecting nodes 102a and 102b arranged in the ring 102 corresponds to a pair of inter-ring connecting nodes.

Each of the inter-ring connecting nodes 101a, 101b, 102a and 102b is previously so set that the self node is an inter-ring connecting node, and holds information that the self node is an inter-ring connecting node in advance.

In this exemplary embodiment, description is given on the premise that the inter-ring connecting nodes 101a and 101b are adjacent to each other, and the inter-ring connecting nodes 102a and 102b are adjacent to each other.

Further, each node included in a pair of inter-ring connecting nodes stores not only the RPR MAC address of itself but also the RPR MAC address of the other node included in the same pair of inter-ring connecting nodes. For example, the node 101a included in a pair of inter-ring connecting nodes stores not only the RPR MAC address of itself but also the RPR MAC address of the node 101b included in the same pair of inter-ring connecting nodes. Similarly, the node 101b stores not only the self RPR MAC address but also the RPR MAC address of the node 101a. This also applies to a pair of inter-ring connecting nodes in the ring 102. That is, the node 102a stores not only the RPR MAC address of itself but also the RPR MAC address of the node 102b. Further, the node 102b stores not only the RPR MAC address of itself but also the RPR MAC address of the node 102a.

Each of the inter-ring connecting nodes 101a, 101b, 102a and 102b in the present exemplary embodiment performs bidirectional flooding when it starts transmission of a broadcast packet to the ring where it belongs to, the nodes being the source of the transmission. In other words, it transfers a broadcast packet to each of the two ringlets. Further, each inter-ring connecting node stores topology information including information of a cleave point (a part previously set as the packet destination) in advance. Then, in the case of transmitting a broadcast packet by performing bidirectional flooding in a normal state (when no failure has occurred), transmission will be performed after setting a TTL corresponding to the cleave point to a packet to be transmitted to each ringlet. If a failure occurs in the ring and the ring autonomously starts protective operation (e.g., lap mode), transmission will be performed after setting a TTL corresponding to the point where the failure has occurred, to a packet transmitted to each ringlet.

A cleave point is set in a link in the ring. However, an interval between ring connecting nodes, which is set based on a pair of inter-ring connecting nodes performing bidirectional flooding to a broadcast packet, is excluded from the parts to which a cleave point is set in the inter-ring connecting node. For example, in the ring 101, it is only necessary to set any arbitrary link other than the interval 106 between ring connecting nodes as a cleave point beforehand. Similarly, in the ring 102, it is only necessary to set any arbitrary link other than the interval 107 between ring connecting nodes as a cleave point beforehand. Particularly, it is preferable to set a cleave point such that communication amounts between two inter-ring connecting nodes and the cleave point become almost same in operating the packet ring network system. For example, in the ring 102, it is preferable to set a cleave point such that the communication amount between the inter-ring connecting node 102a and the cleave point and the communication amount between the inter-ring connecting node 102b and the cleave point become almost same.

Note that when the mode of an inter-ring connecting node is changed to a pass-through transfer mode described later, the inter-ring connecting node will never work as a source to start transmission of a broadcast packet to the ring where it belongs.

When each of the inter-ring connecting nodes 101a, 101b, 102a and 102b receives a user data packet in which the destination is the broadcast address from the other ring, it transmits a broadcast packet to the ring where it belongs, the node being the source thereof. Further, if the RPR MAC address corresponding to the MAC DA included in the user data packet received from the other ring cannot be specified, each node transmits a broadcast packet (unknown unicast packet) into the ring where it belongs, the node being the source thereof. However, if it is in the first state or in the third state, each node can specify the RPR MAC address corresponding to the MAC DA included in the user data packet, so an unknown unicast packet will not be transmitted.

Figure 38:
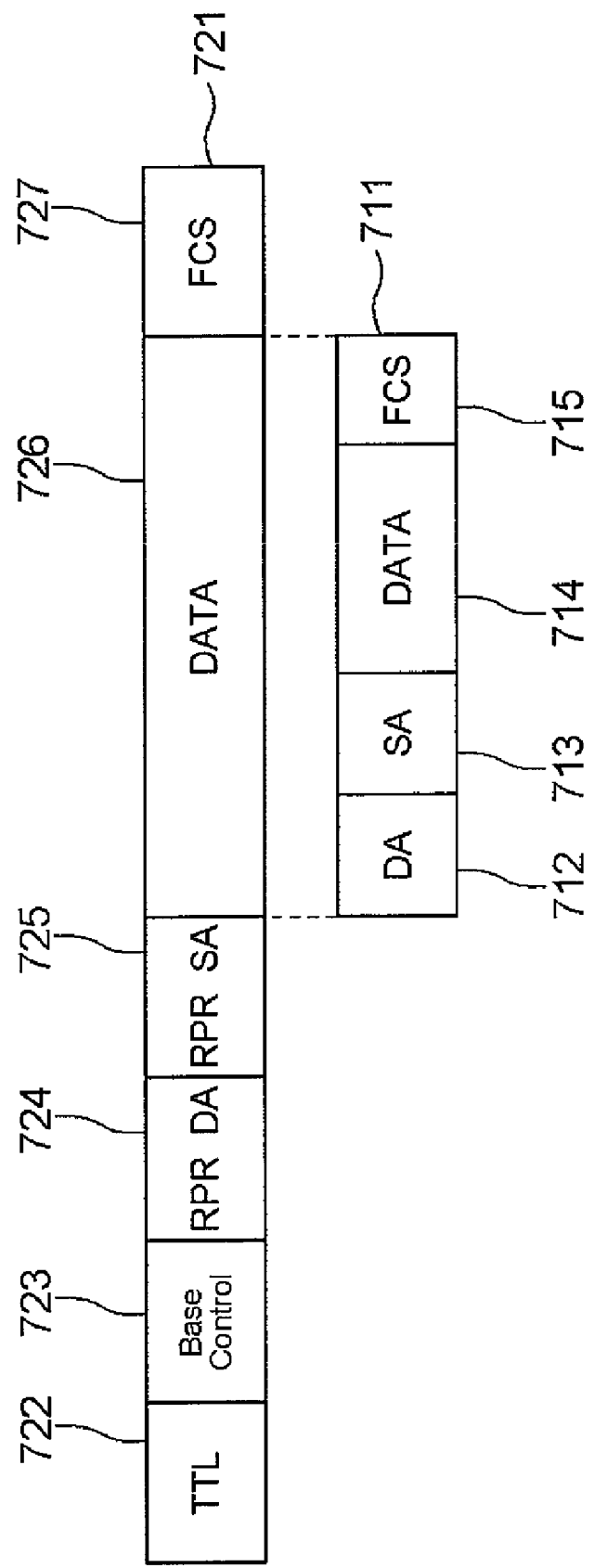
FIG. 38 is an illustration showing an RPR packet format.
Figure 39:
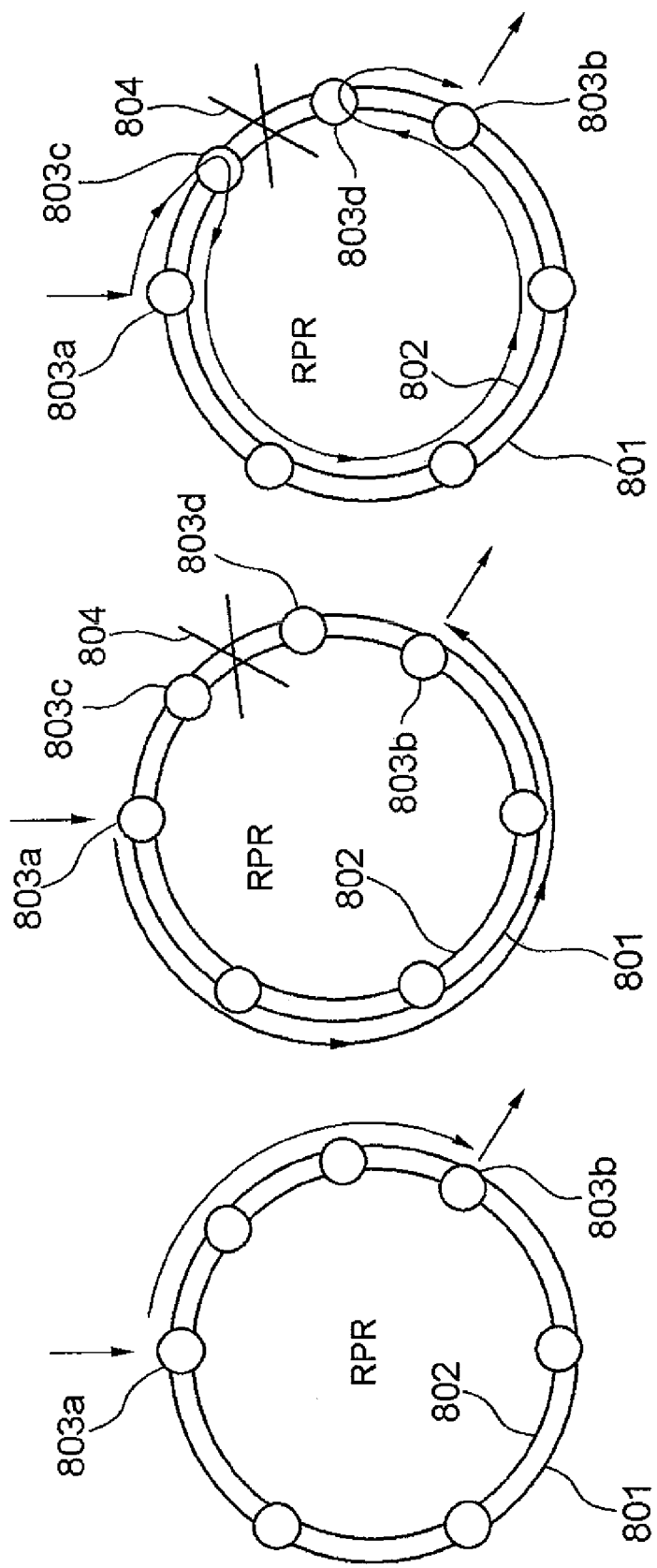
FIG. 39 is an illustration showing a protective operation of RPR.
Figure 40:
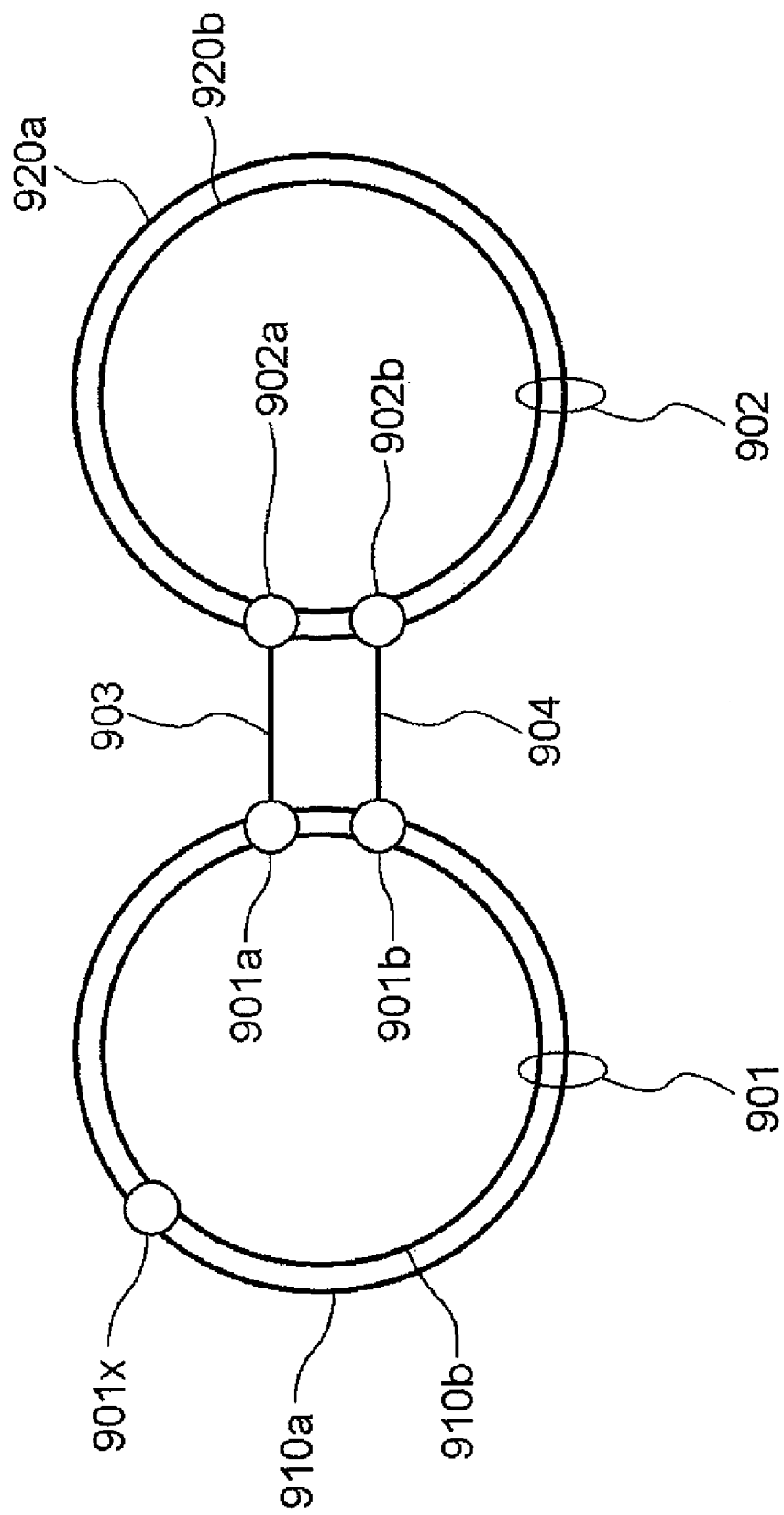
FIG. 40 is an illustration showing an example of a network system in which two rings are connected redundantly.

Further, when each of the inter-ring connecting nodes 101a, 101b, 102a and 102b transmits a broadcast packet (including an unknown unicast packet) to the ring where it belongs due to the fact that a packet is transferred from the other ring where it does not belong, the node uses the RPR MAC address of another inter-ring connecting node included in the pair of inter-ring connecting nodes including the node itself as the RPR MAC SA 725 (see FIG. 38). For example, it is assumed that a user data packet which is a broadcast packet is transmitted from the ring 101 to the inter-ring connecting node 102a via the node 101a and the link 103. The inter-ring connecting node 102a which received the packet uses the RPR MAC address of the other inter-ring connecting node 102b included in the pair of inter-ring connecting nodes, instead of the RPR MAC address of itself, as the RPR MAC SA 725 (see FIG. 38). Then, the inter-ring connecting node 102a transmits a broadcast packet (RPR packet) indicating that the source is the node 102b. In other words, if each of the inter-ring connecting nodes 101a, 101b, 102a and 102b transmits a broadcast packet (including unknown unicast packet) to the ring where it belongs as the source, it transmits the packet by falsifying the source (RPR MAC SA). If each of the inter-ring connecting nodes 101a, 101b, 102a and 102b transmits a unicast packet as the source, it will not falsify the source (RPR MAC SA).

Further, in the case of transferring the packet to the other ring, each of the inter-ring connecting nodes 101a, 101b, 102a and 102b decapsulates the user data packet encapsulated in the RPR packet, and transmits the user data packet to the other ring. The inter-ring connecting node which received the user data packet as a broadcast packet encapsulates the user data packet (broadcast packet), and when setting the RPR MAC SA, performs the falsification. At this time, the RPR MAC DA may be the broadcast address.

Further, when each of the inter-ring connecting nodes 101a, 101b, 102a and 102b receives a unicast packet as the user data packet, whether to perform the falsification or not is determined depending on whether the RPR MAC address corresponding to the MAC DA included in the user data packet being searched from the FDB. If it was searched successfully, the falsification will not be performed, and the RPR MAC SA is set by using the RPR MAC address of the inter-ring connecting node itself. Further, the searched RPR MAC address is set as the RPR MAC DA. If the search was not carried out successfully, the user data packet is encapsulated to thereby generate an unknown unicast packet. Since the unknown unicast packet is one mode of a broadcast packet, the falsification will be performed. At this time, the RPR MAC DA is a broadcast address. As a result, a user terminal (not shown in FIG. 1), in which the address is the MAC DA encapsulated in the unknown unicast packet which was broadcast-transmitted, receives the user data packet encapsulated in the RPR packet. Then, the user terminal replies the packet. When the inter-ring connecting node receives the packet as an RPR packet, it studies the correspondence between the RPR MAC SA in the RPR packet and the MAC SA encapsulated in the RPR packet. As a result, the search will be able to be performed successfully. However, in the first state and in the third state, search for the RPR MAC address corresponding to the MAC DA included in the user data packet will never be failed.

Further, each of the inter-ring connecting nodes 101a, 101b, 102a and 102b detects a failure when the failure occurs in a link connecting it and the other ring, or in an inter-ring connecting node on the other ring connected therewith. When each inter-ring connecting node detects a failure, it transfers the packet transferred from the ring where it belongs to, to the next node directly. In other words, the state becomes an operating state realizing the pass-through transfer function described in Non-Patent Document 2. Hereinafter, this state is referred to as a pass-through transfer mode. For example, the inter-ring connecting node 101a detects a link failure of the link 103 and a node failure of the inter-ring connecting node 102a. Then, the inter-ring connecting node 101a transfers the RPR packet, transferred through the ring 101, to the next node in the ring 101 without performing any processing in the node itself. Note that this operation is not a mandatory operation to enable packet transfer in a plurality of links connecting the rings respectively, while preventing broadcast stream and the like in a normal state.

Further, each of the inter-ring connecting nodes 101a, 101b, 102a and 102b receives not only an RPR packet destined for itself but also an RPR packet destined for the other inter-ring connecting node included in the pair of inter-ring connecting node including the node itself. Then, each of the inter-ring connecting nodes 101a, 101b, 102a and 102b decapsulates the received RPR packet, and transfers the user data packet to the other ring. For example, the inter-ring connecting node 101a receives not only an RPR packet destined for the inter-ring connecting node 101a but also an RPR packet destined for the inter-ring connecting node 101b forming the pair of inter-ring connecting nodes with inter-ring connecting node 101a. In this case, the inter-ring connecting node 101a decapsulates the received RPR packet, and transfers the user data packet to the inter-ring connecting node 102a in the ring 102.

Note that each node (not limited to inter-ring connecting node) performs studying by corresponding the MAC SA 713 (see FIG. 38) encapsulated in the RPR packet with the source RPR MAC SA 725 (see FIG. 38). In other words, the correspondence between the MAC SA and the RPR MAC SA is stored in the FDB. However, such a studying operation will not be caused in the first state.

Further, when a failure occurs in the ring, each of the rings 101 and 102 autonomously starts protective operation. This protective operation may be a steering mode or a lap mode.

Figure 2:
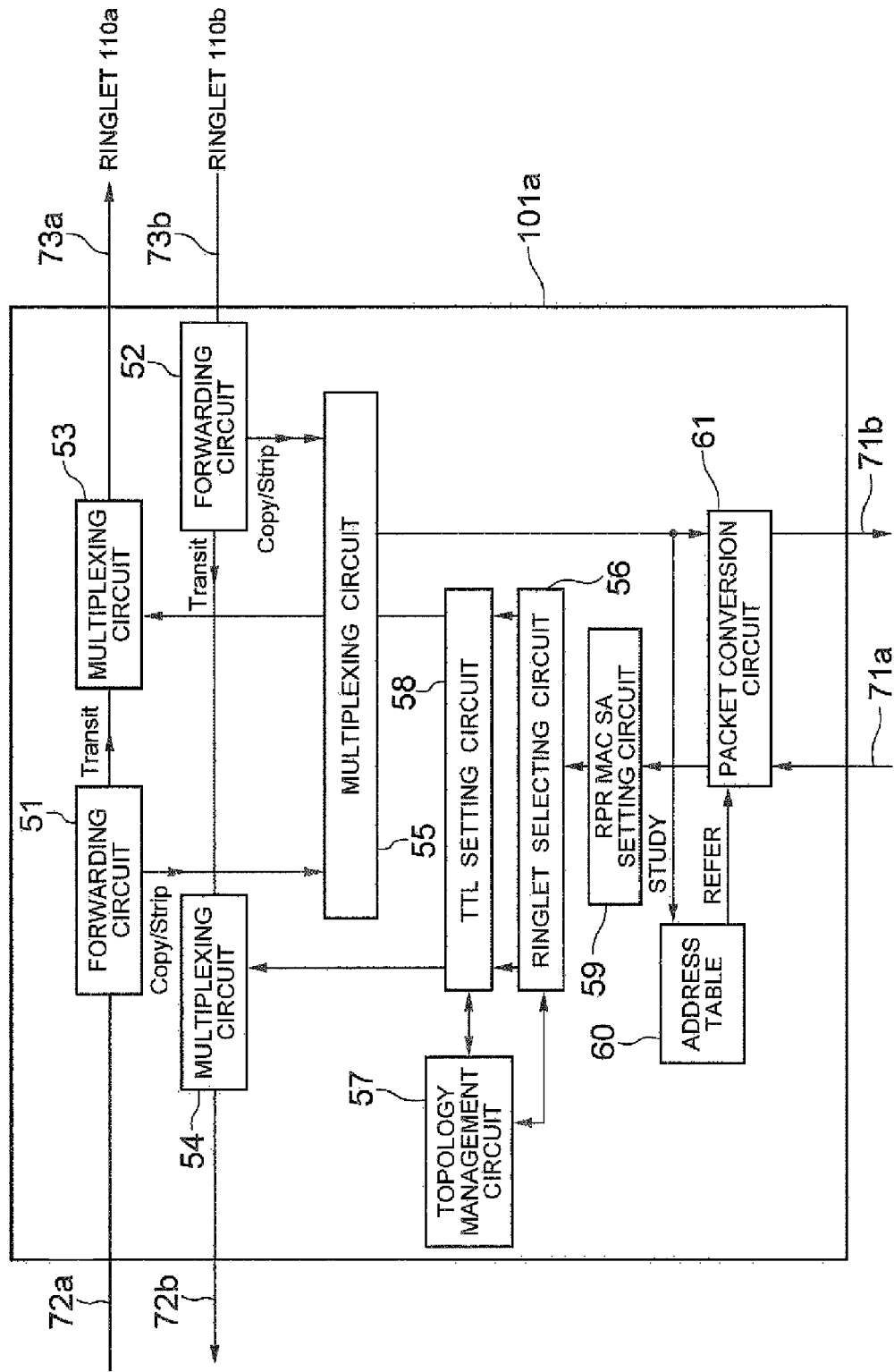
FIG. 2 a block diagram showing an exemplary configuration of an inter-ring connecting node.

FIG. 2 is a block diagram showing an exemplary configuration of an inter-ring connecting node. Although FIG. 2 shows the inter-ring connecting node 101a as an example, the configurations of the inter-ring connecting node 101a, 101b, 102a and 102b are same. As described above, the operation of the pass-through transfer mode is not a mandatory operation to enable packet transfer in a plurality of links connecting the rings respectively, while preventing broadcast stream and the like in a normal state. First, a configuration in the case of not performing the operation of the pass-through transfer mode will be described by using FIG. 2.

The inter-ring connecting node 101a has a forwarding circuit 51 and a multiplexing circuit 53 corresponding to the ringlet 110a, and similarly, has a forwarding circuit 52 and a multiplexing circuit 54 corresponding to the ringlet 110b. The forwarding circuit 51 is connected with the ringlet 110a via a link 72a, and the multiplexing circuit 53 is connected with the ringlet 110a via a link 73a. Further, the forwarding circuit 52 is connected with the ringlet 110b via a link 73b, and the multiplexing circuit 54 is connected with the ringlet 110b via a link 72b.

Further, the client ports 71a and 71b are connected with client ports of the inter-ring connecting node 102a (not shown in FIG. 2) in the other ring, and the interval between client ports of the inter-ring connecting nodes 101a and 102a is the link 103 (see FIG. 1) between the rings.

The forwarding circuits 51 and 52 refer to the RPR MAC DA of the transferred RPR packet. Then, if the RPR MAC DA corresponds to the RPR MAC address of the self node (inter-ring connecting node 101a), or if it corresponds to the RPR MAC address of the inter-ring connecting node 101b forming a pair of inter-ring connecting nodes with the self node, the circuit extracts the RPR packet from the ring 101, and transfers it to the client (in this case, the inter-ring connecting node 102a in the other ring 102). Note that taking out (eliminating) a packet transferred from a ringlet from the ring and transferring it to a client is called "strip".

Note that the RPR MAC address of the self node and the RPR MAC address of the inter-ring connecting node forming a pair of inter-ring connecting node with the self node may be stored in the forwarding circuits 51 and 52 for example. Further, the RPR MAC address may be stored in a storage device (not shown) provided to the inter-ring connecting node.

Further, if the transferred RPR packet is a broadcast packet, the forwarding circuits 51 and 52 transfer the broadcast packet to the client, and also transfer to the ringlet. Note that transferring a packet, transferred from a ringlet, to the ringlet is called "transit". Further, transferring a packet transferred from a ringlet to the ringlet and also transferring it to a client is called "copy".

If the transferred RPR packet does not corresponds to any one of the above, the forwarding circuits 51 and 52 transmit the transferred packet to the same ringlet (transit).

A multiplexing circuit 55 multiplies packets transferred from each ringlet (each forwarding circuit 51 or 52) to a client.

An address table 60 stores the MAC address of the user terminal and the RPR MAC address of a node in the ring by associating them with each other. The address table 60 works as an FDB.

A packet conversion circuit 61 receives a packet to be transferred from each ringlet (each forwarding circuit 51, 52) to a client. The packet conversion circuit 61 receives a packet in an RPR packet state, and extracts the user data packet from the RPR packet (that is, decapsulates). The packet conversion circuit 61 transfers the user data packet to the client port 71*b*. Further, the packet conversion circuit 61 studies the corresponding relationship between the RPR MAC SA of the received RPR packet and the MAC SA of the user data packet taken out, and stores it in the address table 60. Note that the MAC SA in the user data packet taken out is the MAC address of the user terminal (not shown in FIGS. 1 and 2) transmitting the user data packet. However, such a studying operation will not be caused in the first state.

Further, the packet conversion circuit 61 receives a user data packet from the other ring via the client port 71*a*. At this time, the packet conversion circuit 61 refers to the address table 60 to thereby search for the RPR MAC address corresponding to the MAC DA of the received user data packet. If there is an entry (that is, if the search is performed successfully), the packet conversion circuit 61 encapsulates the user data packet while setting the searched RPR MAC address as the RPR MAC DA.

If there is no entry (that is, if the search is not performed successfully), the packet conversion circuit 61 encapsulates the user data packet while setting the broadcast address as the RPR MAC DA (in this case, an unknown unicast packet is generated). The packet conversion circuit 61 sets the RPR MAC DA to thereby output the encapsulated packet to an RPR MAC SA setting circuit 59. However, in the first state and in the third state, search will never be performed unsuccessfully.

The RPR MAC SA setting circuit 59 sets the RPR MAC SA of the packet transmitted from the packet conversion circuit 61. At this time, if the RPR MAC SA setting circuit 59 transmits the broadcast packet (including the unknown unicast packet) as an RPR packet from the self node, it sets the RPR MAC address of the other node (in this example, the inter-ring connecting node 101*b*) included in a pair of inter-ring connecting node including the self node (in this example, the inter-ring connecting node 101*a*), as the RPR MAC SA. The MAC address of the other node included in the pair of inter-ring connecting nodes including the self node may be stored in the RPR MAC SA setting circuit 59 for example. Further, the RPR MAC address may be stored in a storage device (not shown) provided to the inter-ring connecting node for example. Further, if the RPR MAC SA setting circuit 59 transmits a unicast packet as an RPR packet from the self node, it sets the RPR MAC address of the self node (in this example, the inter-ring connecting node 101*a*) as the RPR MAC SA. The RPR MAC SA setting circuit 59 outputs the packet in which the RPR MAC SA is set, to a ringlet selecting circuit 56.

If the packet transmitted from the RPR MAC SA setting circuit 59 is a unicast packet, the ringlet selecting circuit 56 refers to a topology management circuit 57, selects a ringlet enabling arrival at the destination node with the minimum path, and outputs the packet to a TTL setting circuit 58.

Further, if the packet transmitted from the RPR MAC SA setting circuit 59 is a broadcast packet (including the unknown unicast packet), the ringlet selecting circuit 56 selects a ringlet according to the predetermined transfer method. In the present exemplary embodiment, if it starts transmitting of the broadcast packet to the ring where it belongs as the source, it performs bidirectional flooding. Therefore, the ringlet selecting circuit 56 selects both of the two ringlets, and outputs the packet to the TTL setting circuit 58.

The topology management circuit 57 stores and manages the RPR MAC addresses of respective nodes aligned in a clockwise direction in the ring including the self node (in this example, the inter-ring connecting node 101*b*) and the RPR MAC addresses of respective nodes aligned in a counter-clockwise direction.

The TTL setting circuit 58 sets a TTL to the packet transferred from the ringlet selecting circuit 56. At this time, the TTL setting circuit 58 refers to the topology management circuit 57, and if it is a unicast packet, sets the number of hops from the self node to the destination node as the TTL value. In the case of a broadcast packet, the TTL value is set in such a manner as not to cause multiple arrivals and no arrival of the packet in the ring. If the ring has not been moved to the protective operation, it is only necessary to set the TTL value such that the broadcast packet will arrive at a node immediately before the link predetermined as the cleave point. Further, if the ring has already moved to the protective operation, it is only necessary to set the TTL value such that the broadcast packet will arrive at a node immediately before the failure generated position. Note that the broadcast packet is flooded bidirectionally, so the TTL values may be set corresponding to the transfer directions, respectively. The respective TTL values corresponding to the transfer directions may be different. The TTL setting circuit 58 outputs the packet to which the TTL value is set to a multiplying circuit (the multiplying circuit 53 or the multiplying circuit 54) corresponding to the ringlet selected by the ringlet selecting circuit 56. If the both ringlets are selected by the ringlet selecting circuit 56, the TTL setting circuit 58 outputs the packet to both of the multiplexing circuit 53 and the multiplexing circuit 54.

The multiplexing circuit 53 multiplexes the packet from the client (packet output from the TTL setting circuit 58) and the packet from the ring (packet output from the forwarding circuit 51) and transmits to the ringlet 110*a*. Similarly, the multiplexing circuit 54 multiplexes the packet from the client (packet output from the TTL setting circuit 58) and a packet from the ring (packet output from the forwarding circuit 52) and transmits to the ringlet 110*b*.

Figure 3:
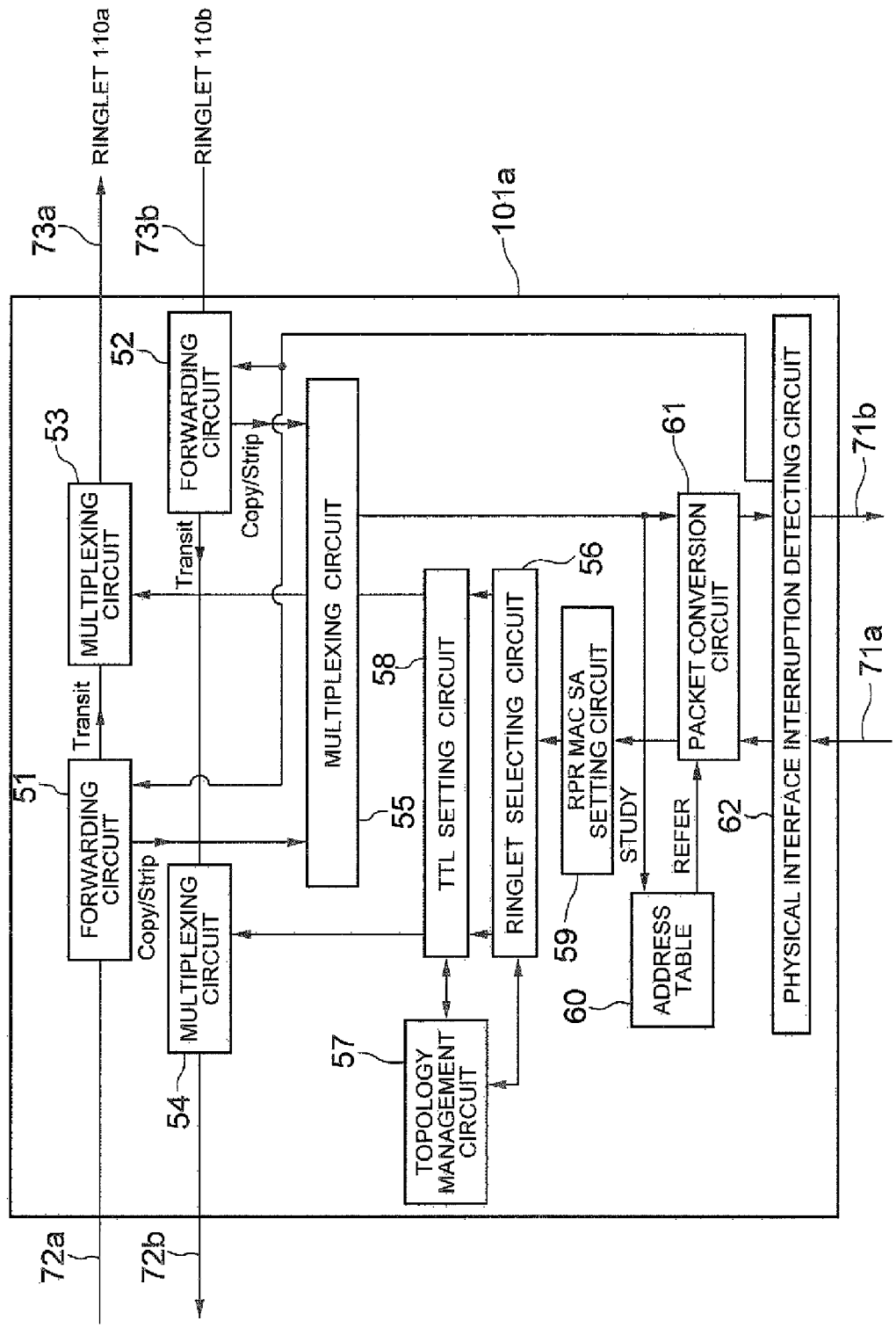
FIG. 3 is a block diagram showing another exemplary configuration of an inter-ring connecting node.

Next, a configuration in the case of also performing a pass-through transfer mode will be described. FIG. 3 is a block diagram showing an exemplary configuration of an inter-ring connecting node in this case. The same components as those in FIG. 2 are denoted by the same reference numerals as FIG. 2, and are not described.

A physical interface interruption detecting circuit 62 detects a failure when a failure occurs in the link linking the self node and the other ring, or in the inter-ring connecting node of the other ring connected with the self node. In a normal state, each link in the packet ring network system always transmits light irrespective of packet transfer being performed or not. When a failure occurs in a link, the link will not transmit a light any more. Further, if a failure occurs in a node, the links linking the nodes will not transmit light any more. Therefore, when the physical interface interruption detecting circuit 62 detects that light from the link linking the self node and the other ring is interrupted, the circuit may judges that a failure occurs in the link or in an inter-ring connecting node in the other ring connected with the self node. When the physical interface interruption detecting circuit 62 detects the failure, it notifies the forwarding circuits 51 and 52 of the failure. Upon receiving the notification, the forwarding circuits 51 and 52 move to the pass-through transfer mode. That is, in this case, the forwarding circuits 51 and 52 transfer the packet transferred from the ring to which the self node belongs to the next node directly.

Next, operation will be described.

The operation of the packet ring network system according to the present invention will be described by using the sequence charts shown in FIGS. 4 to 7. Note that in FIGS. 4 to 7, the blocks shown by the solid lines indicate processing relating to packet transfer in a ring. The blocks shown by the broken lines indicate processing relating to transfer between clients (interlink), that is, packet transfer from one ring to the other ring. Further, the blocks shown by the dotted lines indicate processing relating to packet transfer at the time of failure. In FIGS. 4 to 7, [a] indicates transmission on the ringlet 110a or on the ringlet 120a. Similarly, [b] indicates transmission on the ringlet 110b or on the ringlet 120b.

Further, in the sequence charts shown in FIGS. 4 to 7, description is given based on the premise that the RPR MAC addresses of the inter-ring connecting nodes 101a, 101b, 102a and 102b are "101a", "101b", "102a" and "102b". The inter-ring connecting nodes 101a and 101b receive packets including the RPR MAC DA of "101a" and "101b" as packets destined for them, respectively. Similarly, the inter-ring connecting nodes 102a and 102b receive packet including the RPR MAC DA of "102a" and "102b" as packets destined for them, respectively. Further, in the sequence charts shown in FIGS. 4 to 7, a broadcast packet is described as "BC packet", and a unicast packet is described as "UC packet".

Note that the operation that "the inter-ring connecting node 101a and 101b receives packets including the RPR MAC DA of "101a" and "101b" as packets destined for them respectively" is an operation, when a failure occurs so that a packet cannot be transferred from the inter-ring connecting node 101a to the other ring for example, for causing the inter-ring connecting node 101b to receive the packet so as to enable the packet to be transferred to the other ring. In this case, even if the inter-ring connecting node 101b receives a packet destined for the inter-ring connecting node 101a when there is no failure, no problem will be caused. This is because the inter-ring connecting nodes 101a and 101b are nodes for transmitting/receiving a packet with the other ring respectively, and the inter-ring connecting nodes 101a and 101b perform the same operation of decapsulating a unicast packet received from a ringlet and transfer it to the other ring. Further, the present exemplary embodiment is based on the premise that it is in any of the first to third states, so the node which receives a packet decapsulated from the unicast packet can specify the RPR MAC address which is to be the transfer destination of the packet. Therefore, the packet can arrive at the desired destination. Similarly, for the operation that "the inter-ring connecting nodes 102a and 102b receive packets including the RPR MAC DA of "102a" and "102b" as packets destined for the self nodes respectively", no problem will be caused.

Further, in the descriptions of FIGS. 4 to 7, it is assumed that the ringlets 110a and 120a transfer packets in a clockwise direction, and the ringlets 110b and 120b transfer packets in a counterclockwise direction.

Figure 4:
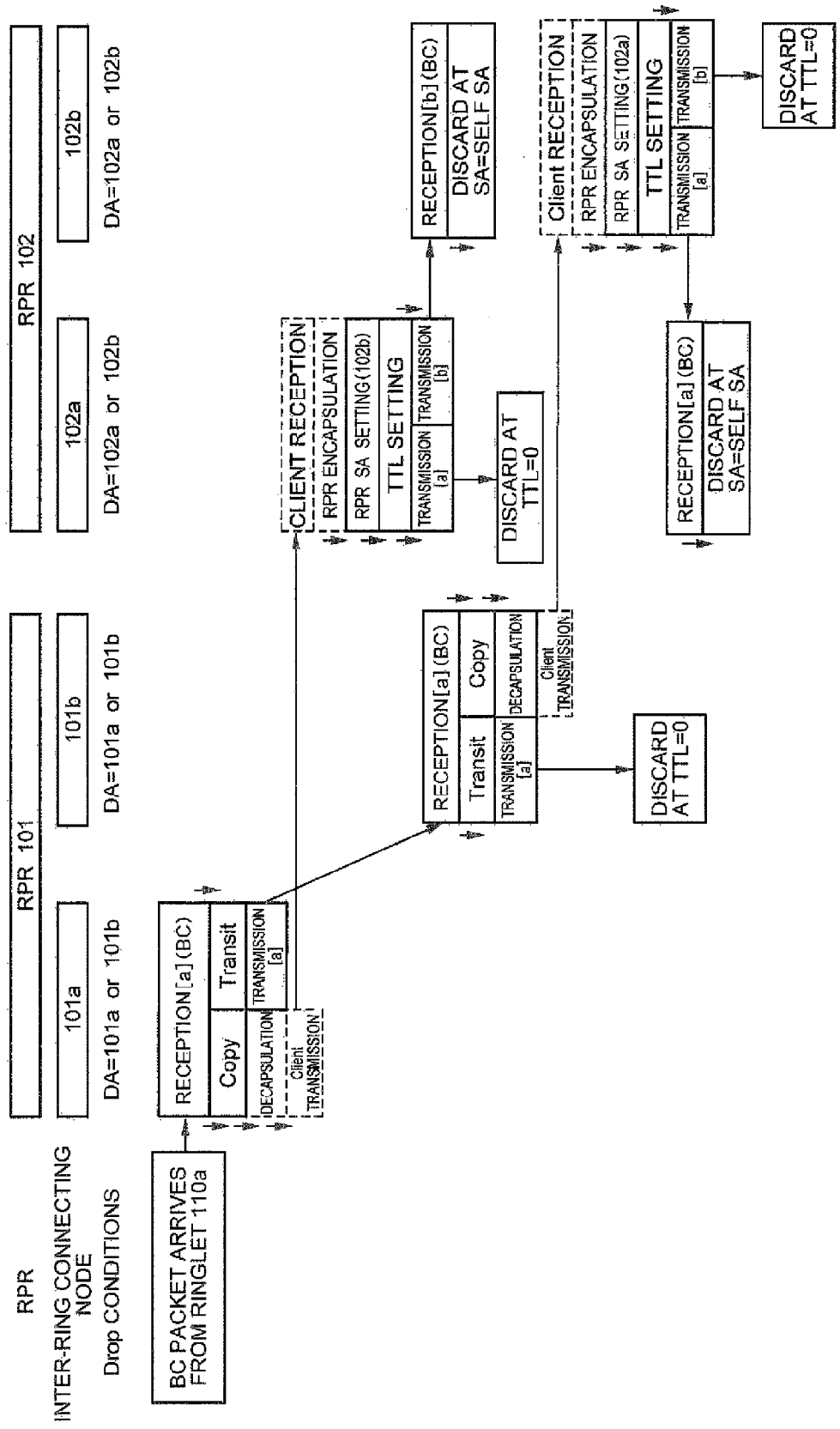
FIG. 4 is a sequence chart showing an exemplary operation of an inter-ring connecting node transmitting a broadcast packet in a normal state.

FIG. 4 is a sequence chart showing an exemplary operation that an inter-ring connecting node transfers a broadcast packet in a normal state. In the description of the operation shown in FIG. 4, the configurations of the inter-ring connecting nodes 101a, 101b, 102a and 102b are assumed to be that shown in FIG. 2. However, the configuration may be one shown in FIG. 3. Assuming that the inter-ring connecting node 101a receives a broadcast packet from the ringlet 110a, the inter-ring connecting node 101a transmits the broadcast packet transferred from the ringlet 110a to the next node (inter-ring connecting node 101b) in the ringlet 110a (transit). Further, the inter-ring connecting node 101a transfers the broadcast packet to the client (in this case, inter-ring connecting node 102a) (copy). At this time, the inter-ring connecting node 101a extracts the user data packet from the broadcast packet (decapsulation), and transmits the user data packet to the client.

The inter-ring connecting node 101b receives the broadcast packet from the inter-ring connecting node 101a. Then, the inter-ring connecting node 101b transmits the broadcast packet to the next node in the ringlet 110a (transit). Further, the inter-ring connecting node 101b transfers the broadcast packet to the client (in this case, inter-ring connecting node 102b) (copy). At this time, the inter-ring connecting node 101b extracts the user data packet from the broadcast packet (decapsulation), and transmits the user data packet to the client.

In the broadcast packet transmitted from the inter-ring connecting node 101b to the ringlet 110a, the TTL value decrements at respective nodes, and when the TTL value becomes 0, it is discarded.

The user data packet that the inter-ring connecting nodes 101a and 101b transmitted to the client is a user data packet destined for the broadcast address.

When the inter-ring connecting node 102a receives the user data packet from the inter-ring connecting node 101a, it encapsulates the user data packet with the broadcast address being set as the RPR MAC DA. Further, the inter-ring connecting node 102a sets the RPR MAC address "102b" of the inter-ring connecting node 102b which forms the pair of inter-ring connecting nodes as the RPR MAC SA. Further, it sets the TTL value such that the broadcast packet will be discarded immediately before the cleave point. The inter-ring connecting node 102a transfers the broadcast packet, in which the TTL value is set, to the ringlets 120a and 120b respectively.

In the broadcast packet transferred from the inter-ring connecting node 102a to the ringlet 120a, the TTL value decrements at respective nodes, and when the TTL value becomes 0, it is discarded. Accordingly, the broadcast packet is discarded at a node immediately before the cleave point in the transfer direction of the ringlet 120a. As a result, the broadcast packet is transferred from the inter-ring connecting node 102a to the node immediately before the cleave point in the transfer direction of the ringlet 120a.

The broadcast packet transferred from the inter-ring connecting node 102a to the ringlet 120b is received by the inter-ring connecting node 102b. The RPR MAC SA of this broadcast packet is set to "102b". Accordingly, the inter-ring connecting node 102b judges that it receives a broadcast packet in which the source is itself, so it discards the broadcast packet. Therefore, the broadcast packet transferred from the inter-ring connecting node 102a to the ringlet 120b will not be transferred to a node beyond the inter-ring connecting node 102b.

When the inter-ring connecting node 102b receives the user data packet from the inter-ring connecting node 101b, it encapsulates the user data packet while setting the broadcast address as the RPR MAC DA. Further, the inter-ring connecting node 102b sets the RPR MAC address "102a" of the inter-ring connecting node 102a forming a pair of inter-ring connecting nodes as RPR MAC SA. Further, it sets the TTL value such that the broadcast packet will be discarded as a node immediately before the cleave point. The inter-ring connecting node 102b transfers the broadcast packet, in which the TTL value is set, to the ringlets 120a and 120b respectively.

In the broadcast packet transferred from the inter-ring connecting node 102b to the ringlet 120b, the TTL value decrements at each node, and it is discarded when the TTL value becomes 0. The TTL value is so set as to become 0 at a node immediately before the cleave point. Accordingly, the broadcast packet is discarded at a node immediately before the cleave point in the transfer direction of the ringlet 120b. As a result, the broadcast packet is transferred from the inter-ring connecting node 102b to the node immediately before the cleave point in the transfer direction of the ringlet 120b.

The broadcast packet transferred from the inter-ring connecting node 102b to the ringlet 120a is received by the inter-ring connecting node 102a. The RPR MA SA of this broadcast packet is set to "102a". Accordingly, the inter-ring connecting node 102a judges that it receives a broadcast packet that the source is itself, so the node discards the broadcast packet. Consequently, the broadcast packet transferred from the inter-ring connecting node 102b to the ringlet 120a will not be transferred to a node beyond the inter-ring connecting node 102a.

As described above, it is assumed that the inter-ring connecting nodes 101a and 101b in the ring 101 transmit broadcast packets to the inter-ring connecting nodes 102a and 102b in the ring 102. In this case, the broadcast packet from the inter-ring connecting node 102a is transferred from the inter-ring connecting node 102a to each node up to the cleave point in the transfer direction of the ringlet 120a. Similarly, the broadcast packet from the inter-ring connecting node 102b is transferred from the inter-ring connecting node 102b to each node up to the cleave point in the transfer direction of the ringlet 120b. The broadcast packets will not be transferred beyond the cleave point. Accordingly, multiple receptions of broadcast packets or broadcast stream can be prevented. Further, in the normal state where no failure has occurred, it is possible to perform packet transfer between the rings by using both of the links 103 and 104 connecting the rings 101 and 102. As a result, transfer efficiency of unicast packet between the rings can be improved.

Figure 5:
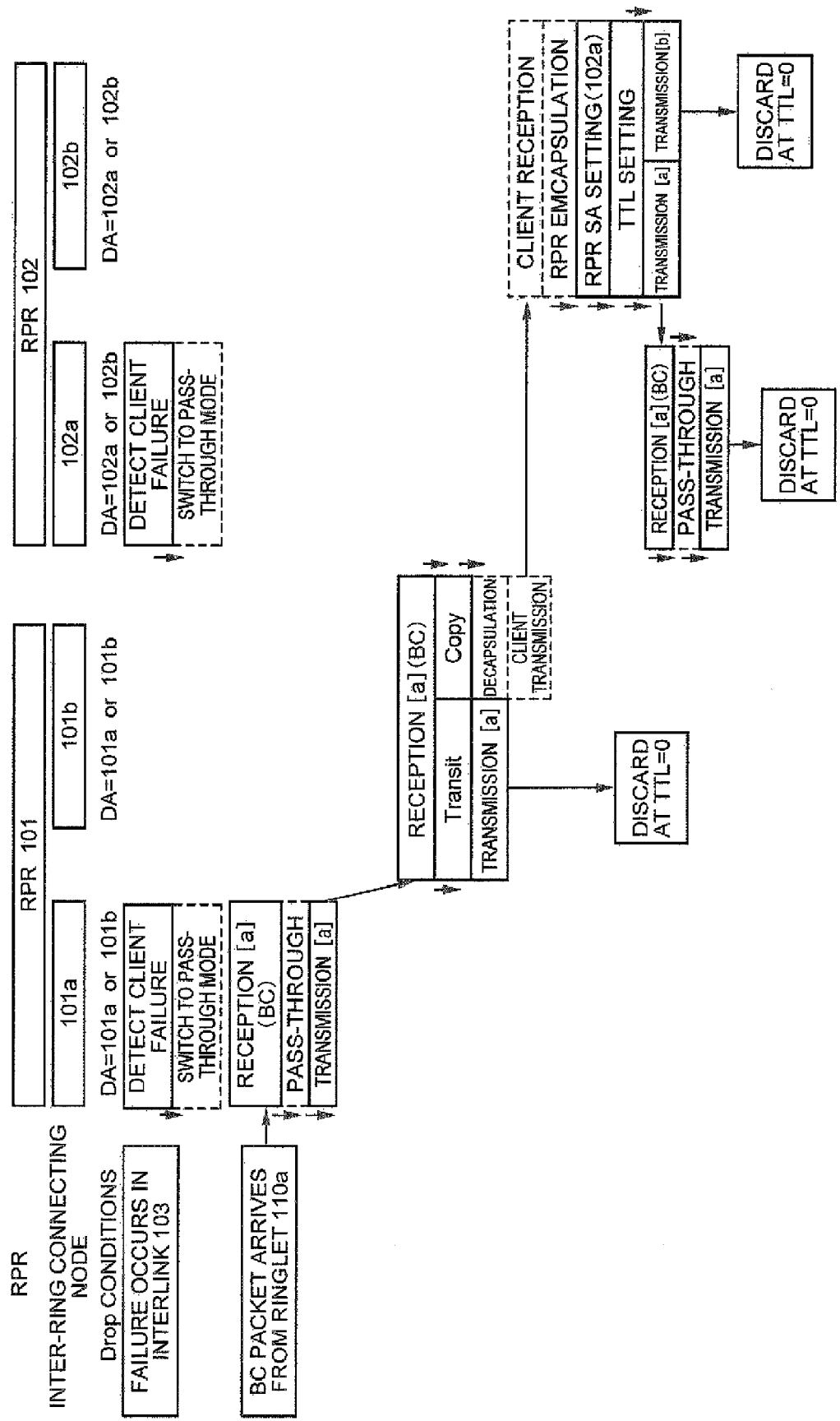
FIG. 5 is a sequence chart showing an exemplary operation of an inter-ring connecting node transferring a broadcast packet when a failure occurs.

FIG. 5 is a sequence chart showing an exemplary operation that an inter-ring connecting node transfers a broadcast packet when a failure occurs. Assuming that a failure occurs in the link 103 linking the inter-ring connecting nodes 101a and 102a, the inter-ring connecting nodes 101a and 102a detect the failure being in the link 103, and the mode thereof is switched to the pass-through transfer mode. Note that in the descriptions of the operations shown in FIGS. 6 and 7 described later, the configurations of the inter-ring connecting nodes 101a, 101b, 102a and 102b are assumed to be that shown in FIG. 3.

It is assumed that the inter-ring connecting node 101a receives a broadcast packet from the ringlet 110a. Since the mode of the inter-ring connecting node 101a is switched to the pass-through transfer mode, the node directly transfers the received broadcast packet to the next node (inter-ring connecting node 101b) in the ringlet 110a.

The inter-ring connecting node 101b receives the broadcast packet from the inter-ring connecting node 101a. Then, the inter-ring connecting node 101b transfers the broadcast packet to the next node in the ringlet 110a (Transit). Further, the inter-ring connecting node 101b also transfers the broadcast packet to the client (in this case, inter-ring connecting node 102b) (copy). At this time, the inter-ring connecting node 101b extracts the user data packet from the broadcast packet (decapsulation), and transmits the user data packet to the client.

In the broadcast packet transferred from the inter-ring connecting node 101b to the ringlet 110a, the TTL value decrements at each node, and when the TTL value becomes 0, the packet is discarded.

The user data packet transmitted by the inter-ring connecting node 101b to the client is a user data packet in which the broadcast address is the destination.

When the inter-ring connecting node 102b receives the user data packet from the inter-ring connecting node 101b, it encapsulates the user data packet while setting the broadcast address as the RPR MAC DA. Further, the inter-ring connecting node 102b sets the RPR MAC address "102a" of the inter-ring connecting node 102a which is to be the pair of inter-ring connecting nodes as the RPR MAC SA. Further, the node sets the TTL value such that the broadcast packet is to be discarded at a node immediately before the cleave point. The inter-ring connecting node 102b transfers the broadcast packet, in which the TTL value is set, to the ringlets 120a and 120b, respectively.

In the broadcast packet transferred from the inter-ring connecting node 102b to the ringlet 120b, the TTL value decrements at each node, and the packet is discarded when the TTL value becomes 0. The TTL value is so set as to become 0 at a node immediately before the cleave point. Accordingly, the broadcast packet is discarded at a node immediately before the cleave point in the transfer direction of the ringlet 120b. Consequently, the broadcast packet is transferred from the inter-ring connecting node 102b to the node immediately before the cleave point in the transfer direction of the ringlet 120b.

The broadcast packet transferred from the inter-ring connecting node 102b to the ringlet 120a is received by the inter-ring connecting node 102a. At this time, the inter-ring connecting node 102a is in the pass-through transfer mode. Therefore, the inter-ring connecting node 102a directly transfers the packet to the next node in the ringlet 120a even if it is the packet in which the RPR MAC SA is the RPR MAC address "101a" of itself. In this broadcast packet, the TTL value decrements at each node, and the packet is discarded when the TTL value becomes 0. The TTL value is so set as to become 0 at a node immediately before the cleave point. Accordingly, the broadcast packet is discarded at the node immediately before the cleave point in the transfer direction of the ringlet 120a. Consequently, the broadcast packet is transferred from the inter-ring connecting node 102b to the node immediately before the cleave point in the transfer direction of the ringlet 120a.

As described above, the broadcast packet from the inter-ring connecting node 102b is transferred to each node from the inter-ring connecting node 102b to the cleave point in the transfer direction of the ringlet 120b. Further, different from the operation in the normal state, the inter-ring connecting node 102a transfers the received packet to the next node. Accordingly, the broadcast packet from the inter-ring connecting node 102b is also transferred to each node from the inter-ring connecting node 102b to the cleave point in the transfer direction of the ringlet 120a, and the broadcast packet will not be transferred beyond the cleave point. Therefore, multiple reception of broadcast packets and broadcast stream can be prevented.

Figure 6:
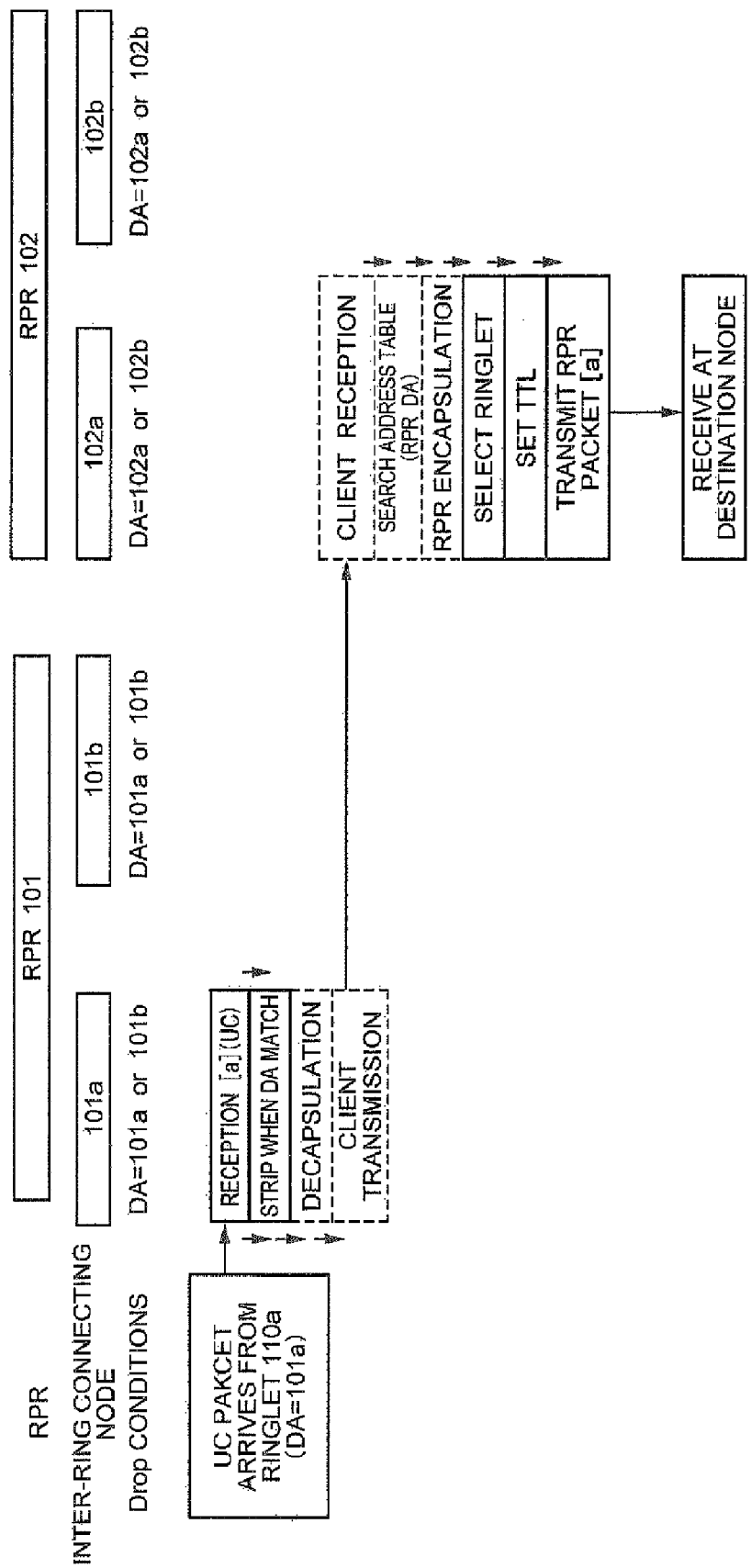
FIG. 6 is a sequence chart showing an exemplary operation of an inter-ring connecting node transferring a unicast packet in a normal state.

FIG. 6 is a sequence chart showing an exemplary operation of an inter-ring connecting node transferring a unicast packet in a normal state. It is assumed that a unicast packet in which the RPR MAC DA is "101a" is transferred in a direction of the ringlet 110a, and received by the inter-ring connecting node 101a. Since the RPR MC DA of the received unicast packet coincides with the RPR MAC address "101a" of the inter-ring connecting node 101a, the inter-ring connecting node 101a determines that the packet is destined for itself. Then, the inter-ring connecting node 101a extracts the unicast packet, transferred from the ringlet 110a, from the ring 101, and transfers it to the client (in this case, inter-ring connecting node 102a) (Strip). At this time, the inter-ring connecting node 101a extracts the user data packet from the unicast packet (decapsulation), and transmits the user data packet to the client.

When the inter-ring connecting node 102a receives the user data packet from the inter-ring connecting node 101a, it searches the FDB (specifically, the address table 60 shown in FIG. 3) for the RPR MAC address corresponding to the MAC DA included in the user data packet. The inter-ring connecting node 102a encapsulates the user data packet while setting the searched RPR MAC address to be the RPR MAC DA. With the RPR MAC DA being set, the node which is to be the destination is set. The inter-ring connecting node 102a selects a ringlet in which the path to the destination node is shorter. Further, the inter-ring connecting node 102a sets the number of hops from the self node to the destination node as the TTL value, and transmits the RPR packet to the selected ringlet.

When the node set as the destination receives the RPR packet, it determines that it received the packet destined for itself since the RPR MAC DA coincides with the RPR MAC address of the self node.

Figure 7:
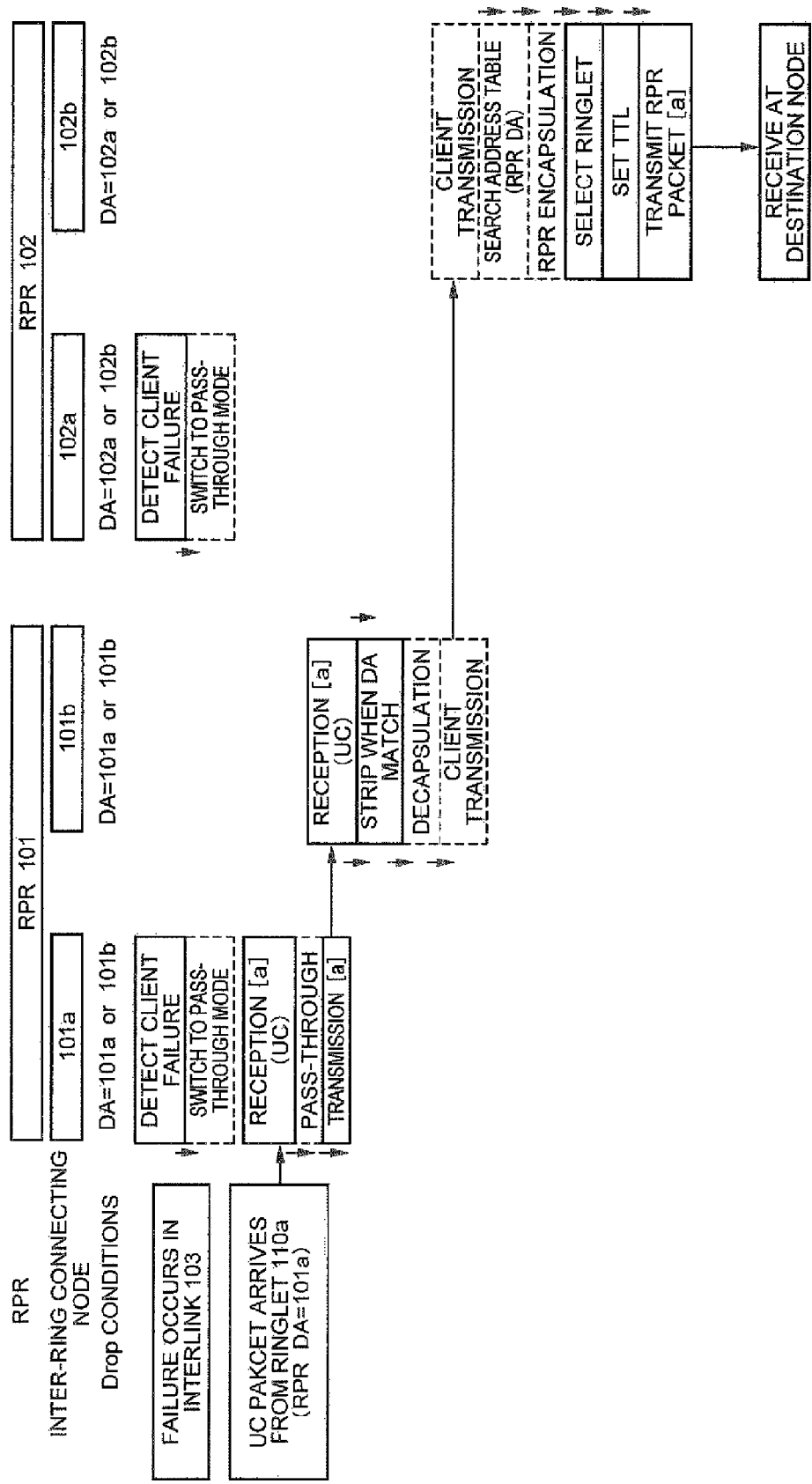
FIG. 7 is a sequence chart showing an exemplary operation of an inter-ring connecting node transferring a unicast packet when a failure occurs.

FIG. 7 is a sequence chart showing an exemplary operation that an inter-ring connecting node transfers a unicast packet when a failure occurs. Assuming that a failure occurs in the link 103 linking the inter-ring connecting nodes 101a and 102a, each of the inter-ring connecting nodes 101a and 102a detects that a failure occurs in the ring 103, and the mode thereof is switched to the pass-through transfer mode.

It is assumed that a unicast packet in which the RPR MAC DA is "101a" is transferred in a direction of the ringlet 110a, and the inter-ring connecting node 101a receives the unicast packet. Since the inter-ring connecting node 101a is switched to the pass-through transfer mode, it transfers the received unicast packet to the next node (inter-ring connecting node 101b) in the ringlet 110a directly.

The inter-ring connecting node 101b receives not only the RPR packet destined for itself but also an RPR packet destined for another inter-ring connecting node included in the pair of inter-ring connecting nodes including itself. Accordingly, the inter-ring connecting node 101b receives a unicast packet in which the RPR MAC DA is "101a". Then, the inter-ring connecting node 101b extracts the unicast packet transferred from the ringlet 110a from the ring 101, and transfers it to the client (in this case, the inter-ring connecting node 102b) (strip). At this time, the inter-ring connecting node 101b extracts the user data packet from the unicast packet (decapsulation), and transmits the user data packet to the client.

When no failure occurs, the unicast packet in this example is transferred to a prescribed node via the inter-ring connecting nodes 101a and 102a. The present exemplary embodiment is based on the premise that it is in any one of the first to third states. Accordingly, the study contents of the address tables 60 in the inter-ring connecting nodes 102a and 102b are same respectively, and the inter-ring connecting node 102b is able to successfully search for the RPR MAC address same as the case of the inter-ring connecting node 102a.

When the inter-ring connecting node 102b receives a user data packet from the inter-ring connecting node 101b, the inter-ring connecting node 102b searches the FDB (address table 60) for the RPR MAC address corresponding to the MAC DA included in the user data packet. The inter-ring connecting node 102b encapsulates the user data packet while setting the searched RPR MAC address to be the RPR MAC DA. With the RPR MAC DA being set, the destination node is set. The inter-ring connecting node 102b selects a ringlet in which the path to the destination node is shorter. Further, the inter-ring connecting node 102b sets the number of hops from the self node to the destination node as the TTL value, and transmits the RPR packet to the selected ringlet.

When the destination node receives the RPR packet, the node determines that it received the packet destined for itself since the RPR MAC DA coincides with the RPR MAC address of the self node.

As described above, the inter-ring connecting node in which packet transfer cannot be performed between the rings is switched to the pass-through transfer mode, and transfers the received packet to the next node. Further, the inter-ring connecting node receives not only the RPR packet destined for itself but also an RPR packet destined for the other inter-ring connecting node included in the pair of inter-ring connecting nodes including itself, and transfers the packet to the other ring. Accordingly, even when there is a link with which packet transfer cannot be performed between the rings, it is possible to perform packet transfer by using the other link to thereby realize failure recovery at a high speed. Further, an operation such as eliminating the MAC address of the node which was active before from the FDB is not required, so a failure recovery can be performed at a high speed.

Next, the operation of the present invention will be described with reference to the drawings showing a ring.

Figure 8:
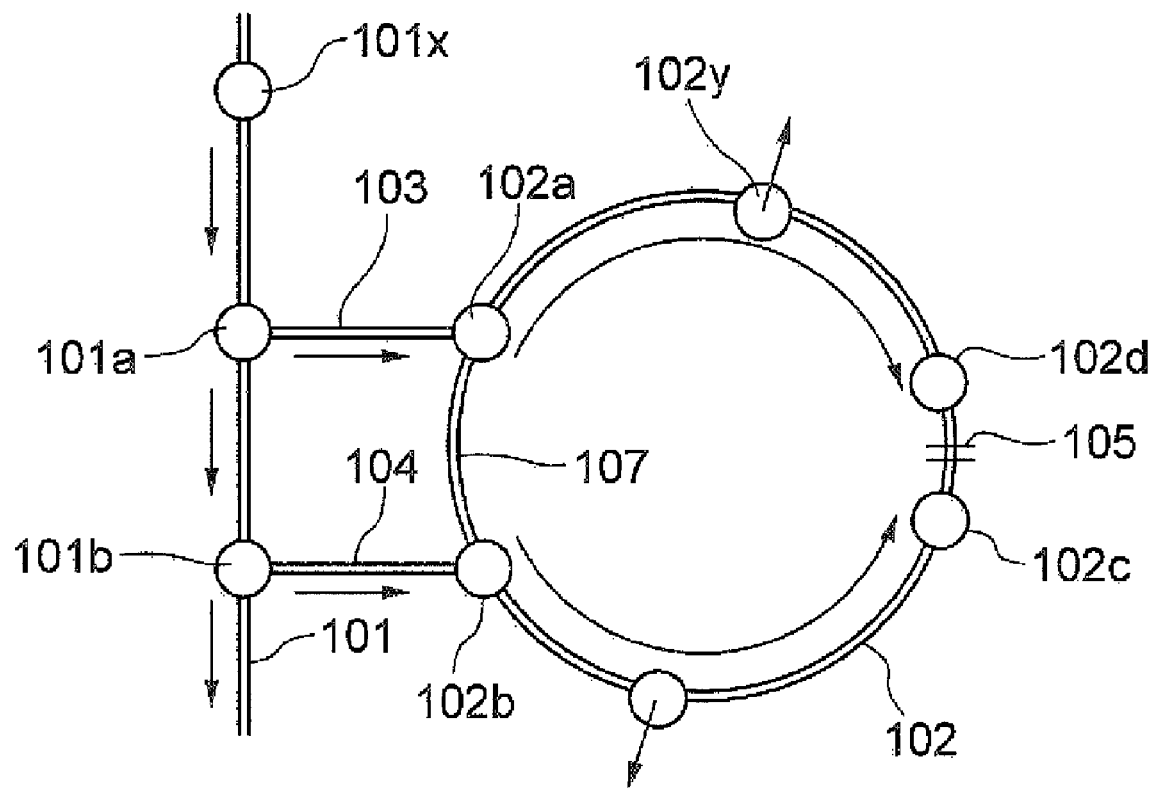
FIG. 8 is an illustration showing a state where a broadcast packet is transferred from one ring to another ring in a normal state.

FIG. 8 is an illustration showing a state where a broadcast packet is transferred from a ring to another ring in a normal state. Referring to FIG. 8, an operation in which a broadcast packet is transmitted from a node 101x on the ring 101 and transferred from the ring 101 to the ring 102 will be described. In FIG. 8, the path of the broadcast packet is indicated with arrows of solid lines. Note that in the description of the operation shown in FIG. 8, the configuration of each of the inter-ring connecting nodes 101a, 101b, 102a and 102b is assumed to be the configuration shown in FIG. 2. However, it may be the configuration shown in FIG. 3.

When the node 101x transfers a broadcast packet, first the inter-ring connecting node 101a, of the inter-ring connecting nodes 101a and 101b forming a pair of the inter-ring connecting nodes on the ring 101, receives the broadcast packet. The inter-ring connecting node 101a transfers the broadcast packet to the next node, or the inter-ring connecting node 101b. Further, the inter-ring connecting node 101a decapsulates the broadcast packet, and transfers a user data packet, in which the MAC SA is the broadcast address, to the inter-ring connecting node 102a via the link 103.

Similarly, the inter-ring connecting node 101b transfers the received broadcast packet to the next node. Further, the inter-ring connecting node 101b decapsulates the broadcast packet, and transfers the user data packet in which the MAC SA is the broadcast address to the inter-ring connecting node 102b via the link 104.

The inter-ring connecting nodes 102a and 102b in the ring 102 store the positional information of the cleave point set in advance. Note that the cleave point 105 may be a link other than the inter-ring connecting node 107 in the links in the ring 102.

The inter-ring connecting node 102a encapsulates the user data packet received via the link 103, sets the TTL value such that the RPR packet will be discarded immediately before the cleave point 105, and performs bidirectional flooding by the two ringlets of the ring 102. At this time, the inter-ring connecting node 102a sets the RPR MAC SA by not using the RPR MAC address of itself but using the RPR MAC address of inter-ring connecting node 102b forming a pair of inter-ring connecting nodes. When bidirectional flooding is performed by the inter-ring connecting node 102a, the broadcast packet arrives at each node up to the node 102d immediate before the cleave point 105 in the flooding in a clockwise direction. On the other hand, in the flooding in a counterclockwise direction, the inter-ring connecting node 102b determines that it receives a broadcast packet transmitted by itself, so it eliminates the broadcast packet transferred from the inter-ring connecting node 102a. Accordingly, it is possible to realize a state in which the broadcast packet from the inter-ring connecting node 102a is not transferred to each node aligned in a counterclockwise direction from the inter-ring connecting node 102a up to the node 102c immediately before the cleave point 105.

Similar to the inter-ring connecting node 102a, the inter-ring connecting node 102b encapsulates the user data packet received via the link 104, and performs bidirectional flooding. At this time, the inter-ring connecting node 102b sets the RPR MAC SA by using the RPR MAC address of the inter-ring connecting node 102a forming the pair of inter-ring connecting nodes. As a result, in the flooding in a counterclockwise direction, the broadcast packet arrives at each node up to the node 102c immediately before the cleave point 105. On the other hand, in the flooding in a clockwise direction, the inter-ring connecting node 102a determines that it received the broadcast packet transmitted by itself, so it eliminates the broadcast packet transferred from the inter-ring connecting node 102b from the ring 102. Accordingly, it is possible to realize a state where the broadcast packet from the inter-ring connecting node 102b is not transferred to each node aligned in a clockwise direction from the inter-ring connecting node 102a up to the node 102d immediately before the cleave point 105.

In this way, each of the two nodes 102a and 102b forming a pair of inter-ring connecting nodes performs bidirectional flooding, and each of the inter-ring connecting nodes 102a and 102b falsifies the RPR MAC SA by using the other RPR MC address of the pair of inter-ring connecting nodes. As a result, the broadcast packet can be transferred to each node of the ring 102 without causing multiple reception of packets or broadcast stream in each node of the ring 102. Further, it is possible to connect the two links 103 and 104 redundantly and transfer the packet through the both links 103 and 104 in a normal state when no failure has occurred. Accordingly, transfer efficiency of the unicast packet between the rings 101 and 102 can be improved.

Figure 9:
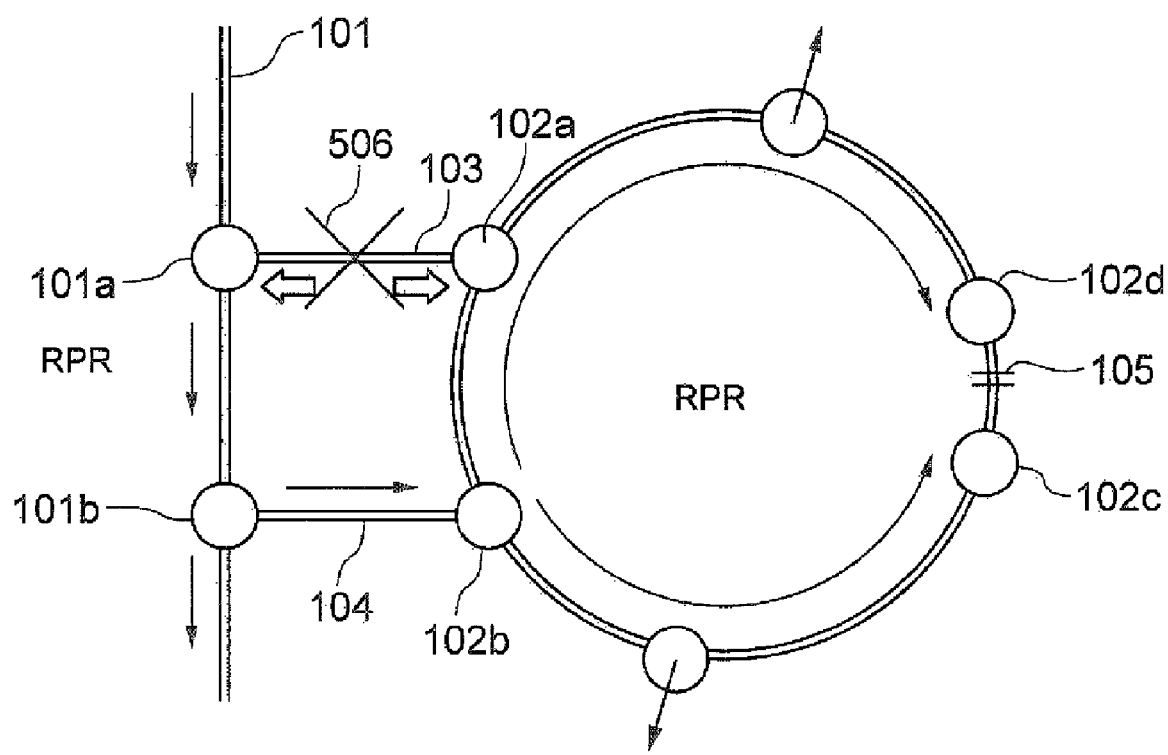
FIG. 9 is an illustration showing a broadcast packet transferring state when a failure occurs in a link linking rings.

FIG. 9 is an illustration showing a broadcast packet transferring state when a failure occurs in a link connecting the rings. Assuming that a failure 506 occurs in the link 103, then the inter-ring connecting nodes 101a and 102b detect that light from the link 103 is interrupted, detect that a failure has occurred in the link 103, so the mode thereof is immediately switched to be in the pass-through transfer mode. Note that in the description of the operation shown in each of the FIGS. 9 to 19, the configuration of the inter-ring connecting nodes 101a, 101b, 102a and 102b is assumed to be the one shown in FIG. 3.

The inter-ring connecting node 101a directly transmits the transferred broadcast packet. When the inter-ring connecting node 101b receives the broadcast packet, the inter-ring connecting node 101b transfers the packet to the next node in the ring 101, and also transfers to the inter-ring connecting node 102b via the link 104. This operation is same as the operation of the inter-ring connecting node 101b described in FIG. 8.

The inter-ring connecting node 102b is not switched to the pass-through transfer mode, so it operates same as the case described in FIG. 8. That is, the inter-ring connecting node 102b encapsulates the user data packet received via the link 104, sets the TTL value such that the RPR packet will be discarded at the node immediately before the cleave point 105, and performs bidirectional flooding by the two ringlets of the ring 102. At this time, the inter-ring connecting node 102b sets the RPR MAC SA by using the RPR MAC address of the inter-ring connecting node 102a. Flooding in a counterclockwise direction from the inter-ring connecting node 102b is same as that described in FIG. 8. On the other hand, in flooding in a clockwise direction, the inter-ring connecting node 102a is switched to the pass-through transfer mode, so it directly transmits the broadcast packet from the inter-ring connecting node 102b. Accordingly, the broadcast packet arrives at each node up to the node 102d immediately before the cleave point 105. Namely, the broadcast packet is transferred to each node in the ring 102. Therefore, even if a failure occurs in the link 103, it is recovered to a state where the broadcast packet can be transferred to each node in the ring 102 at a high speed without causing multiple reception of packets or broadcast stream.

In this exemplary embodiment, when a failure occurs in a link connecting two rings, a case in which the inter-ring connecting nodes on the both ends of the link are switched to the pass-through transfer mode has been described. Even in the case where a failure occurs in the link as described above, it is acceptable that a broadcast packet is transferred to an inter-ring connecting node in the ring of the broadcast packet transmitting side and the node performs operation to transfer the broadcast packet to the other ring in the same manner as the normal state. For example, even if a failure occurs in the link 103, the operation of the inter-ring connecting node 101a to transfer the broadcast packet to the ring 102 may be same as that of the normal state. However, in order to prevent the operation from being complicated, when a failure occurs in the link 103, it is preferable that the inter-ring connecting nodes 101a and 102a on the both ends thereof become the pass-through mode.

Figure 10:
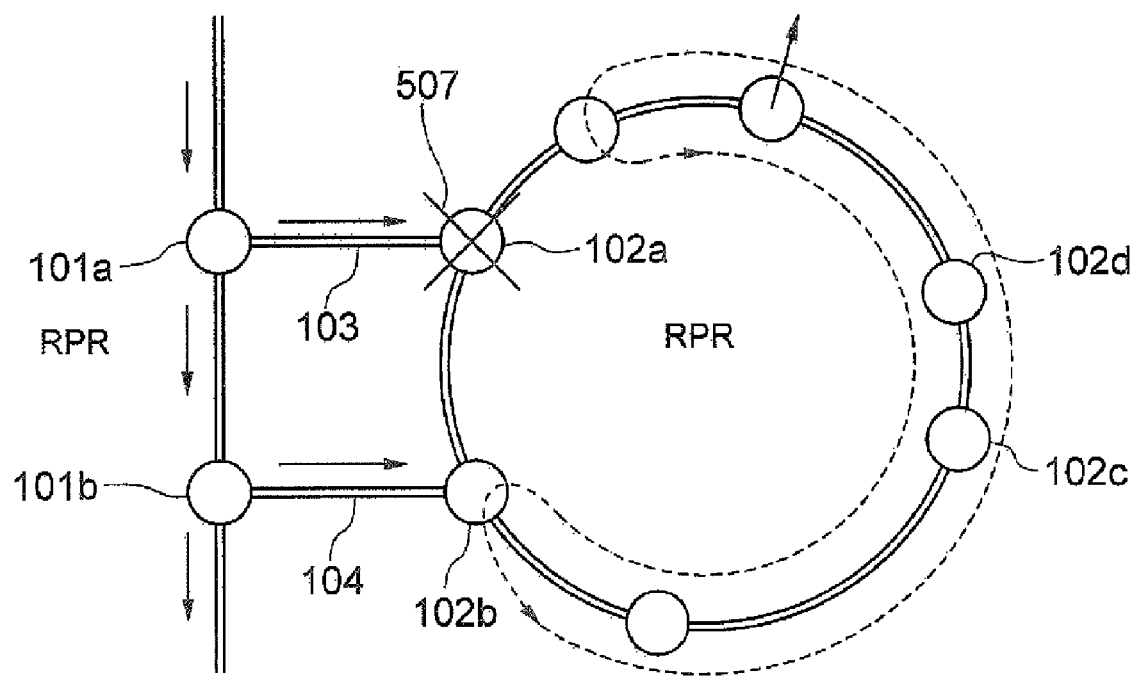
FIG. 10 is an illustration showing a broadcast packet transferring state when a failure occurs in an inter-ring connecting node.

FIG. 10 is an illustration showing a state of transferring a broadcast packet when a failure has occurred in an inter-ring connecting node. Assuming that a failure 507 occurs in the inter-ring connecting node 102a, the inter-ring connecting node 101a is immediately switched to the pass-through transfer mode same as the case described in FIG. 9. Further, the ring 102 autonomously starts protective operation (in this example, lap mode). In other words, when a packet is transferred from a ring, both nodes adjacent to the node where the failure 507 has occurred switch the ringlet to thereby transfer the packet to a node of the side opposite to the failure 507. However, as described later, when the broadcast packet transmitted from the inter-ring connecting node 102b arrives at a node immediately before the failure 507, it is not transferred from the node.

Operations of the inter-ring connecting nodes 101a and 101b are same as those described in FIG. 9. The inter-ring connecting node 102b encapsulates the user data packet received via the link 104, sets the TTL value such that the RPR packet will be discarded at a node immediately before the part where the failure 507 has occurred, and performs bidirectional flooding by the two ringlets of the ring 102. At this time, the inter-ring connecting node 102b sets the RPR MAC SA by using the RPR MAC address of the inter-ring connecting node 102a. Note that the inter-ring connecting node 102b detects the failure in the inter-ring connecting node 102a based on the fact that light from the link in the direction of inter-ring connecting node 102a is interrupted. Then, since the failure in the inter-ring connecting node 102a is detected, the TTL value is set based on the part where the failure has occurred instead of the cleave point.

In flooding in a clockwise direction from the inter-ring connecting node 102b, a packet is not transferred since a failure is caused in the inter-ring connecting node 102a. On the other hand, in flooding in a counterclockwise direction from the inter-ring connecting node 102b, a broadcast packet is transferred up to a node immediately before the part where the failure has occurred. Note that the TTL value is set such that the packet is discarded at a node immediately before the part where the failure has occurred, so it will never be transferred back at a node adjacent to the node 102a. In this way, the broadcast packet is transferred to each node in the ring 102. Accordingly even if a failure occurs in the link 103, it can be recovered to a state where the broadcast packet can be transferred to each node in the ring 102 at a high speed without causing packet multiple reception or broadcast stream.

Figure 11:
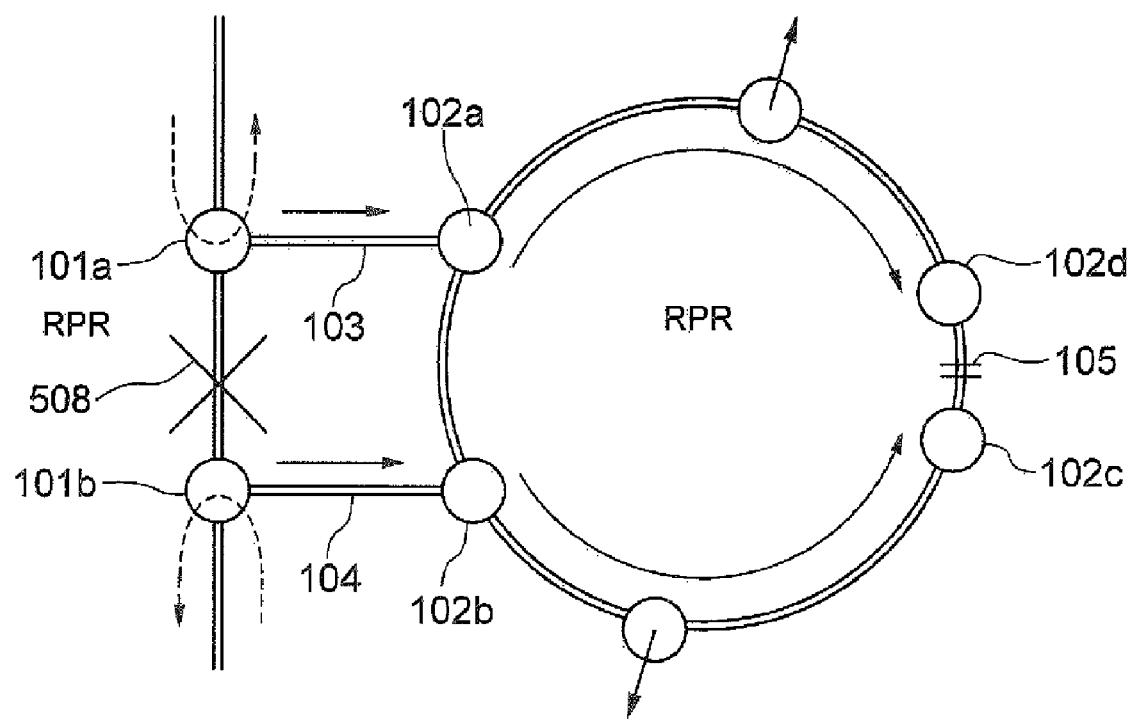
FIG. 11 is an illustration showing a broadcast packet transferring state when a failure occurs in an interval between ring connecting nodes of a ring from which a packet is transferred.

FIG. 11 is an illustration showing a state of transferring a broadcast packet when a failure occurs in the interval between ring connecting nodes of the ring 101. The ring 101 autonomously starts protective operation when a failure 508 occurs in the interval between ring connecting nodes. As a result, even if the failure 508 occurs, the inter-ring connecting nodes 101a and 101b in the ring 101 can receive the broadcast packet, respectively. When receiving the broadcast packet, the inter-ring connecting nodes 101a and 101b decapsulate it, and transfer the user data packet to the inter-ring connecting nodes 102a and 102b, respectively. The operations of the inter-ring connecting nodes 102a and 102b receiving the user data packet are same as those described in FIG. 8. The broadcast packet can be transferred to each node of the ring 102 without causing multiple reception of packets or broadcast stream in each node of the ring 102.

Figure 12:
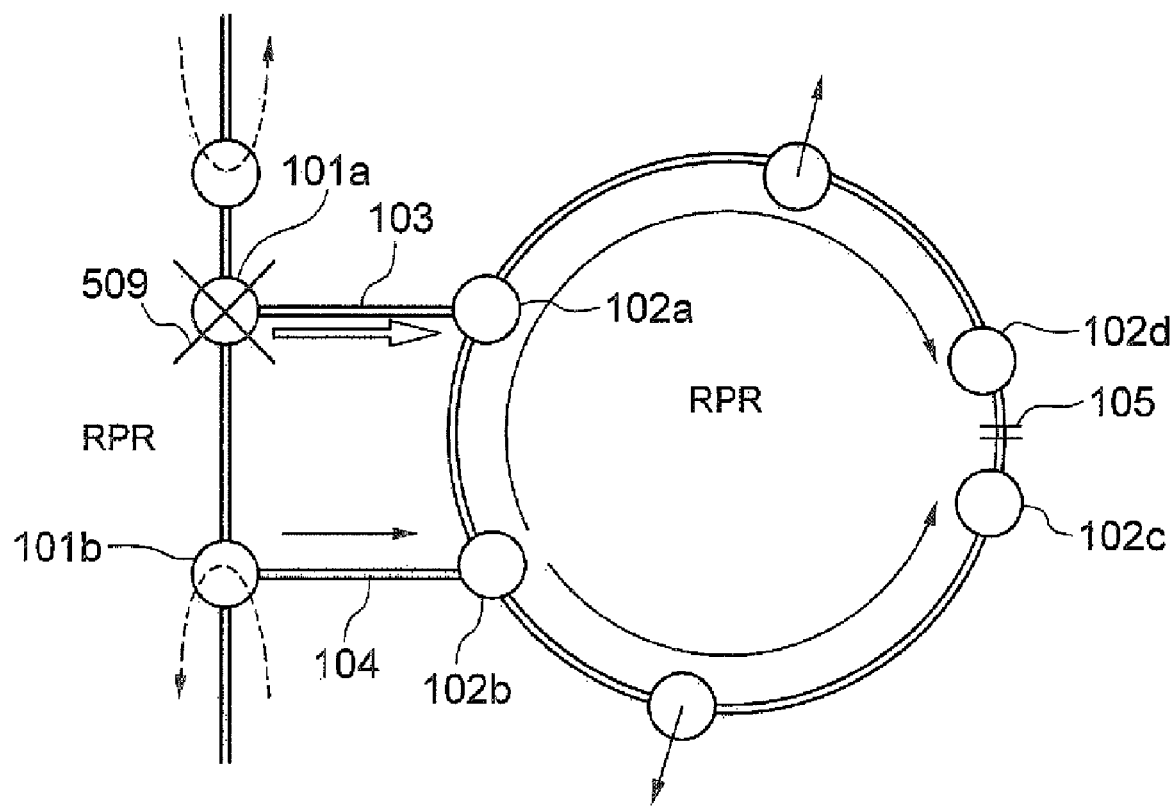
FIG. 12 is an illustration showing a broadcast packet transferring state when a failure occurs in an inter-ring connecting node of a ring from which a packet is transferred.

FIG. 12 is an illustration showing a state of transferring a broadcast packet when a failure occurs in an inter-ring connecting node in the ring 101. Assuming that a failure 509 occurs in the inter-ring connecting node 101a, the inter-ring connecting node 102a is immediately switched to the pass-through transfer mode. Further, the ring 101 autonomously starts protective operation because the failure 509 has occurred. As a result, even though the failure 509 has occurred, the inter-ring connecting node 101b in the ring 101 can receive the broadcast packet. The inter-ring connecting node 101b decapsulates the broadcast packet when receiving it, and transfers the user data packet to the inter-ring connecting node 102b. The operation of the inter-ring connecting node 102b receiving the user data packet and the operation of the inter-ring connecting node 102a switched to the pass-through transfer mode are same as those described in FIG. 9. Accordingly, the broadcast packet can be transferred to each node of the ring 102 without causing multiple reception of packets or broadcast stream same as the case described in FIG. 9.

Figure 13:
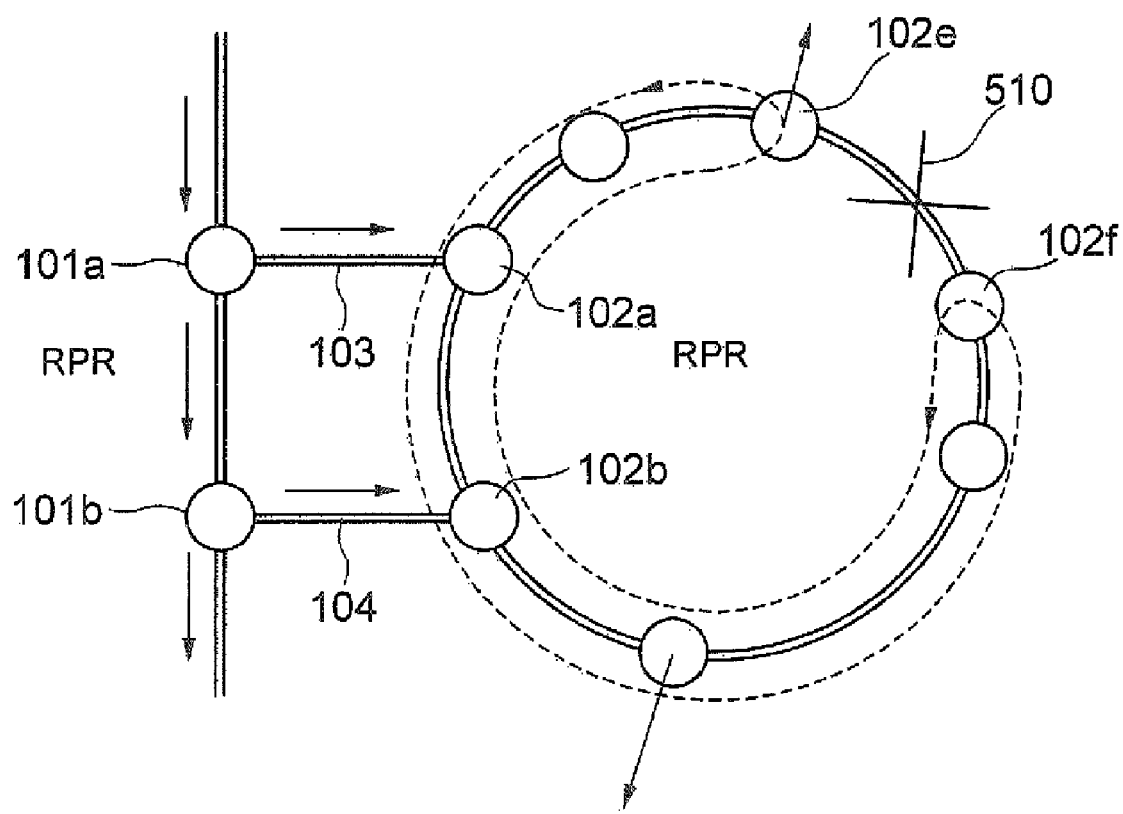
FIG. 13 is an illustration showing a broadcast packet transferring state when a failure occurs in a link of a ring from which a packet is transferred.

FIG. 13 is an illustration showing a state of transferring a broadcast packet when a failure occurs in a link of the ring 102. Assuming that a failure 510 occurs in a link in the ring 102, the ring 102 autonomously starts protective operation. At this time, a node adjacent to the part where the failure has occurred notifies the inter-ring connecting nodes 102a and 102b of the part where the failure occurs. The operations of the inter-ring connecting nodes 101a and 101b in the ring 101 are same as those described in FIG. 8.

The inter-ring connecting node 102a encapsulates the user data packet received via the link 103, sets the TTL value such that the RPR packet is discarded at a node immediately before the part where the failure 510 has occurred, and performs bidirectional flooding by the two ringlets of the ring 102. At this time, the inter-ring connecting node 102a sets the RPR MAC SA by using the RPR MAC address of the inter-ring connecting node 102b. Further, the inter-ring connecting node 102b encapsulates the user data packet received via the link 104, sets the TTL value such that the RPR packet will be discarded at a node immediately before the part where the failure 510 has occurred, and performs bidirectional flooding by the two ringlets of the ring 102. At this time, the inter-ring connecting node 102b sets the RPR MAC SA by using the RPR MAC address of the inter-ring connecting node 102a.

The broadcast packet output from the inter-ring connecting node 102a in a clockwise direction arrives at the node 102d immediately before the part where the failure occurs, and is eliminated at the node 102e. Further, the broadcast packet output from the inter-ring connecting node 102a in a counterclockwise direction is eliminated at the inter-ring connecting node 102b. Similarly, the broadcast packet output from the inter-ring connecting node 102b in a counterclockwise direction arrives at the node 102f immediately before the part where the failure occurs, and is eliminated at the node 102f. Further, the broadcast packet output from the inter-ring connecting node 102b in a clockwise direction is eliminated at the inter-ring connecting node 102a. As a result, it is possible to transfer the broadcast packet to each node in the ring 102 without causing multiple reception of packets or broadcast stream in each node of the ring 102.

Even if various kinds of failures as shown in FIGS. 9 to 13 occur, an operation such as eliminated the MAC address of a node, which was active, from the FDB, as being required in the conventional art, is not needed. This enables failure recovery to be achieved at a high speed.

Although an operation of transferring a broadcast packet from the ring 101 to the ring 102 has been described in FIGS. 8 to 13, an operation of transferring a broadcast packet from the ring 102 to the ring 101 is same.

Figure 14:
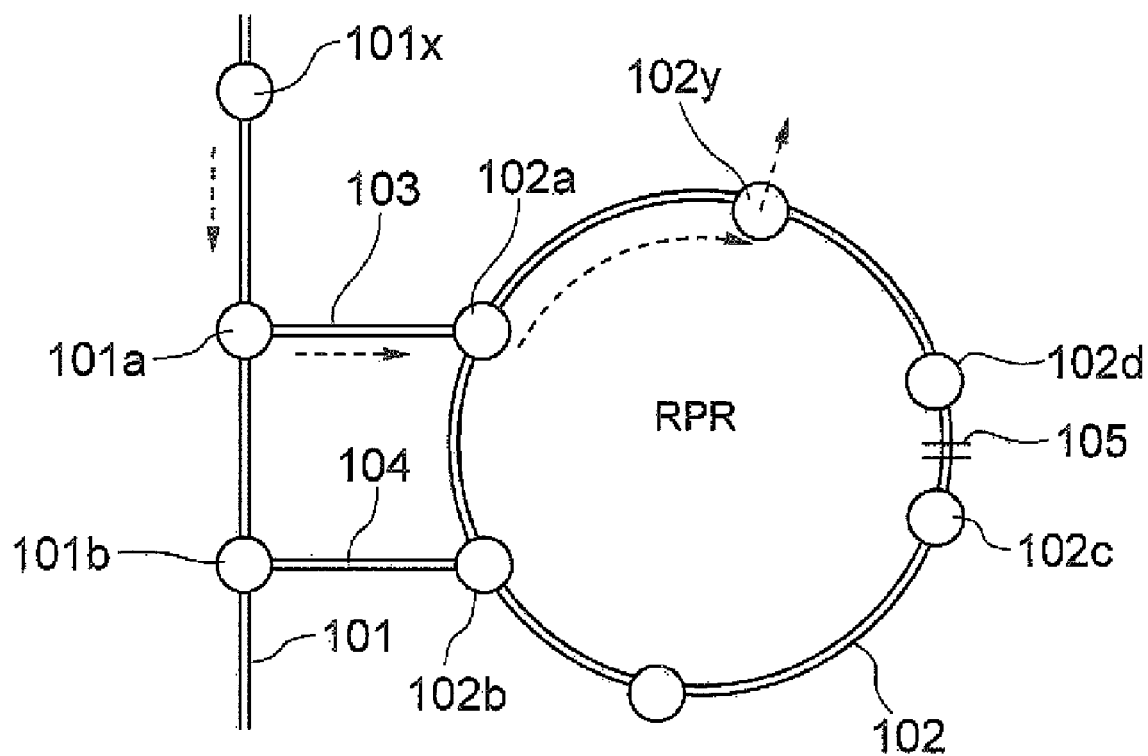
FIG. 14 is an illustration showing a state of transferring a unicast packet from a ring to another ring in a normal state.

FIG. 14 is an illustration showing a state of transferring a unicast packet from one ring to another ring in the normal state. Note that in FIGS. 14 to 19, the transfer path of the unicast packet is shown by arrows of dotted lines. Further, the transfer path of a broadcast packet is shown by arrows of solid lines. As described above, it is on the premise that the state is one of the first to third states.

When the node 101x transmits a packet to the node 102y, it first searches for the RPR MAC address of the inter-ring connecting node 101a as the RPR MAC address corresponding to the MAC DA of the user data packet. Then, by using the address as the RPR MAC DA, it transmits the RPR packet to the inter-ring connecting node 101a. The inter-ring connecting node 101a decapsulates, and transfers the user data packet to the inter-ring connecting node 102*a*. The inter-ring connecting node 102*a* searches for the RPR MAC address of the node 102*y* as the RPR MAC address corresponding to the MAC DA in the user data packet. Then, by using the address as the RPR MAC DA, it transmits the RPR packet to the node 102*y*. The node 102*y* receives the RPR packet.

Figure 15:
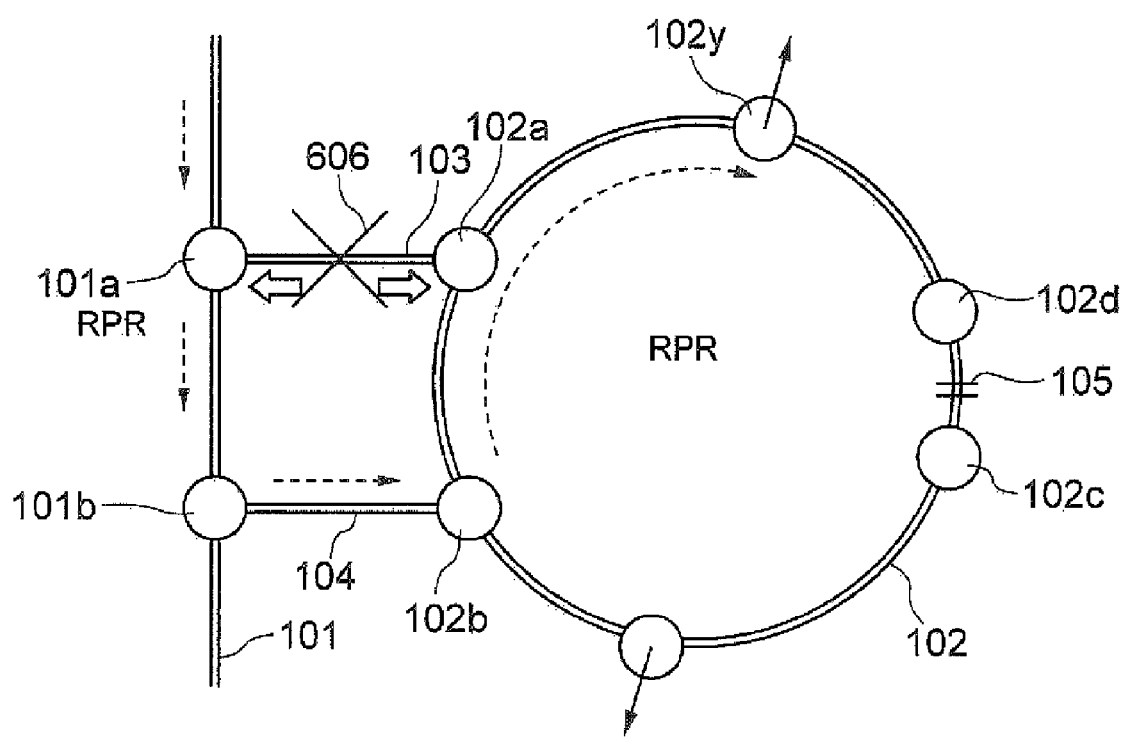
FIG. 15 is an illustration showing a unicast packet transferring state when a failure occurs in a link linking rings.

FIG. 15 is an illustration showing a state of transferring a unicast packet when a failure occurs in a link linking the rings. Assuming that a failure 606 occurs in the link 103, modes of the inter-ring connecting nodes 101*a* and 102*b* are immediately switched to the pass-through transfer mode.

When the node 101*x* transmits a packet to the node 102*y*, it transmits the RPR packet by using the RPR MAC address of the inter-ring connecting node 101*a* as the RPR MAC DA, same as the case described in FIG. 14. Since the inter-ring connecting node 101*a* is in the pass-through transfer mode, it transfers the RPR packet to the next node (inter-ring connecting node 101*b*). The inter-ring connecting node 101*b* receives not only an RPR packet destined for itself but also an RPR packet in which the RPR MAC address of the inter-ring connecting node 101*a* is the RPR MAC DA. Accordingly, the inter-ring connecting node 101*b* receives the unicast packet transmitted by the node 101*x*. The inter-ring connecting node 101*b* decapsulates the unicast packet, and transmits the user data packet to the inter-ring connecting node 102*b*.

The inter-ring connecting node 102*b* searches for the RPR MAC address corresponding to the MAC DA of the user data packet. Then, by using the address as the RPR MAC DA, it transmits the RPR packet to the node 102*y*. The node 102*y* receives the RPR packet.

Figure 16:
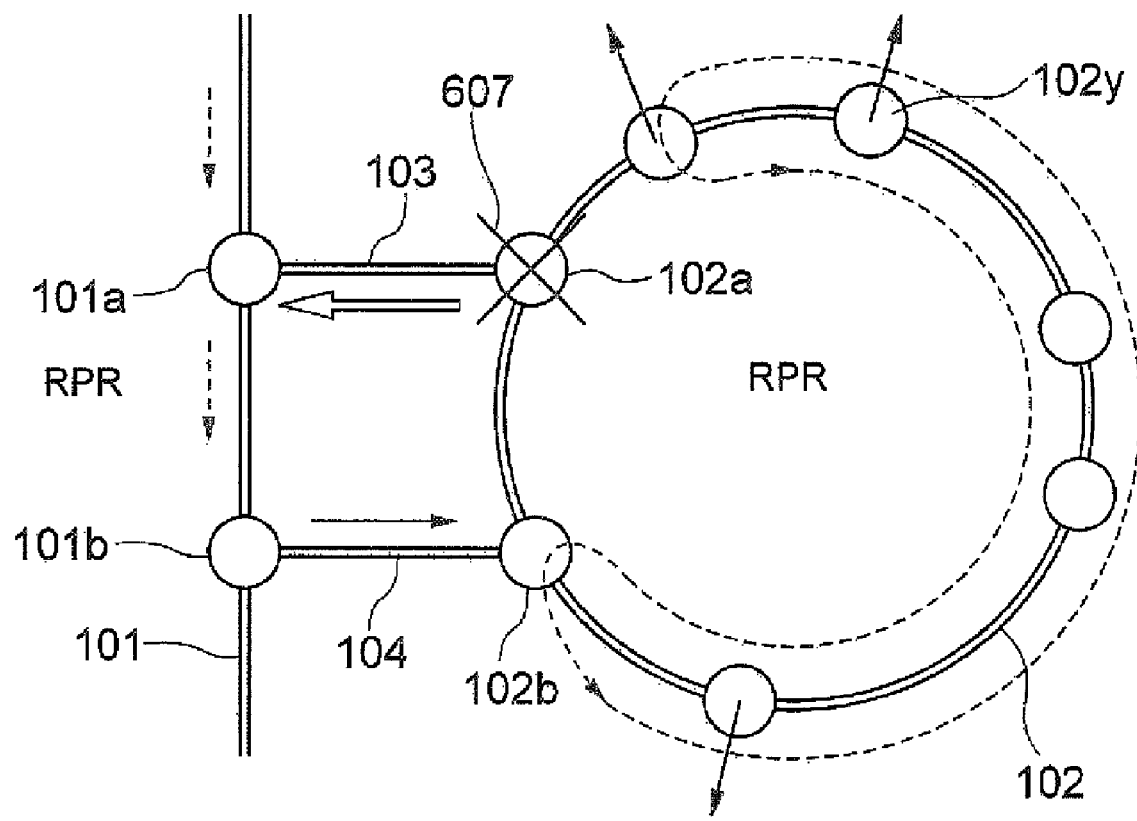
FIG. 16 is an illustration showing a unicast packet transferring state when a failure occurs in an inter-ring connecting node.

FIG. 16 is an illustration showing a state of transferring a unicast packet when a failure occurs in an inter-ring connecting node. Assuming that a failure 607 occurs in the inter-ring connecting node 102*a*, the mode of the inter-ring connecting node 101*a* is immediately switched to the pass-through transfer mode. In the case where the node 101*x* transmits a packet to the node 102*y*, the operation, in which the unicast packet transmitted by the node 101*x* arrives at the inter-ring connecting node 101*b* and the inter-ring connecting node 101*b* decapsulates the unicast packet and transmits it to the inter-ring connecting node 102*b*, is same as that described in FIG. 15.

Further, the ring 102 autonomously starts protective operation same as the case described in FIG. 10 since a failure 607 occurs.

The inter-ring connecting node 102*b* searches for the RPR MAC address corresponding to the MAC DA of the user data packet received from the inter-ring connecting node 101*b*. Then, by using the address as the RPR MAC DA, it transmits the RPR packet to the node 102*y*. Since the ring 102 has started protective operation (e.g., lap mode), it is possible to cause the RPR packet to arrive at the node 102*y*. In the case of transmission in the lap mode, the inter-ring connecting node 102*b* is positioned adjacent to the part where the failure occurs in the example shown in FIG. 16, so the packet is transmitted only in one direction. Accordingly, in this example, the inter-ring connecting node 102*b* transmits the unicast packet destined for the node 102*y* toward a transmittable direction.

Figure 17:
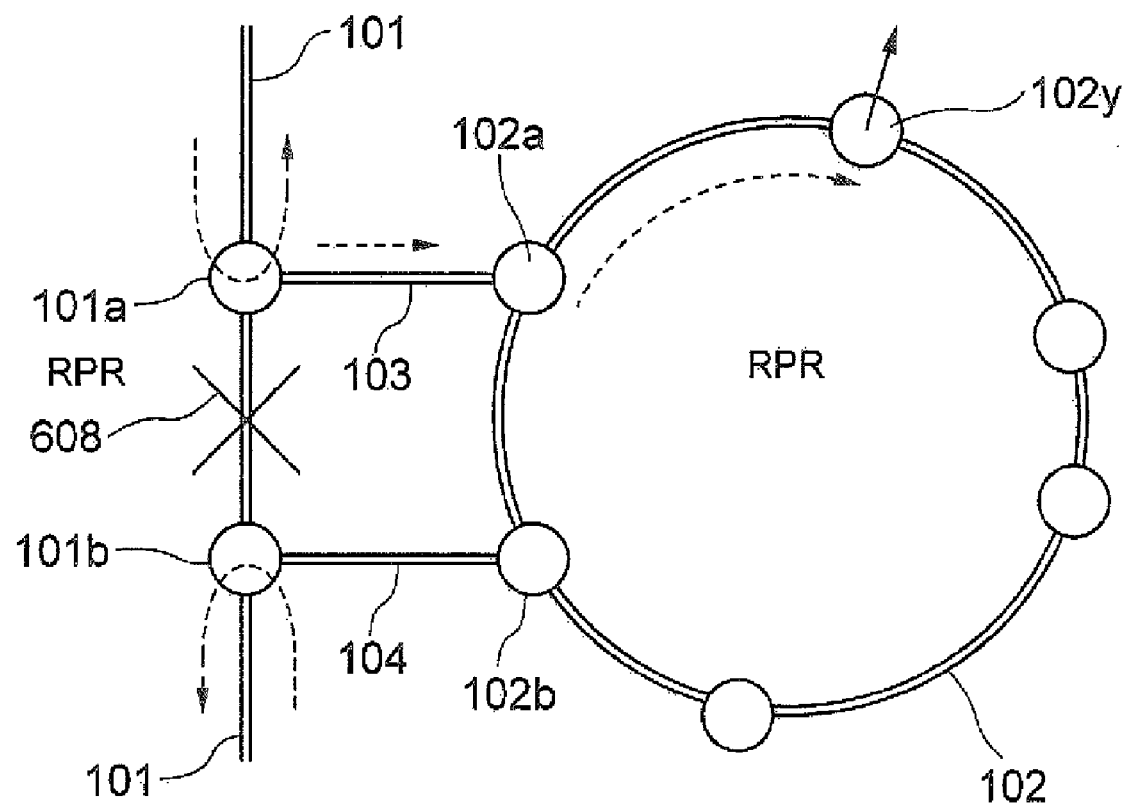
FIG. 17 is an illustration showing a unicast packet transferring state when a failure occurs in an interval between ring connecting nodes of a ring from which a packet is transferred.

FIG. 17 is an illustration showing a state of transferring a unicast packet when a failure occurs in an interval between ring connecting nodes of the ring 101. The ring 101 autonomously starts protective operation since a failure 608 occurs in an interval between ring connecting nodes. As a result, even if the failure 608 occurs, the inter-ring connecting node 101*a* can receive the RPR packet transmitted by the node 101*x* to the inter-ring connecting node 101*a*. The operation after the inter-ring connecting node 101*a* receives the RPR packet is same as that described in FIG. 14, so the packet is transferred to the node 102*y* through the same path as that shown in FIG. 14.

Figure 18:
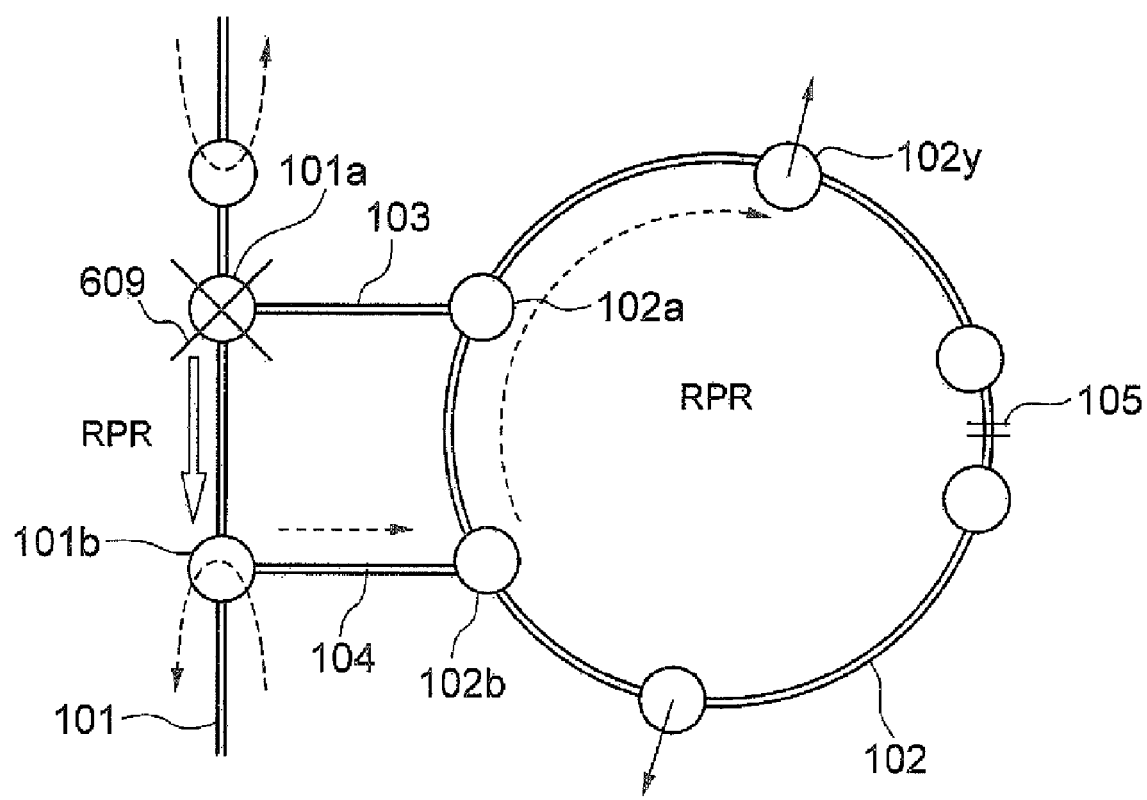
FIG. 18 is an illustration showing a unicast packet transferring state when a failure occurs in an inter-ring connecting node of a ring from which a packet is transferred.

FIG. 18 is an illustration showing a state of transferring a unicast packet when a failure occurs in an inter-ring connecting node of the ring 101. Assuming that a failure 609 occurs in the inter-ring connecting node 101*a*, the mode of the inter-ring connecting node 102*a* is immediately switched to the pass-through transfer mode. Further, the ring 101 autonomously starts protective operation since the failure 609 occurs. The inter-ring connecting node 101*b* receives not only an RPR packet destined for itself, but also an RPR packet in which the RPR MAC address of the inter-ring connecting node 101*a* is the RPR MAC DA. Accordingly, the inter-ring connecting node 101*b* receives the unicast packet transmitted by the node 101*x* to the node 101*a*. The operation after the inter-ring connecting node 101*b* receives the unicast packet from the node 101*x* up to the point that the node 102*y* receives the packet is same as that described in FIG. 15.

Figure 19:
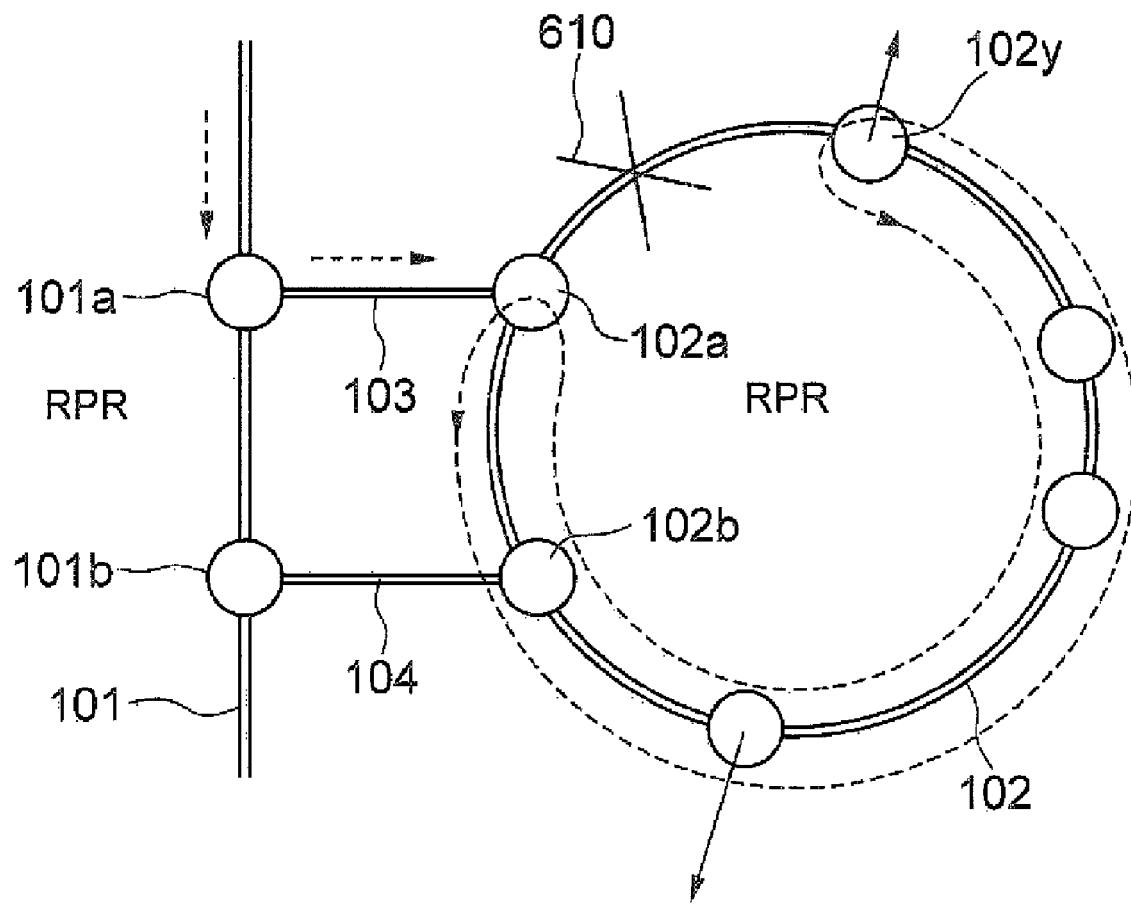
FIG. 19 is an illustration showing a unicast packet transferring state when a failure occurs in a link of a ring to which a packet is transferred.

FIG. 19 is an illustration showing a state of transferring a unicast packet when a failure occurs in a link of the ring 102. Assuming that a failure 610 occurs in a link of the ring 102, the ring 102 autonomously starts protective operation. The operation after the unicast packet transmitted by the node 101*x* arrives at the inter-ring transfer node 101*a* up to the point that the inter-ring connecting node 101*a* transmits the user data packet to the inter-ring connecting node 102*a* is same as that described in FIG. 14.

The inter-ring connecting node 102*a* receiving the user data packet encapsulates the user data packet, and transfers it to the node 102*y*. Note that the inter-ring connecting node 102*a* can search for the RPR MAC address of the node 102*y* by using the MAC DA in the user data packet as a key. However, since the ring 102 starts protective operation, the inter-ring connecting node 102*a* transmits the unicast packet to the node 102*y* in the lap mode for example. In the case of transmission in the lap mode, the inter-ring connecting node 102*a* is positioned adjacent to the part where the failure occurs in the example shown in FIG. 19, so the packet is transmitted only in one direction. Accordingly, in this example, the inter-ring connecting node 102*a* transmits the unicast packet destined for the node 102*y* toward a transmittable direction.

Even if various kinds of failures as shown in FIG. 15 to 19 occur, an operation such as eliminating the MAC address of a node which was active before from the FDB, which is required in the conventional art, is not needed. This enables to realize failure recovery to be achieved at a high speed.

Although the operation of transferring a packet from the ring 101 to the ring 102 has been described in FIGS. 14 to 19, operation of transferring a packet from the ring 102 to the ring 101 is same.

Figure 20:
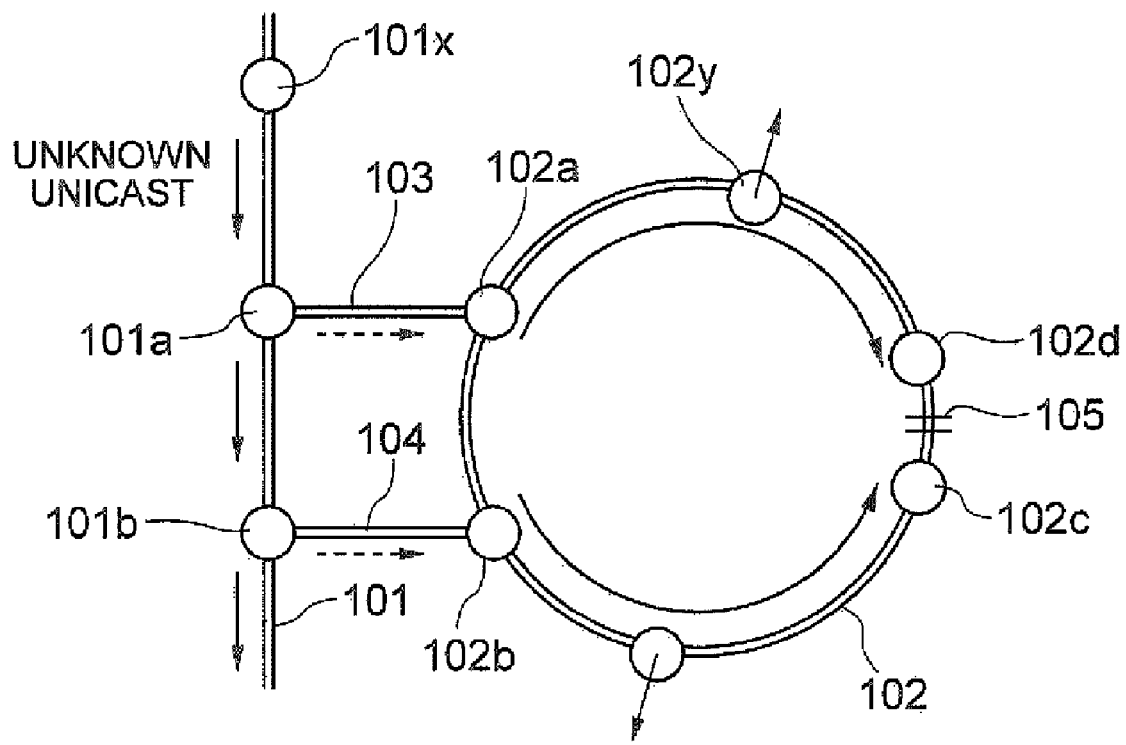
FIG. 20 is an illustration showing a state of transferring an unknown unicast packet.

Next, an operation when an unknown unicast packet is transferred to a ring will be described. FIG. 20 is an illustration showing a transfer state of an unknown unicast packet. In FIG. 20, arrows of the solid lines indicate paths of an unknown unicast packet. When the packet passes through the links 103 and 104, it is transferred as a user data packet. It is assumed that when the node 101*x* receives the user data packet from a user terminal (not shown) outside the ring and generates an RPR packet, the node 101*x* fails to searches for an RPR MAC address corresponding to the MAC DA of the user data packet. In this case, the node 101*x* encapsulates the user data packet by using the broadcast address as the RPR MAC DA, and broadcast-transmits the unknown unicast packet into the ring 101. Each of the inter-ring connecting node 101*a* and 101*b* receives the unknown unicast packet.

Then, each of the inter-ring connecting node 101a and 101b decapsulates the unknown unicast packet received, and transmits the user data packet to the inter-ring connecting node 102a or 102b. According to the premise of the present exemplary embodiment, an RPR MAC address corresponding to the MAC DA of the user data packet could not be searched for in the node 101x, so this search cannot be performed in the inter-ring connecting nodes 102a and 102b including a common address table (FDB). Accordingly, when each of the inter-ring connecting node 102a and 102b encapsulates the user data packet received via the link 103 or 104, it generates an unknown unicast packet. In this case, each of the inter-ring connecting nodes 102a and 102b performs bidirectional flooding while falsifying the RPR MAC SA, so multiple transfer of packets or the like will not be caused.

As described above, based on the premise of the present exemplary embodiment, the mode of the RPR packet in one ring 101 is succeeded in the other ring 102 even if decapsulation is performed at the time of transfer in the links 103 and 104. In other words, as shown in FIG. 20, if an unknown unicast packet is transferred in the ring 101, the unknown unicast packet is transferred even in the ring 102 when the packet is transferred to the ring 102 via the link. Similarly, if a broadcast packet is transferred in the ring 101, the broadcast packet is transferred in the ring 102 when the packet is transferred to the ring 102 via the link. Further, if a unicast packet is transferred in the ring 101, the unicast packet is also transferred in the ring 102 when the packet is transferred to the ring 102 via the link.

In the first exemplary embodiment, the packet transfer unit described in the claims is realized by the forwarding circuits 51 and 52 and the packet conversion circuit 61. The address falsifying unit is realized by the RPR MAC DA setting circuit 59. The arrival point setting unit is realized by the TTL setting circuit 58. The bidirectional broadcast packet transfer unit is realized by the ringlet selecting circuit 56 and the multiplexing circuits 53 and 54. The failure detection unit is realized by the physical interface interruption detecting circuit 62. The pass-through transfer unit and the receiving unit are realized by the forwarding circuits 51 and 52.

Second Exemplary Embodiment

The configuration of a packet ring network system according to the second exemplary embodiment of the present invention is same as the configuration shown in FIG. 1. However, the operations of the inter-ring connecting nodes 101a, 101b, 102a and 102b are different in part from the first exemplary embodiment.

In the second exemplary embodiment, in the case that each of the inter-ring connecting nodes 101a, 101b, 102a and 102b transmits a packet transferred from another ring, where it does not belong, to the ring where it belongs to, the node uses the RPR MAC address of itself as the RPR MAC SA. In other words, it does not falsify the source (RPR MAC SA), which is different from the first exemplary embodiment.

Further, when each of the inter-ring connecting nodes 101a, 101b, 102a and 102b receives a broadcast packet (including unknown unicast packet) in which the RPR MAC address of another inter-ring connecting node, included in the pair of inter-ring connecting nodes including itself, used as the RPR MAC SA, the node eliminates the broadcast packet from the ring. However, when each of the inter-ring connecting nodes 101a, 101b, 102a and 102b is in the pass-through transfer mode, it will not eliminate even a broadcast packet in which the RPR MAC address of the other inter-ring connecting node included in the pair of inter-ring connecting nodes including itself is used as the RPR MAC SA, and transfers it to the next node. In other words, the node gives priority to an operation of pass-through transfer mode over an operation of eliminating the packet.

Further, elimination of a packet as described above is performed with reference to a broadcast packet (including unknown unicast packet), but is not performed for a unicast packet. In other words, even when each of the inter-ring connecting nodes 101a, 101b, 102a and 102b receives a packet in which the RPR MAC address of another inter-ring connecting node included in the pair of inter-ring connecting nodes including itself is used as the RPR MAC SA, it will not eliminate the unicast packet if the packet is a unicast packet.

Hereinafter, explanation will be given with a specific example. Assuming that the inter-ring connecting node 102a transmits a broadcast packet in which the RPR MAC address of itself is RPR MAC SA and the broadcast address is RPR MAC DA, through bidirectional flooding, the inter-ring connecting node 102b receives the broadcast packet. The RPR MAC SA of the broadcast packet is the RPR MAC address of the inter-ring connecting node 102a forming a pair of inter-ring connecting nodes together with the inter-ring connecting node 102b, so the inter-ring connecting node 102b eliminates the packet from the ring. Further, the broadcast packet transferred from the inter-ring connecting node 102a in the other direction is transferred up to the node immediately before the cleave point, and is eliminated at the node. Note that operation of setting the TTL value is same as that of the first exemplary embodiment.

Similarly, assuming that the inter-ring connecting node 102b transmits a broadcast packet in which the RPR MAC address of itself is RPR MAC SA and the broadcast address is RPR MAC DA, through bidirectional flooding, the inter-ring connecting node 102a receives the broadcast packet. The RPR MAC SA of the broadcast packet is the RPR MAC address of the inter-ring connecting node 101b forming a pair of inter-ring connecting nodes together with the inter-ring connecting node 102a, so the inter-ring connecting node 102a eliminates the packet from the ring. Further, the broadcast packet transferred from the inter-ring connecting node 102b in the other direction is transferred up to the node immediately before the cleave point, and is eliminated at the node.

In the present exemplary embodiment, when each of the inter-ring connecting nodes 102a and 102b performs bidirectional flooding of a broadcast packet in a normal state, each of the inter-ring connecting nodes 102a and 102b eliminates the broadcast packet transferred by the other inter-ring connecting node. Further, The broadcast packet transferred by the inter-ring connecting node 102a in a direction opposite to the node 102b and the broadcast packet transferred by the inter-ring connecting node 102b in a direction opposite to the node 102a are transferred to the nodes immediately before the cleave point, respectively. This aspect is same as the first exemplary embodiment. Therefore, even if the operations of the inter-ring connecting nodes are different in part, the same effect as that of the first exemplary embodiment can be achieved.

Further, when an inter-ring connecting node detects a failure in a link linking the rings or in an inter-ring connecting node connected via the link, it is immediately switched to the pass-through transfer mode. In the case where one node, of the two inter-ring connecting nodes on a ring, is in the pass-through transfer mode and the other node performs bidirectional flooding of a broadcast packet, the node in the pass-through transfer mode transmits the packet. Therefore, the broadcast packets transferred from one inter-ring connecting node in opposite directions are transferred up to the node immediately before the cleave point, and are eliminated at the node. This aspect is also same as that of the first exemplary embodiment.

Further, the configurations of the inter-ring connecting nodes in the second exemplary embodiment may be same as those shown in FIG. 3. However, the operations of the forwarding circuits 51 and 52 are different in part from those in the first exemplary embodiment. Further, the operation of the RPR MAC SA setting circuit 59 is also different from the operation in the first exemplary embodiment.

When each of the forwarding circuits 51 and 52 receives a broadcast packet in which the RPR MAC address of the other inter-ring connecting node included in the pair of inter-ring connecting nodes including itself is the RPR MAC SA, it eliminates the broadcast packet. However, in the case of pass-through transfer mode, it transfers the broadcast packet to the next node. Further, each of the forwarding circuits 51 and 52 performs elimination of a packet with reference to a broadcast packet, but does not perform for a unicast packet. In other words, even if each of the forwarding circuits 51 and 52 receives a packet in which the RPR MAC address of the other inter-ring connecting node included in the pair of inter-ring connecting nodes including the self node is RPR MAC SA, if the packet is a unicast packet, it will not eliminate the unicast packet.

The RPR MAC SA setting circuit 59 sets RPR MAC SA of the packet transferred from the packet conversion circuit 62. In the second exemplary embodiment, the RPR MAC SA setting circuit 59 sets the RPR MAC address of the self node as RPR MAC SA.

In the present exemplary embodiment, the aspects other than one described as the difference from the first exemplary embodiment are same as those of the first exemplary embodiment. Accordingly, paths through which packets are transferred and operations when a failure occurs are same as those of the first exemplary embodiment, and the same effect as that of the first exemplary embodiment can be achieved.

In the second exemplary embodiment, the packet transfer unit described in the claims is realized by the forwarding circuits 51 and 52 and the packet conversion circuit 61. The source address setting unit is realized by the RPR MAC SA setting circuit 59. The arrival point setting unit is realized by the TTL setting circuit 58. The bidirectional broadcast packet transmitting unit is realized by the ringlet selecting circuit 56 and the multiplexing circuits 53 and 54. The failure detecting unit is realized by the physical interface interruption detecting circuit 62. The packet elimination unit, the pass-through transfer unit and the receiving unit are realized by the forwarding circuits 51 and 52.

Note that even in the second exemplary embodiment, the operation of the pass-through transfer mode is not a mandatory operation for realizing packet transfer between a plurality of links connecting rings while preventing broadcast stream or the like from being caused in a normal state. Therefore, in the case where the time taken from failure to recovery is not required to be saved, the configuration of each of the inter-ring connecting nodes 101a, 101b, 102a and 102b may be the configuration (configuration not including the physical interface interruption detecting circuit 62) shown in FIG. 2.

Figure 21:
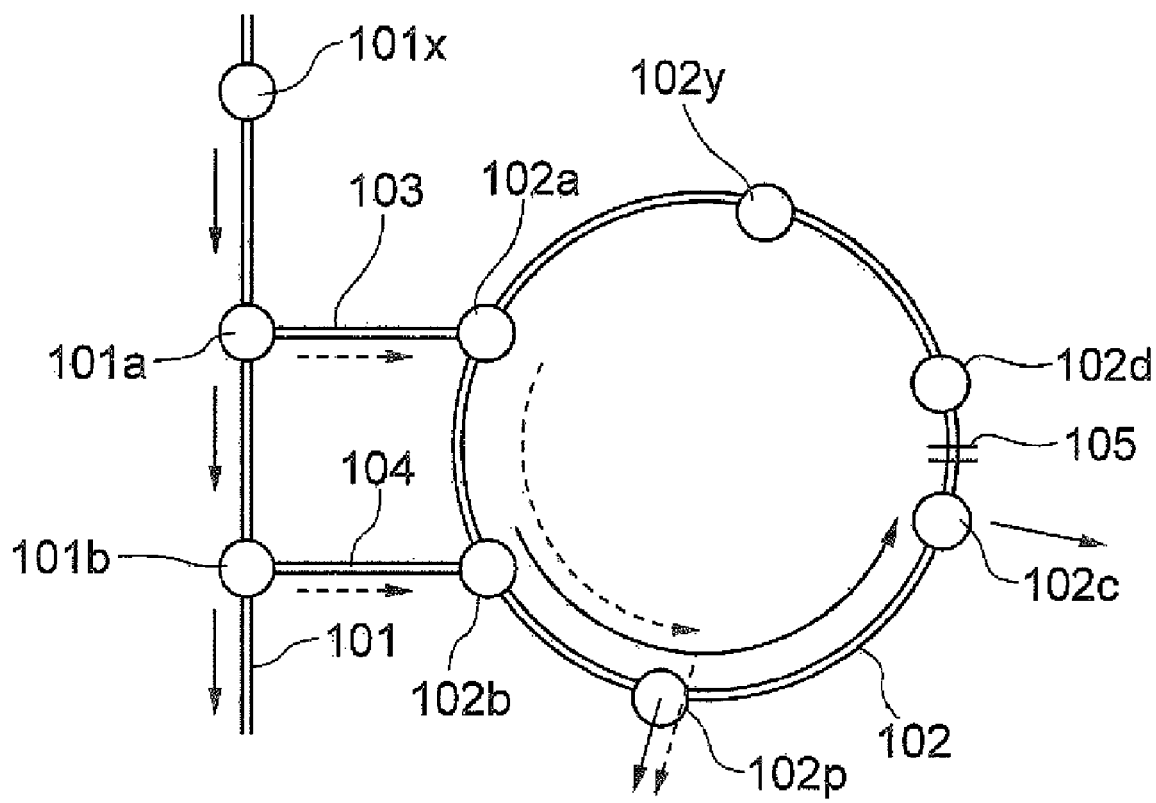
FIG. 21 is an illustration showing a phenomenon if the premise in the first exemplary embodiment and the second exemplary embodiment is eliminated.
Figure 22:
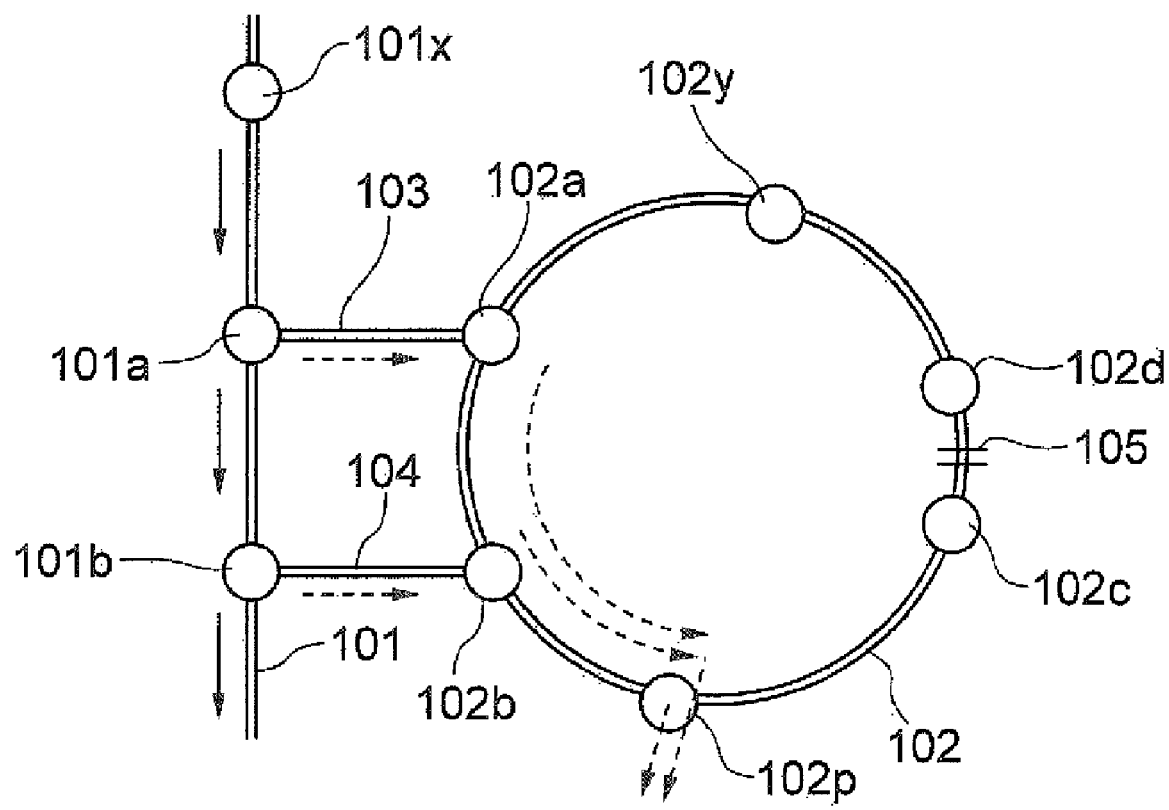
FIG. 22 is an illustration showing a phenomenon if the premise in the first exemplary embodiment and the second exemplary embodiment is eliminated.

Before describing a third exemplary embodiment and a fourth exemplary embodiment, explanation will be given first for a phenomenon in the case where the premise that the state is one of the first to third states is eliminated in the first and second exemplary embodiments. FIGS. 21 and 22 are illustrations showing a phenomenon in the case where the premise is eliminated in the first and second exemplary embodiments. When the premise is eliminated, each node included in the packet ring network independently studies the corresponding relationship between RPR AMC SA of an RPR packet that it receives and MAC SA of a user data packet. Therefore, the contents of study (entry information) stored in the address tables of the respective nodes are not always common. Consequently, if a plurality of nodes receive the same user data packet, some nodes become successful in searching for the RPR MAC address corresponding to the MAC DA of the user data packet, but some nodes fail. Note that in FIGS. 21 and 22, the arrows of solid lines indicate paths of an unknown unicast packet, and the arrows of dotted lines indicate paths of a unicast packet. When a packet passes through the links 103 and 104, it is transferred as a user data packet.

FIG. 21 shows a case where the node 101x and the node 102b fail to search, and the node 102a is successful in searching. When the node 101x receives a user data packet from a user terminal (not shown) outside the ring and generates an RPR packet, the node 101x generates an unknown unicast packet and broadcast-transmits it to the ring 101, same as the case shown in FIG. 20. Then, each of the inter-ring connecting nodes 102a and 102b of the ring 102 receives the user data packet, same as the case shown in FIG. 20. Since the inter-ring connecting node 102a is successful in searching for the RPR MAC address corresponding to the MAC DA of the user data packet, it generates a unicast packet as an RPR packet, and transmits it to a specific node (in this case, assumed to be a node 102p). The inter-ring connecting node 102b performs the same search but fails, so it generates an unknown unicast packet and performs bidirectional flooding. Then, multiple reception of packet is caused in the node 102p. Even if the search results in the inter-ring connecting nodes 102a and 102b are opposite respectively, multiple reception of packets will be caused similarly.

FIG. 22 shows a case where the node 101x fails to search, but the nodes 102a and 102b are successful in searching. When the node 101x receives a user data packet from a user terminal (not shown) outside the ring and generates an RPR packet, the node 101x generates an unknown unicast packet and broadcast-transmits it to the ring 101, same as the case shown in FIG. 20. Then, the inter-ring connecting nodes 102a and 102b of the ring 102 receive the user data packet respectively, same as the case shown in FIG. 20. The inter-ring connecting nodes 102a and 102b are successful in searching for the RPR MAC address in the MAC DA of the user data packet, generates unicast packets as RPR packets, and transmits it to a specific node (in this case, assumed to be node 102p). Then, multiple reception of packets is caused in the node 102p.

As described above, in performing table search and RPR encapsulation in an inter-ring connecting node in a ring where a packet is received, if entry information exists in the address table of at least one of the inter-ring connecting nodes, it is found that multiple reception of packets may be caused in the destination node of the receiving side ring. This is due to the fact that the mode of the RPR packet in one ring 101 is not always succeeded in the other ring 102 because the premise is eliminated.

Even if the premise in the first and second exemplary embodiment is eliminated, it is preferable not to cause multiple reception shown in FIGS. 21 and 22. In third and fourth exemplary embodiments described below, the premise that the state is one of the first to third states is eliminated, and in such a state, multiple reception of packets shown in FIGS. 21 and 22 is prevented.

Third Exemplary Embodiment

In the present exemplary embodiment and a fourth exemplary embodiment describe later, operation of transmitting a broadcast packet in which both of the MAC DA and RPR MAC DA of an encapsulated user data packet are broadcast addresses and operation of transmitting an unknown unicast packet in which only RPR MAC DA is the broadcast address are different. Although, the first and second exemplary embodiments contain a description of a "broadcast packet (including unknown unicast packet)", the present exemplary embodiment and the fourth exemplary embodiment described later describe a broadcast packet and an unknown unicast packet separately.

The configuration of the packet ring network system according to the third exemplary embodiment of the present invention is same as the configuration shown in FIG. 1. However, the operations of the inter-ring connecting nodes 101a, 101b, 102a and 102b are different in part from those of the first exemplary embodiment.

Same as the first exemplary embodiment, each of the respective inter-ring connecting nodes 101a, 101b, 102a and 102b receives not only an RPR packet destined for itself but also an RPR packets destined for the other inter-ring connecting node included in the pair of inter-ring connecting node including itself.

Further, when each of the inter-ring connecting nodes 101a, 101b, 102a and 102b receives a broadcast packet or an unknown unicast packet, it transmits the received RPR packet to the next node (transit), and also transfers the packet to a client (in this case, an inter-ring connecting node of the other ring linked by a link) (copy). This operation is same as that of the first exemplary embodiment. Further, in the present exemplary embodiment, when each of the inter-ring connecting nodes 101a, 101b, 102a and 102b receives a unicast packet from a side opposite to the other inter-ring connecting node included in the pair of inter-ring connecting nodes including itself, it transfers the received RPR packet to the next node (transit), and also transfers the packet to the client (copy). Further, when each of the inter-ring connecting nodes 101a, 101b, 102a and 102b receives a unicast packet from the side of the other inter-ring connecting node included in the pair of inter-ring connecting nodes including itself, it takes the packet out of the ring (eliminate), and transfers it to the client. The unicast packet mentioned here is a unicast packet destined for an inter-ring connecting node.

As a result of such an operation, a broadcast packet, an unknown unicast packet and a unicast packet destined for an inter-ring connecting node are transferred to the other ring through a plurality of links 103 and 104. However, as having been described in the first exemplary embodiment, each of them is transferred as a user data packet in the links 103 and 104. In the first exemplary embodiment and the second exemplary embodiment, a broadcast packet or an unknown unicast packet is transferred to the other ring through a plurality of links 103 and 104. In the present exemplary embodiment, a unicast packet destined for an inter-ring connecting node is also transferred to the other ring through a plurality of links 103 and 104.

Further, if each of the inter-ring connecting nodes 101a, 101b, 102a and 102b transmits a packet transferred from the other ring where it does not belong to, to the ring where it belongs, it uses the RPR MAC address of the other inter-ring connecting node included in the pair of inter-ring connecting nodes including itself as RPR MAC SA. For example, assuming that a packet is transferred from the ring 101 to the inter-ring connecting node 102a through the node 101a and the link 103, the inter-ring connecting node 102a which received the packet uses the RPR MAC address of the other inter-ring connecting node 102b included in the pair of inter-ring connecting nodes, instead of the RPR MAC address of itself, as RPR MAC SA. Then, the inter-ring connecting node 102a transmits an RPR packet which indicates the source is the node 102b. In other words, when each of the inter-ring connecting nodes 101a, 101b, 102a and 102b transmits a packet transmitted from the other ring to the ring where it belongs, it transmits the packet while falsifying the source (RPR MAC SA). In the first exemplary embodiment, a node performs such a falsification when it transmits a broadcast packet or an unknown unicast packet to the ring where it belongs, since the packet is transferred from the other ring. In the present exemplary embodiment, however, a node performs such a falsification even if the type of an RPR packet to be transmitted to the ring where it belongs is a unicast packet.

Further, in the present exemplary embodiment, when each of the inter-ring connecting nodes 101a, 101b, 102a and 102b encapsulates a packet (user data packet) transferred from the other ring where it does not belong and transmits it as an unicast packet or an unknown unicast packet to the ring where it belongs, it determines a ringlet based on the information (e.g., MAC DA and MAC SA) included in the user data packet. For example, MAC DA and MAC SA of a user data packet are computed with a prescribed computation algorithm (hush function, etc.), and based on the computation result, it determines the ringlet. Accordingly, the transmission ringlet of a unicast packet or an unknown unicast packet in which the user data packet is encapsulated is determined uniquely by the information included in the user data packet. Therefore, if each of the inter-ring connecting nodes 102a and 102b forming a pair of inter-ring connecting nodes receives a user data packet via the links 103 or 104 and transmits a unicast packet or an unknown unicast packet to the ring 102, each of the inter-ring connecting nodes 102a and 102b transmits a unicast packet or an unknown unicast packet to the same ringlet.

Although, in the first exemplary embodiment and the second exemplary embodiment, an unknown unicast packet is transmitted by bidirectional flooding, in the present exemplary embodiment, each of the inter-ring connecting nodes 101a, 101b, 102a and 102b determines one ringlet, and transmits an unknown unicast packet only to the ringlet.

Regarding a broadcast packet, bidirectional flooding is performed same as the first and second exemplary embodiments. Therefore, if each of the inter-ring connecting nodes 101a, 101b, 102a and 102b encapsulates a user data packet transferred from the other ring where it does not belong and transmits a broadcast packet into the ring where it belongs, it selects both of the two ringlets.

Other operations of the respective inter-ring connecting nodes 101a, 101b, 102a and 102b are same as those of the first exemplary embodiment.

Figure 23:
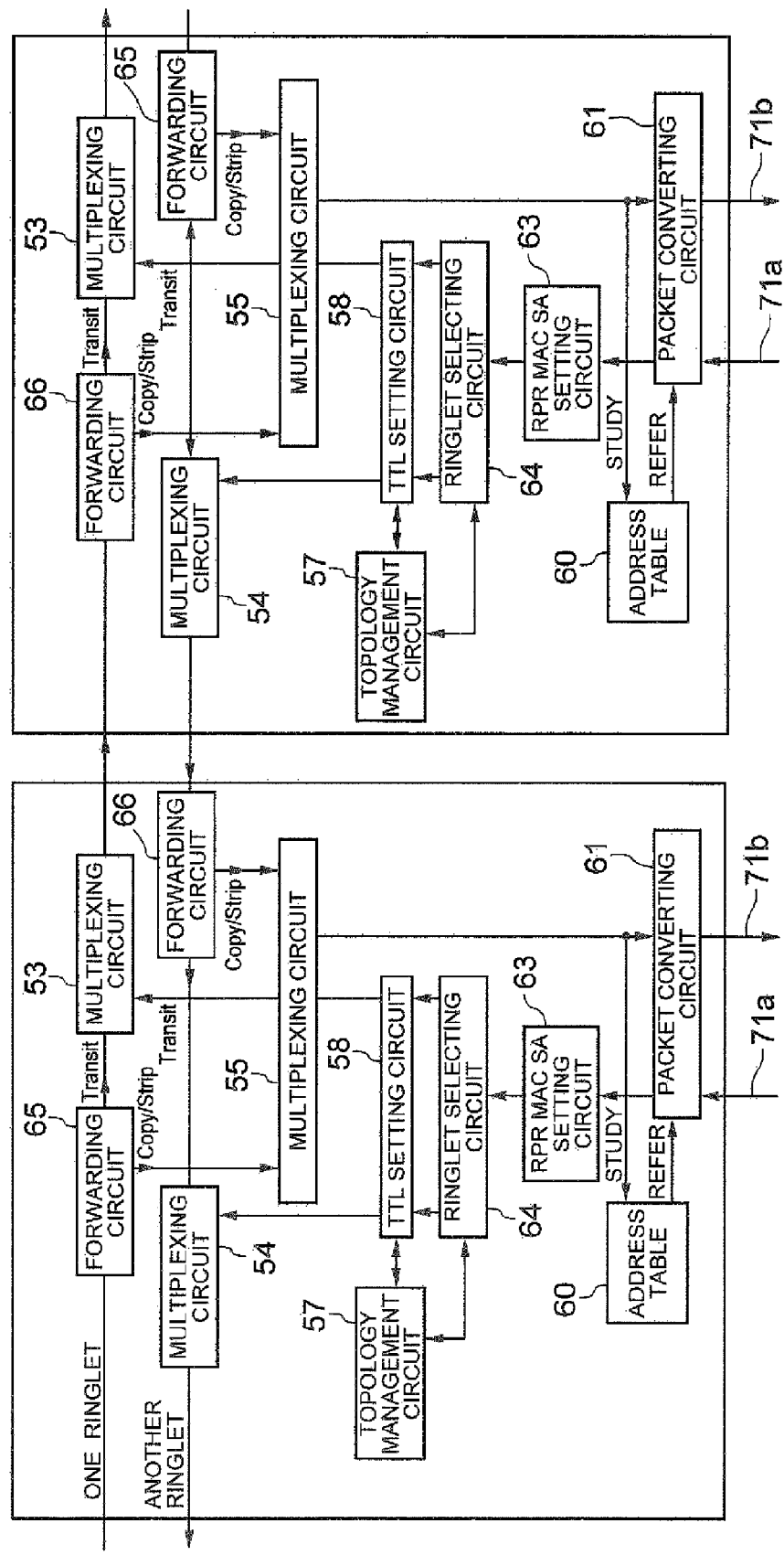
FIG. 23 is a block diagram showing an exemplary configuration of an inter-ring connecting node of the third exemplary embodiment.

FIG. 23 is a block diagram showing an exemplary configuration of an inter-ring connecting node according to the present exemplary embodiment. In FIG. 23, however, two inter-ring connecting nodes forming a pair of inter-ring connecting nodes in the same ring are shown side-by-side. Further, the configuration parts same as those of the first exemplary embodiment are denoted by the same reference numerals as those in FIG. 2, and the descriptions thereof are omitted.

In the present exemplary embodiment, operations of the two forwarding circuits, provided to one inter-ring connecting node, are different. In the description below, the forwarding circuit 65 which receives an RPR packet from a side opposite to the other inter-ring connecting node, included in the pair of inter-ring connecting nodes including itself, is referred to as an outside forwarding circuit 65 for convenience sake. Further, the forwarding circuit 66 which receives an RPR packet from the side of the other inter-ring connecting node, included in the pair of inter-ring connecting nodes including itself, is referred to as an inside forwarding circuit 66. The operation of the inside forwarding circuit 66 is same as the operation of the forwarding circuits 51 and 52 in the first exemplary embodiment.

When the outside forwarding circuit 65 receives a broadcast packet, an unknown unicast packet or a unicast packet (unicast packet destined for itself or destined for an inter-ring connecting node forming a pair of inter-ring connecting nodes together with itself) from the opposite side of the other inter-ring connecting node included in the pair of inter-ring connecting node including itself, it transfers the received RPR packet to the next node (transit), and also transfers the packet to a client (in this case, an inter-ring connecting node of the other ring linked with the link) (copy). Note that when the outside forwarding circuit 65 receives a unicast packet other than a unicast packet destined for the self node or for an inter-ring connecting node forming a pair of inter-ring connecting nodes together with the self node, it transmits the unicast packet to the same ringlet.

The RPR MAC SA setting circuit 63 sets RPR MAC SA of the packet transmitted from the packet conversion circuit 61. However, irrespective of the type of RPR packet obtained by encapsulating the user data packet in the packet conversion circuit 61, the circuit sets the RPR MAC address of the other node included in the pair of inter-ring connecting nodes including the self node as RPR MAC SA. In other words, the RPR MAC SA setting circuit 63 falsifies RPR MAC SA irrespective of the RPR packet, obtained by encapsulating the user data packet in the packet conversion circuit 61, being a broadcast packet, an unknown unicast packet or a unicast packet. The RPR MAC SA setting circuit 63 outputs the packet in which RPR MAC SA is set to the ringlet selecting circuit 64.

If the packet transmitted from the RPR MAC SA setting circuit 63 is a unicast packet or an unknown unicast packet, the ringlet selecting circuit 64 calculates the information (in this case, MAC DA and MAC SA) included in the encapsulated user data packet by using a prescribed computation algorithm (e.g., hush function). According to the calculation result, the ringlet selection circuit 64 determines a ringlet to which it transmits a unicast packet or an unknown unicast packet. Different from the first exemplary embodiment, the minimum path to the destination node is not considered. Further, if the packet transmitted from the RPR MAC SA setting circuit 63 is a broadcast packet, the ringlet selecting circuit 64 selects both of the two ringlets, same as the first exemplary embodiment. After selecting the ringlet, the ringlet selecting circuit 64 outputs the packet to the TTL setting circuit 58.

The TTL setting circuit 58 refers to the topology management circuit 57 to thereby set TTL to the packet transmitted from the ringlet selecting circuit 64. The TTL setting operation of the TTL setting circuit 58 is same as that of the first exemplary embodiment. However, with respect to an unknown unicast packet, it sets TTL such that the unknown unicast packet goes around the ring.

Note that although the physical interface interruption detecting circuit (see FIG. 3) is not shown in FIG. 23, each inter-ring connecting node may have a physical interface interruption detecting circuit same as the case shown in FIG. 3. Further, it is also acceptable that the physical interface interruption detecting circuit detects that light from a link linking the self node and another ring is interrupted, so that it detects that a failure has occurred in the link or in the inter-ring connecting node of the other ring connected with the self node. In this case, the physical interface interruption detecting circuit notifies each of the forwarding circuits 65 and 66 of the failure having occurred, same as the first exemplary embodiment. When each of the forwarding circuits 65 and 66 receives the notification, it transfers to the pass-through transfer mode.

Next, operation will be described.

In the sequence charts of FIGS. 24 to 27, the meaning of the blocks indicated by solid lines, broken lines and dotted lines are same as those of the sequence charts in FIGS. 4 to 7. Further, "[a]" indicates transmission on the ringlet 110a or the ringlet 120a. Similarly, "[b]" indicates transmission on the ringlet 110b or the ringlet 120b. Further, in the sequence charts in FIGS. 24 to 27, description will be given on the premise that the RPR MAC addresses of the inter-ring connecting nodes 101a, 101b, 102a and 102b are "101a", "101b", "102a" and "102b", respectively. Further, an unknown unicast packet is indicated as "UUC". Further, in the description of FIG. 24, it is assumed that the ringlets 110a and 102a transfer a packet in a clockwise direction, and the ringlets 110b and 120b transfer a packet in a counterclockwise direction.

Note that the transfer operation of an RPR broadcast packet in which MAC DA of a user data packet is the broadcast address is same as that of the first exemplary embodiment (see FIGS. 4 and 5), so the description thereof is omitted.

Figure 24:
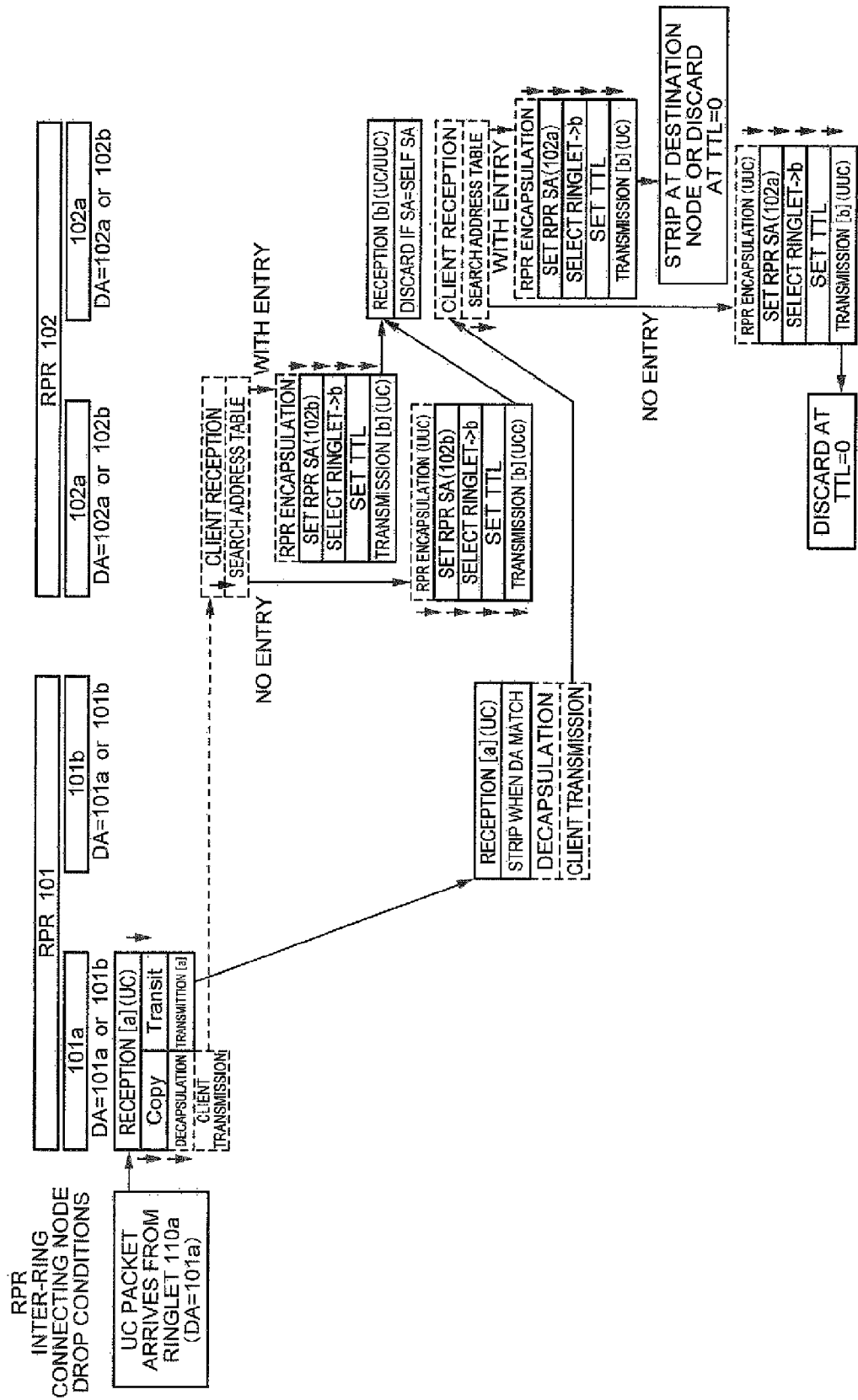
FIG. 24 is a sequence chart showing an exemplary operation of an inter-ring connecting node transferring a unicast packet in a normal state.

FIG. 24 is a sequence chart showing an exemplary operation of transferring a unicast packet by an inter-ring connecting node in a normal state. It is assumed that a unicast packet in which RPR MAC DA is "101a" is transferred in a direction of the ringlet 110a and the inter-ring connecting node 101a receives the unicast packet. Namely, the unicast packet is received on the side opposite to the other inter-ring connecting node 101b included in a pair of inter-ring connecting node including itself. The inter-ring connecting node 101a determines that the packet is destined for itself since RPR MAC DA of the received unicast packet corresponds to the RPR MAC address "101a" of itself. Then, the inter-ring connecting node 101a extracts the unicast packet, transferred from the ringlet 110a, from the ring 101, and transfers it to the client (in this case, inter-ring connecting node 102a) (copy). At the same time, the inter-ring connecting node 101a performs an operation to retransmit the RPR packet to the ringlet from which it receives (transit). The inter-ring connecting node 101a extracts the user data packet from the RPR packet (unicast packet) which is copied (decapsulation), and transmits the user data packet to the client.

When the inter-ring connecting node 102a receives the user data packet from the inter-ring connecting node 101a, it searches the FDB (specifically, the address table 60 provided to the inter-ring connecting node 102a, see FIG. 23) for the RPR MAC address corresponding to the MAC DA included in the user data packet. At this time, the following operation differs depending on whether the table has an entry (search is successful) or does not have an entry (search is unsuccessful).

If the address table 60 has an entry, the inter-ring connecting node 102a sets the searched RPR MAC address as the RPR MAC DA and encapsulates the user data packet to thereby generate a unicast packet. By setting the RPR MAC DA, the node which is to be the destination is set. Further, the inter-ring connecting node 102a sets, as the RPR MAC SA, the address "102b" of the inter-ring connecting node 120b forming a pair of inter-ring connecting nodes together with itself, and falsifies the source address. In the ringlet selecting circuit 64 (see FIG. 23), the inter-ring connecting node 102a selects a ringlet based on the computation result obtained with a prescribed computation algorithm (e.g., hush function) by using the MAC DA and the MAC SA of the user data packet as the computation input data. In FIG. 24, it is assumed that the ringlet 120b is selected. Further, the inter-ring connecting node 102a sets the pop number from the self node to the destination node as the TTL value, and transmits the RPR packet to the selected ringlet.

On the other hand, if the address table 60 does not have an entry, the inter-ring connecting node 102a encapsulates the user data packet by setting the broadcast address as the RPR MAC DA, and generates an unknown unicast packet. Further, the inter-ring connecting node 102a sets the address "102b" of the inter-ring connecting node 120b forming a pair of inter-ring connecting nodes together with itself as RPR MAC SA, and falsifies the source address. Then, in the ringlet selection circuit 64 (see FIG. 23), the inter-ring connecting node 102a selects a ringlet based on the computation result obtained through a prescribed computation algorithm (e.g., hush function) by using the MAC DA and the MAC SA of the user data packet as computation input data. Since the ringlet is selected by the MAC DA and the MAC SA of the user data packet, it is determined uniquely irrespective of an entry being present or not. Accordingly, the ringlet 120b is selected in this example. Further, the inter-ring connecting node 102a sets the TTL value such that the unknown unicast packet goes round the ring, and transmits the unknown unicast packet to the selected ringlet.

The inter-ring connecting node 102b receives the RPR packet transmitted from the inter-ring connecting node 101a to the ringlet 120b. At this time, since the RPR MAC SA of the received RPR packet coincides with the address "102b" of itself, the inter-ring connecting node 102b discards the RPR packet. Therefore, irrespective of the inter-ring connecting node 102a generating a unicast packet or an unknown unicast packet, the RPR packet is discarded by the inter-ring connecting node 102b, so the packet will never be transferred to nodes over the node 102b.

The inter-ring connecting node 101b receives not only an RPR packet destined for itself but also an RPR packet destined for the other inter-ring connecting node included in the pair of inter-ring connecting nodes including itself. Accordingly, the inter-ring connecting node 101b receives a unicast packet in which RPR MAC DA is "101a". In this example, the inter-ring connecting node 101b receives a unicast packet which is transferred from the other inter-ring connecting node 101a included in the pair of inter-ring connecting nodes including itself and in which RPR MAC DA is "101a". Then, the inter-ring connecting node 101b extracts the unicast packet, transferred from the ringlet 110a, from the ring 101, and transfers it to a client (in this example, the inter-ring connecting node 102b) (strip). At this time, the inter-ring connecting node 101b extracts the user data packet from the unicast packet (decapsulation), and transmits the user data packet to the client.

This user data packet is same as the one that the inter-ring connecting node 101a transmitted to the inter-ring connecting node 101a. The operation of the inter-ring connecting node 102b which received the user data packet is same as that of the inter-ring connecting node 102a.

Namely, when an entry exists in the address table 60, the inter-ring connecting node 102b encapsulates the user data while setting the RPR MAC DA to thereby generate a unicast packet. Then, the inter-ring connecting node 102b falsifies the RPR MAC SA, selects a ringlet, and sets the TTL, and transmits the unicast packet to the selected ringlet. When falsifying the RPR AMC SA, the inter-ring connecting node 102b sets the address "102a" of the inter-ring connecting node 102a forming the pair of inter-ring connecting nodes together with itself, as RPR MAC SA. Further, the inter-ring connecting node 102b selects a ringlet with a prescribed computation algorithm by using the MAC DA and the MAC SA of the user data packet, which is same as the one received by the inter-ring connecting node 101a, as computation input data. Accordingly, the selected ringlet is always same as the ringlet selected by the inter-ring connecting node 101a. In this example, the inter-ring connecting node 102b selects the ringlet 120b, and transmits the unicast packet to the ringlet 120b. The unicast packet is received by the destination node.

On the other hand, when there is no entry in the address table 60, the inter-ring connecting node 102b encapsulates the user data by using the broadcast address as the RPR MAC DA to thereby generate an unknown unicast packet. Then, the inter-ring connecting node 102b falsifies the RPR MAC SA, selects a ringlet, and sets the TTL, and transmits the selected unknown unicast packet to the selected ringlet. When falsifying the RPR AMC SA, it sets the address "102a" of the inter-ring connecting node 102a forming the pair of inter-ring connecting nodes with it self, as RPR MAC SA. The selected ringlet is always same as the ringlet selected by inter-ring connecting node 101a, so the inter-ring connecting node 102b selects the ringlet 120b, and transmits the unknown unicast packet to the ringlet 120b. The unknown unicast packet goes round the ring up to the inter-ring connecting node 101a, and it is discarded there. Therefore, the unknown unicast packet is received at each node in the ring, to it is received by a desired node even though there is no entry.

As described above, when each of the inter-ring connecting nodes 101a and 101b receives a user data packet via the link 103 or 104, it selects the same ringlet (in this case, ringlet 102b), and transmits the RPR packet to the ringlet. Then, since each of the inter-ring connecting nodes 101a and 101b falsifies the RPR MAC SA, the RPR packet transmitted by the inter-ring connecting node 101a is discarded by the inter-ring connecting node 101b irrespective of it being a unicast packet of an unknown unicast packet. The RPR packet transmitted by the inter-ring connecting node 101b is received by a desired node which is the destination, irrespective of the packet being a unicast packet or an unknown packet. Accordingly, irrespective of the address table search performed by each of the inter-ring connecting node 101a and 101b being successful or unsuccessful, it is possible to transfer the packet to the desired node which is the destination while preventing duplicate reception.

Although the case of selecting the ringlet 120b is described in this example, operation in the case of selecting the ringlet 120a is same.

Further, in the case of a network in which traffics from an inter-ring connecting node to a specific node are concentrated, the minimum path is always selected and a packet is transferred through only a signal ringlet in the first exemplary embodiment, so only a half band of the ring can be used. In contrast, in the present exemplary embodiment, a ringlet is selected based on information of user data packet (in this case, MAC DA and MAC SA), so it is possible to transmit a packet to both ringlets according to the information of user data packet. Accordingly, in the present exemplary embodiment, the whole bands of the rings can be used (bands of two ringlets can be used), so load distribution can be made. Further, in order to improve the distribution, IP address information within the user data packet can be added as computation input data.

Figure 25:
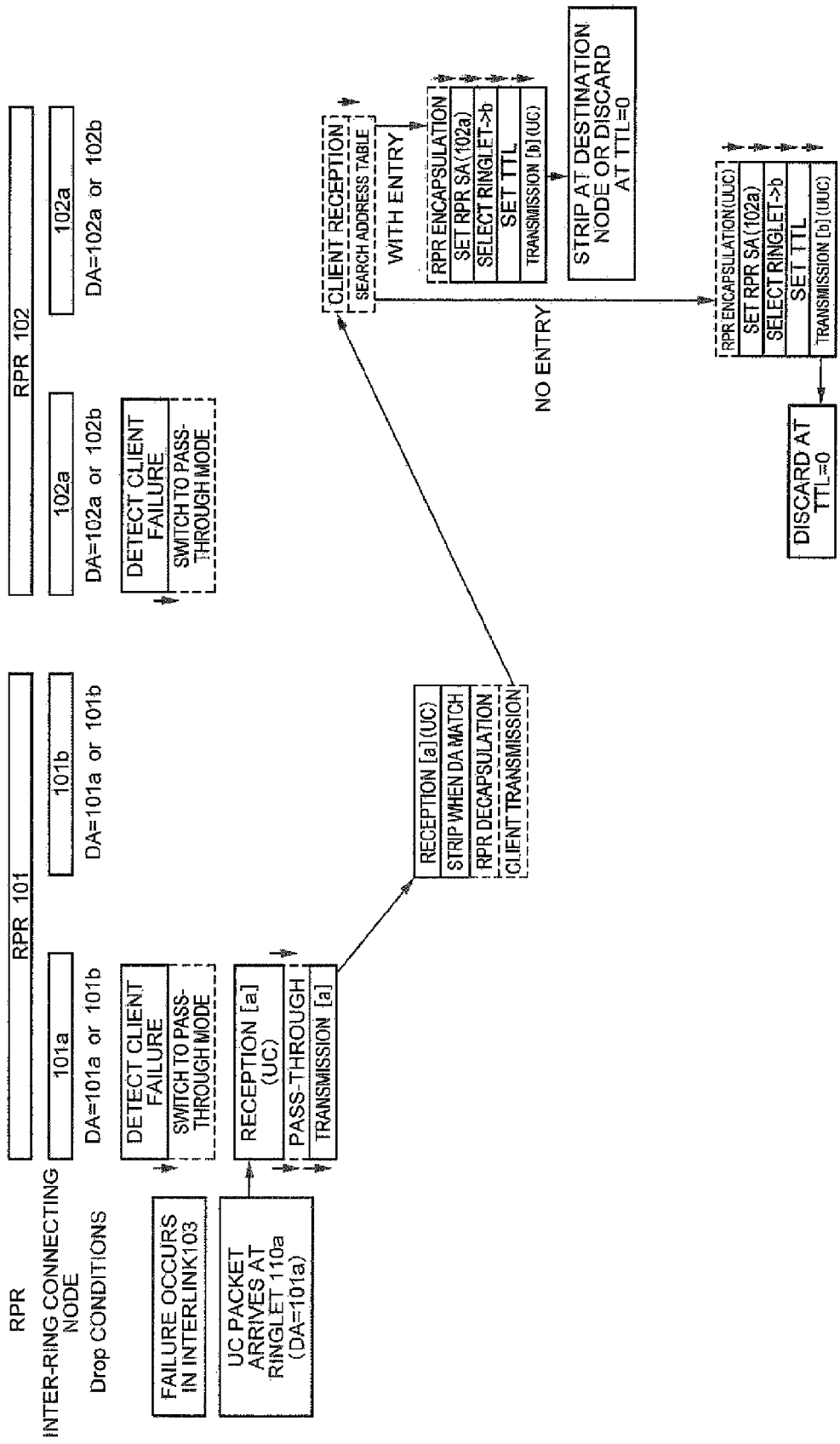
FIG. 25 is a sequence chart showing an exemplary operation of an inter-ring connecting node transferring a unicast packet when a failure occurs.

FIG. 25 is a sequence chart showing an exemplary operation of an inter-ring connecting node transmitting a unicast packet at the time of failure. Assuming that a failure occurs in the link 103 linking the inter-ring connecting nodes 101a and 102a, each of the inter-ring connecting nodes 101a and 102a detects the failure having occurred in the link 103, and is switched to the pass-through transfer mode.

Assuming that a unicast packet in which the RPR MAC DA is "101a" is transferred in a direction of the ringlet 110a, and the inter-ring connecting node 101a receives the unicast packet, the inter-ring connecting node 101a transfers the received unicast packet directly to the next node (inter-ring connecting node 101b) in the ringlet 110a, since the node 101a is switched to the pass-through transfer mode.

The inter-ring connecting node 101b receives not only an RPR packet destined for itself but also an RPR packet destined for the other inter-ring connecting node included in the pair of inter-ring connecting nodes including itself. Therefore, the inter-ring connecting node 101b receives a unicast packet in which the RPR MAC DA is "101a". In this example, the inter-ring connecting node 101b receives a unicast packet which is transferred from the other inter-ring connecting node 101a included in the pair of inter-ring connecting nodes including itself and in which the RPR MAC DA is "101a". Then, the inter-ring connecting node 101b extracts the unicast packet, transferred from the ringlet 110a, from the ring 101, and transfers to a client (in this case, inter-ring connecting node 102b) (strip). At this time, the inter-ring connecting node 101b extracts the user data packet from the unicast packet (decapsulation), and transmits the user data packet to the client.

The operation of the inter-ring connecting node 102b which received the user data packet is same as that of the inter-ring connecting node 102b described by using FIG. 24. Accordingly, the RPR packet transmitted by the inter-ring connecting node 101b is received at a desired destination node irrespective of the packet being a unicast packet or an unknown unicast packet. Note that FIG. 25 shows a case where the ringlet 120b is selected, same as FIG. 24. Further, the inter-ring connecting node 102a will never receive a user data packet from the link 103, so a unicast packet or an unknown unicast packet will never be transmitted from the inter-ring connecting node 102a. Accordingly, a packet can be transferred to a desired destination node while preventing duplicate reception irrespective of whether address table search by the inter-ring connecting node 101b being successful or unsuccessful.

Further, even if the inter-ring connecting node 101b selects the ringlet 120a, the inter-ring connecting node 101a transmits the RPR packet from the inter-ring connecting node 101b, since the inter-ring connecting node 101a is in the pass-through transfer mode. Accordingly, even if the inter-ring connecting node 101b selects the ringlet 120a, a packet can be transferred to a desired destination node while preventing duplicate reception.

Further, an inter-ring connecting node which cannot perform packet transfer between rings any more is switched to the pass-through transfer mode, and transfers the received packet to the next node. Further, the inter-ring connecting node receives not only an RPR packet destined for itself but also an RPR packet destined for the other inter-ring connecting node included in a pair of inter-ring connecting nodes including itself, and transfers the packet to the other ring. Accordingly, even if a link, among the links between the rings, becomes not able to transfer a packet, packet transfer between the rings can be performed by using the other link, which can realize failure recovery at a high speed. Further, since an operation of eliminating the MAC address of a node, which was active, from the FDB is not necessary, a failure can be recovered at a high speed.

Figure 26:
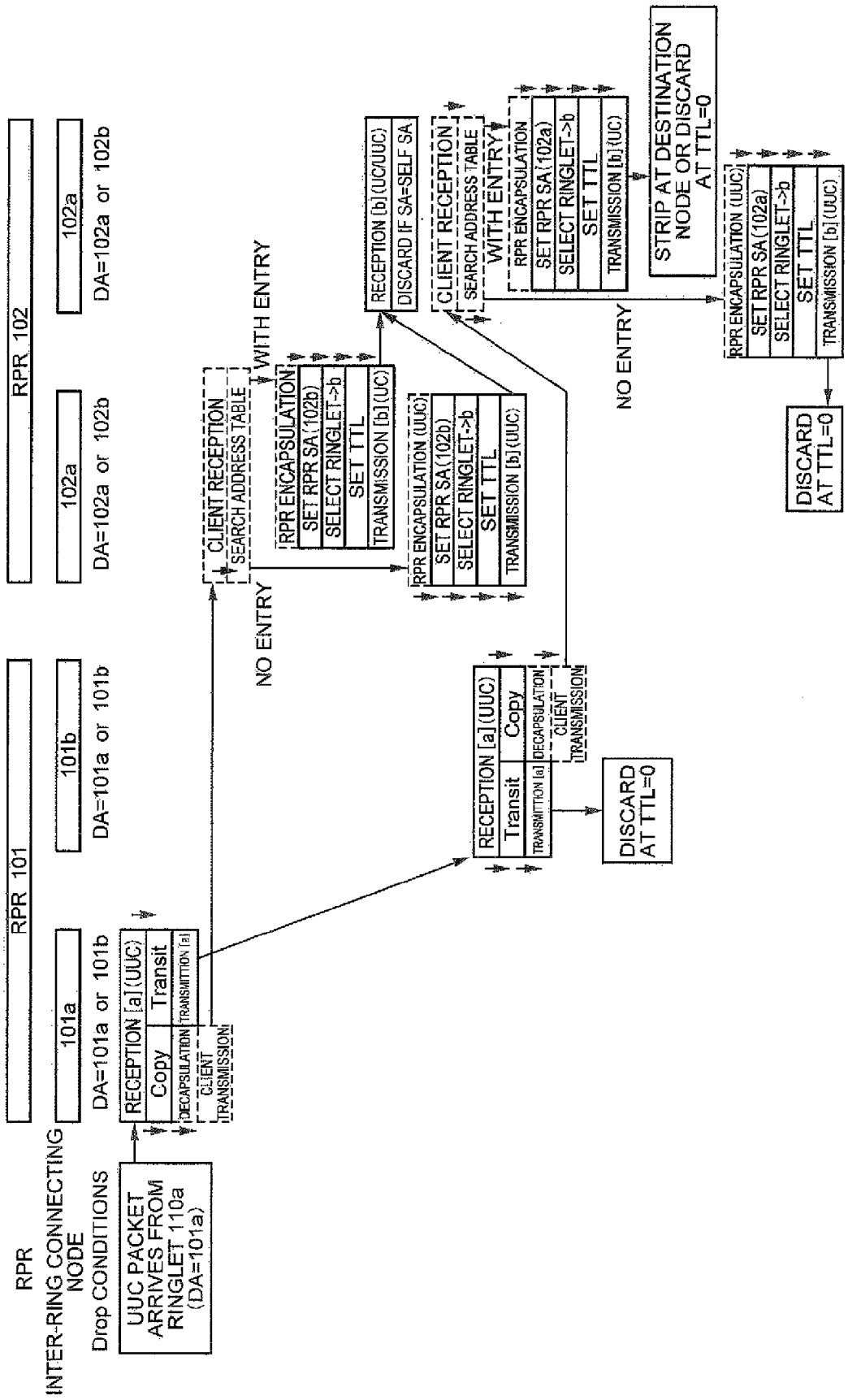
FIG. 26 is a sequence chart showing an operation of an inter-ring connecting node transferring an unknown unicast packet in a normal state.

FIG. 26 is a sequence chart showing an operation of an inter-ring connecting node transferring an unknown unicast packet in a normal state. Assuming that the inter-ring connecting node 101a receives an unknown unicast packet transferred in a direction of the ringlet 110a, the inter-ring connecting node 101a extracts an unknown unicast packet transferred from the ringlet 110a from the ring 101, and transfers it to a client (in this case, inter-ring connecting node 102a) (copy). At the same time, the inter-ring connecting node 101a performs operation of retransmitting an RPR packet to the ringlet from which it received (Transit). The inter-ring connecting node 101a extracts the user data packet from the RPR packet (unknown unicast packet) which is copied (decapsulation), and transmits the user data packet to the client.

Further, the inter-ring connecting node 101b which receives the unknown unicast packet from the inter-ring connecting node 101a operates in the same manner as the inter-ring connecting node 101a. The unknown unicast packet is discarded when the TTL becomes 0 in the ring 101.

The inter-ring connecting node 102a receives the user data packet from the inter-ring connecting node 101a, and similarly, the inter-ring connecting node 102b receives the user data packet from the inter-ring connecting node 101b. This user data packet is decapsulated from the unknown unicast packet, so MAC DA is not the broadcast address. Accordingly, the operations of the inter-ring connecting nodes 102a and 102b which received the user data packet are same as the operations of the inter-ring connecting nodes 102a and 102b described by using FIG. 24. Therefore, a packet can be transferred to a desired destination node while preventing supplicate reception, irrespective of whether address table search performed by each of the inter-ring connecting nodes 101a and 101b being successful or unsuccessful.

Figure 27:
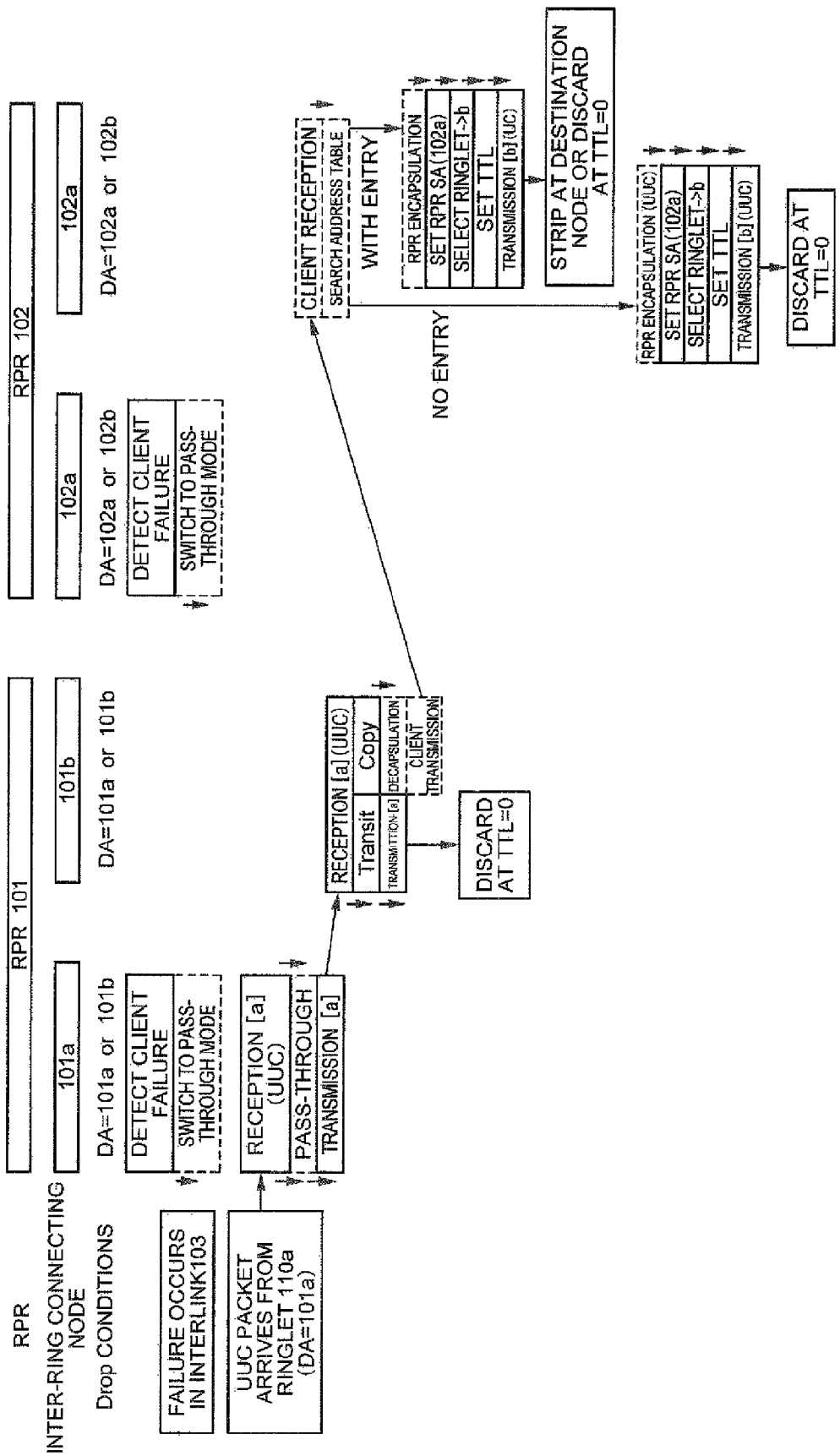
FIG. 27 is a sequence chart showing an exemplary operation of an inter-ring connecting node transferring a unknown unicast packet when a failure occurs.

FIG. 27 is a sequence chart showing an exemplary operation of an inter-ring connecting node transferring an unknown unicast packet when a failure occurs. Assuming that a failure occurs in the link 103 linking the inter-ring connecting nodes 101a and 102a, each of the inter-ring connecting nodes 101a and 102a detects a failure having occurred in the link 103, and is switched to the pass-through transfer mode.

Assuming that the unknown unicast packet is transferred in a direction of the ringlet 110a and is received by the inter-ring connecting node 101a, the inter-ring connecting node 101a directly transfers the received unknown unicast packet to the next node (inter-ring connecting node 101b) in the ringlet 110a since the inter-ring connecting node 101a is switched to the pass-through transfer mode. The inter-ring connecting node 101b which received the unknown unicast packet extracts the unknown unicast packet from the ring 101, and transfers it to a client (in this case, inter-ring connecting node 102b) (copy). At the same time, the inter-ring connecting node 101b performs an operation of retransmitting an RPR packet to the ringlet from which it received (transit). The inter-ring connecting node 101b extracts the user data packet from the RPR packet (unknown unicast packet) which is to be copied (decapsulation), and transmits the user data packet to the client.

The user data packet is decapsulated from the unknown unicast packet, so MAC DA is not a broadcast address. Therefore, the operation of the inter-ring connecting node 102*b* which received the user data packet is same as that of the inter-ring connecting node 102*b* described by using FIG. 25. Accordingly, a packet can be transferred to a desired destination node while preventing supplicate reception irrespective of whether address table search in the inter-ring connecting node 101*b* being successful or unsuccessful.

Further, FIG. 27 shows a case where the ringlet 120*b* is selected at the time of selecting a ringlet, same as FIG. 25. Even if the inter-ring connecting node 101*b* selects the ringlet 120*a*, the inter-ring connecting node 101*a* transmits the RPR packet from the inter-ring connecting node 101*b* since the inter-ring connecting node 101*a* is in the pass-through transfer mode. Accordingly, even if the inter-ring connecting node 101*b* selects the ringlet 120*a*, the packet can be transferred to a desired destination node while preventing supplicate reception.

This example has described a case that when a failure occurs in a link linking two rings, the inter-ring connecting nodes on both ends of the link are switched to the pass-through transfer mode. As described above, even if a failure occurs in a link, the inter-ring connecting node in the ring of a packet transmitting side may perform an operation of transferring the packet to the other ring same as that in a normal state. For example, even if a failure occurs in the link 103, the operation of the inter-ring connecting node 101*a* transferring the packet to the ring 102 at the time of receiving each kind of packet may be same as that in a normal state. However, in view of preventing complication of operation, it is preferable that the inter-ring connecting nodes 101*a* and 102*a* on both ends become the pass-through transfer mode when a failure occurs in the link 103.

Next, operation of the present invention will be described with reference to the drawings illustrating rings.

Figure 28A:
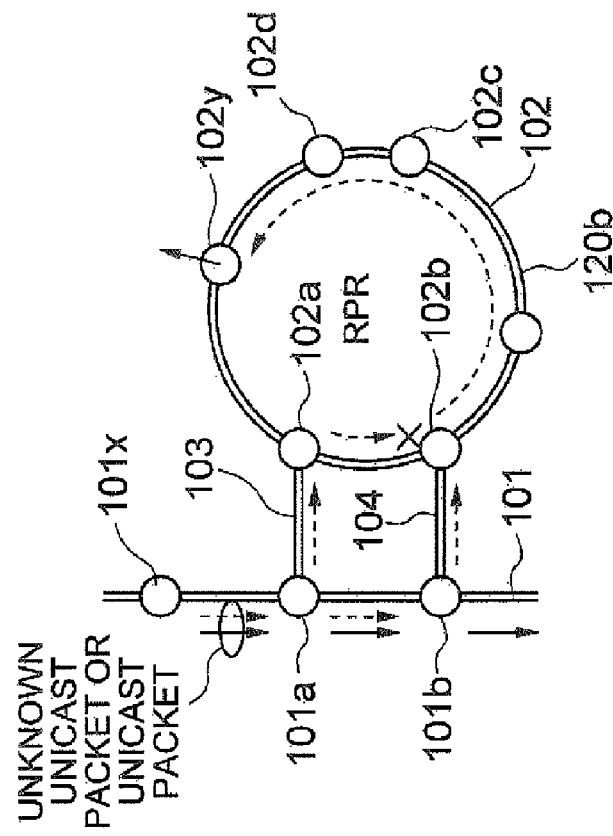
FIG. 28 is an illustration showing an operation when a unicast packet destined for an inter-ring connecting node or an unknown unicast packet is transferred in one ring in a normal state.
Figure 28B:
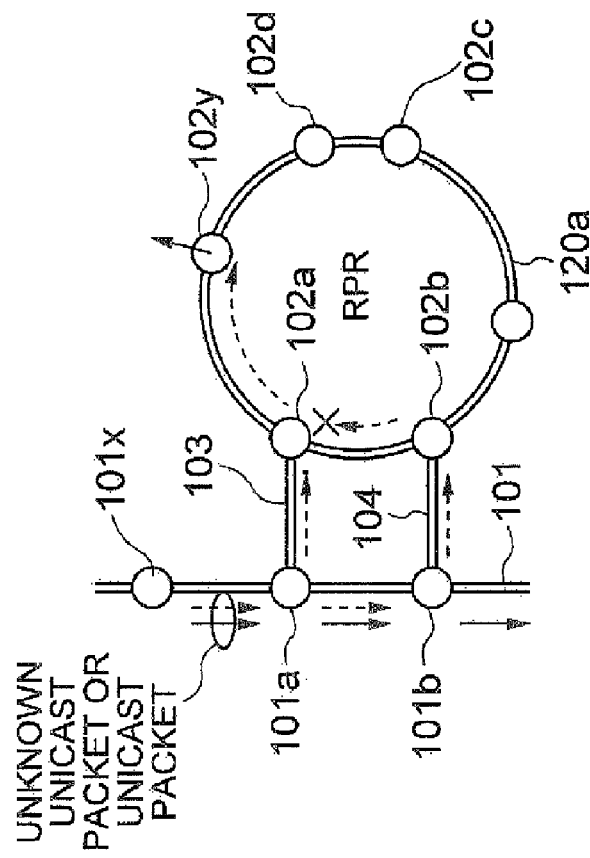

FIG. 28 is an illustration showing an operation when a unicast packet or an unknown unicast packet destined for an inter-ring connecting node is transferred in one ring in a normal state. In FIG. 28, paths of unknown unicast packet are indicated by solid lines, and paths of unicast packet are indicated by dotted lines. Note that a user data packet is transferred on the links 103 and 104. Further, FIG. 28(*a*) shows a case where the ringlet 120*a* which transfers a packet in a clockwise direction is selected in the inter-ring connecting nodes 102*a* and 102*b*. FIG. 28(*b*) shows a case where the ringlet 120*b* which transfers a packet in a counterclockwise direction is selected in the inter-ring connecting nodes 102*a* and 102*b*. Note that in the description of operation shown in FIG. 28, it is assumed that the configuration of the inter-ring connecting nodes 101*a*, 101*b*, 102*a* and 102*b* is a configuration as shown in FIG. 23. However, it may be a configuration including a physical interface interruption detecting circuit same as the physical interface interruption detecting circuit 62 shown in FIG. 3.

When the node 101*x* transfers an unknown unicast packet or a unicast packet, the inter-ring connecting node 101*a*, of the inter-ring connecting nodes 101*a* and 101*b* forming a pair of inter-ring connecting nodes on the rink 101, first receives the RPR packet. The inter-ring connecting node 101*a* transfers the unknown unicast packet or the unicast packet to the next node which is the inter-ring connecting node 101*b* (transit). Further, the inter-ring connecting node 101*a* decapsulates the unknown unicast packet or the unicast packet, and transfers the user data packet in which MAC DA is the unicast address, to the inter-ring connecting node 102*a* via the link 103.

The inter-ring connecting node 101*b* receives not only an RPR packet destined for itself but also an RPR packet destined for the other inter-ring connecting node included in the pair of inter-ring connecting nodes including itself. The inter-ring connecting node 101*b* receives a unicast packet destined for the node 101*a* or an unknown unicast packet (strip). Further, the inter-ring connecting node 101*b* decapsulates the RPR packet, and transfers the user data packet, in which MAC DA is the unicast address, to the inter-ring connecting node 102*b* via the link 104.

The inter-ring connecting node 102*a* searches the address table for the RPR MAC address corresponding to MAC DA of the user data packet, in which MAC DA is a unicast address, received from a client port (link 103). When the search was performed successfully, the inter-ring connecting node 102*a* encapsulate the user data packet, and sets the RPR MAC address obtained from the search to be RPR MAC DA to thereby generate a unicast packet. Further, the inter-ring connecting node 102*a* sets RPR MAC SA by using the RPR MAC address of the inter-ring connecting node 102*b* forming a pair of inter-ring connecting nodes. Further, the inter-ring connecting node 102*a* selects a ringlet based on the computation result obtained through a prescribed computation algorithm (e.g., hush function) by using the MAC DA and the MAC SA of the user data packet as computation input data. FIG. 28(*a*) shows a case of selecting the ringlet 120*a*, and FIG. 28(*b*) shows a case of selecting the ringlet 120*b*.

Further, when the inter-ring connecting node 102*a* failed to search for the RPR AMC address, it encapsulates the user data and sets the broadcast address to be the RPR MAC DA to thereby generate an unknown unicast packet. Further, it sets the RPR MAC SA by using the RPR MAC address of the inter-ring connecting node 102*b*. Further, the inter-ring connecting node 102*a* selects a ringlet. The ringlet to be selected depends on the user data packet, so it is determined uniquely irrespective of whether the search was performed successfully or not.

The inter-ring connecting node 102*a* sets the TTL value, and transmits the unicast packet or the unknown unicast packet generated to the selected ringlet.

The operation of the inter-ring connecting node 102*b* is same as the operation of the inter-ring connecting node 102*a*. The inter-ring connecting nodes 102*a* and 102*b* receive the user data packets including the same information, so the inter-ring connecting node 102*b* selects the same ringlet as that selected by the inter-ring connecting node 102*a*. Then, the inter-ring connecting node 102*b* transmits the unicast packet or the unknown unicast packet generated to the selected ringlet.

Each of the inter-ring connecting nodes 102*a* and 102*b* falsifies the RPR MAC SA, selects the same ringlet, and transfers an RPR packet (in this case, a unicast packet or an unknown unicast packet). Accordingly, the RPR packet transmitted by one inter-ring connecting node is eliminated by the other inter-ring connecting node, and the RPR packet transmitted by the inter-ring connecting node which performs the elimination arrives at the destination node (in this case, assumed to be the node 102*y*). In the example shown in FIG. 28(*a*), the RPR packet transmitted by the inter-ring connecting node 102*b* is eliminated by the inter-ring connecting node 102*a*, and the RPR packet transmitted by the inter-ring connecting node 102*a* arrives at the node 102*y*. Further, in the example shown in FIG. 28(*b*), the RPR packet transmitted by the inter-ring connecting node 102*a* is eliminated by the inter-ring connecting node 102*b*, and the RPR packet transmitted by the inter-ring connecting node 102*b* arrives at the node 102*y*. Accordingly, the packet can be transferred to the desired destination node while preventing duplicate reception irrespective of whether the address table search was performed successfully or not by each of the inter-ring connecting node 101a and 101b.

Further, since the ringlet is determined depending on the user data packet, there is no case that only one ringlet is selected. Therefore, it is possible to prevent the load from being concentrated on one ringlet.

In the following description, it is on the premise that each of the inter-ring connecting nodes 101a, 101b, 102a and 102b has a physical interface interruption detecting circuit same as the physical interface interruption detecting circuit 62 shown in FIG. 3, besides the configuration shown in FIG. 23, so it has a configuration capable of being transferred to the pass-through transfer mode.

Figure 29:
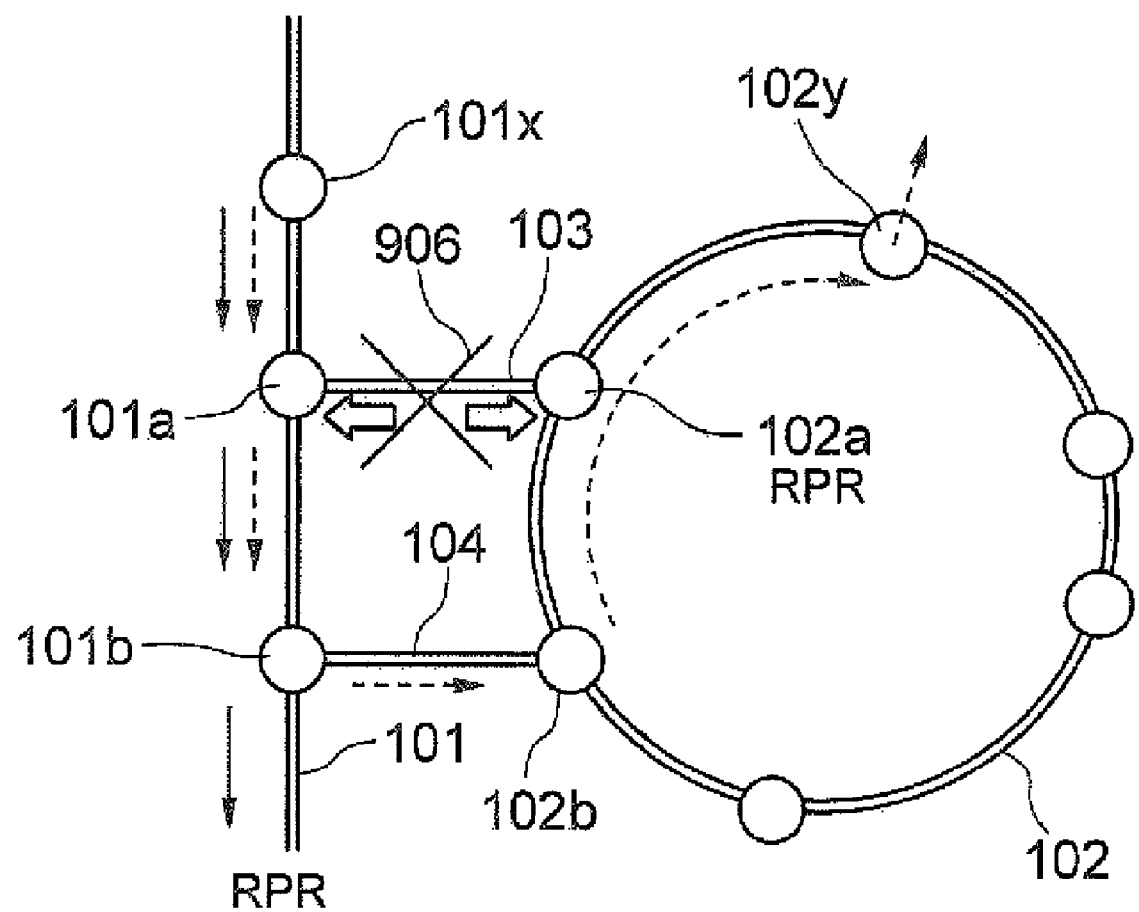
FIG. 29 is an illustration showing an operation when a failure occurs in a link linking rings in the case where a unicast packet destined for an inter-ring connecting node or an unknown unicast packet is transferred in one ring.

FIG. 29 is an illustration showing an operation when a failure occurs in a link linking rings when a unicast packet or an unknown unicast packet destined for an inter-ring connecting node is transferred in one ring. Assuming that a failure 606 occurs in the link 103, the inter-ring connecting nodes 101a and 102b are immediately switched to the pass-through transfer mode. Even if the node 101x transmits a unicast packet destined for the inter-ring connecting node 101a or the inter-ring connecting node 101b or transmits an unknown unicast packet, the inter-ring connecting node 101a, which is in the pass-through transfer mode, transmits the RPR packet.

The inter-ring connecting node 101b receives a unicast packet passed through the inter-ring connecting node 101a (a unicast packet destined for the inter-ring connecting node 101a or the inter-ring connecting node 101b) or an unknown unicast packet. Then, the inter-ring connecting node 101b decapsulates the received RPR packet, and transmits the user data packet to the inter-ring connecting node 102b.

The inter-ring connecting node 102b searches for the RPR MAC address corresponding to the MAC DA of the user data packet. If the inter-ring connecting node 102b studied the RPR MAC address corresponding to the MAC DA of the user data packet, it performs the search successfully. The inter-ring connecting node 102b encapsulates the user data packet to thereby generates a unicast packet, selects a ringlet based on the user data packet, and transmits the unicast packet to the ringlet. At this time, since the inter-ring connecting node 102a is in the pass-through transfer mode, the unicast packet arrives at the destination node (assumed to be node 102y) regardless of the ringlet selected.

Further, it is assumed that there is no entry in the address table since the studied content is eliminated or the like because of aging (a function in which an entry which has not been referred to for a prescribed time period is eliminated from the address table for an effective use of the address table). In such a case, the inter-ring connecting node 102b failed in searching, so it encapsulates the user data packet to thereby generate an unknown unicast packet, selects the ringlet based on the user data packet, and transmits the unknown unicast packet to the ringlet. Since the inter-ring connecting node 102a is in the pass-through transfer mode, the unknown unicast packet arrives at the destination node 102y regardless of which ringlet being selected.

As described above, even if a failure 906 occurs in the link 103, an operation of eliminating, from the FDB, the MAC address of a node, which has been active, as the conventional art, is not necessary, so failure recovery can be realized at a high speed.

Further, in the process that a packet from the node 101x arrives at the node 102y, if each node has not studied the corresponding relationship between RPR MAC SA and MAC SA in the user data packet, each node stores the corresponding relationship in the address table. Consequently, the node 102y becomes capable of resending the unicast packet to the node 101x through a path via the node 102b and the node 101b. Further, even in a case where the node 102y transmits the unicast packet to the node 101x through this path, if each node has not studied the corresponding relationship between RPR AMC SA and MAC SA in the user data packet, each node stores the corresponding relationship. Consequently, bidirectional unicast communications between the node 101x and the node 102y are established.

Figure 30:
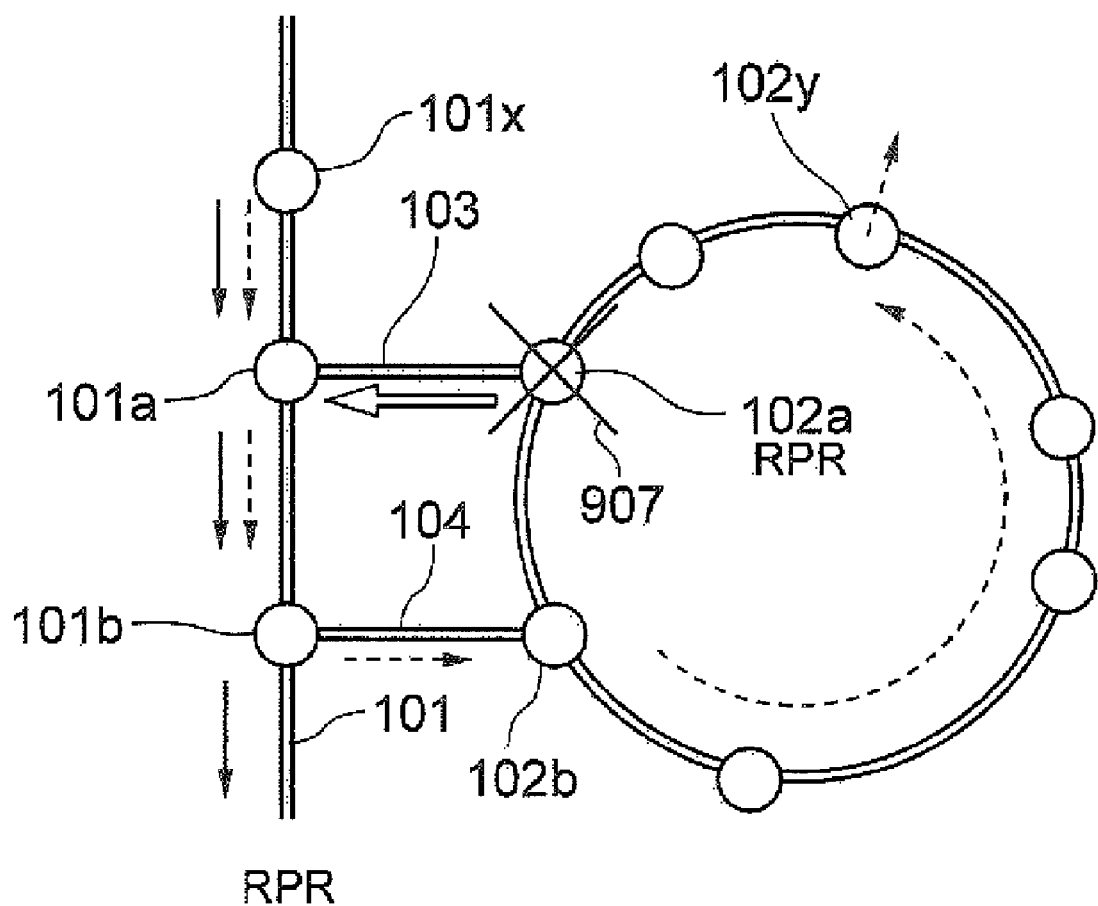
FIG. 30 is an illustration showing an operation when a failure occurs in an inter-ring connecting node of the other ring in the case where a unicast packet destined for an inter-ring connecting node or an unknown unicast packet is transferred in one ring.

FIG. 30 is an illustration showing an operation when a failure occurs in an inter-ring connecting node of the other ring in the case where a unicast packet destined for an inter-ring connecting node or an unknown unicast packet is transferred in one ring. If a failure occurs in the other inter-ring connecting node forming a pair of inter-ring connecting nodes, each inter-ring connecting node does not determine a ringlet by computation based on the information included in the user data packet but selects a ringlet which transmits a packet to the side opposite to the inter-ring connecting node in which the failure occurs. When a failure occurs in the other inter-ring connecting node forming a pair of inter-ring connecting nodes, each inter-ring connecting node starts protective operation. At this time, information of the failure occurred position is recorded in the topology management circuit 57 (see FIG. 23). The ringlet selecting circuit 64 of each inter-ring connecting node confirms the recorded content of the topology management circuit at the time of selecting the ringlet, and if a failure occurs in the other inter-ring connecting node forming a pair of inter-ring connecting nodes, it selects a ringlet which transmits a packet to the side opposite to the inter-ring connecting node.

Assuming that a failure 907 occurs in the inter-ring connecting node 102a, the mode of the inter-ring connecting node 101a immediately switched to the pass-through transfer mode. In the case where the node 101x transmits a packet to the node 102y, the operation from an unknown unicast packet or a unicast packet transmitted by the node 101x arriving at the inter-ring connecting node 101b until the inter-ring connecting node 101b decapsulates the unicast packet and transmits it to the inter-ring connecting node 102b is same as the case described in FIG. 29.

Further, the ring 102 autonomously starts protective operation (e.g., steering mode) when the failure 907 occurs.

The inter-ring connecting node 102b searches for the RPR AMC address corresponding to the MAC DA of the received user data packet. If the inter-ring connecting node 102b has studied the RPR MAC address corresponding to the MAC DA of the user data packet, it becomes successful in the search, so the inter-ring connecting node 102b encapsulates the user data packet and creates a unicast packet. Since a failure has occurred in the other inter-ring connecting node 102a of the pair of inter-ring connecting nodes, the inter-ring connecting node 102b selects a ringlet for transferring the packet in a direction opposite to the inter-ring connecting node 102a, and transmits the unicast packet to the ringlet. Consequently, the unicast packet including the user data packet which is included in the unknown unicast packet transmitted by the node 101x arrives at the node 102y.

Further, if there is no entry in the table because the studied content is eliminated due to aging or the like, the search is failed. In this case, the inter-ring connecting node 102b encapsulates the user data packet to thereby generate an unknown unicast packet. Further, same as the case described above, the inter-ring connecting node 102b selects a ringlet for transmitting the packet to a direction opposite to the inter-ring connecting node 102a, and transmits the unicast packet to the ringlet. Consequently, the unknown unicast packet including the user data packet included in the unknown unicast packet transmitted by the node 101x arrives at the node 102y. Further, establishment of bidirectional unicast communications between the node 101x and the node 102y is performed same as the case described in FIG. 29.

Figure 31:
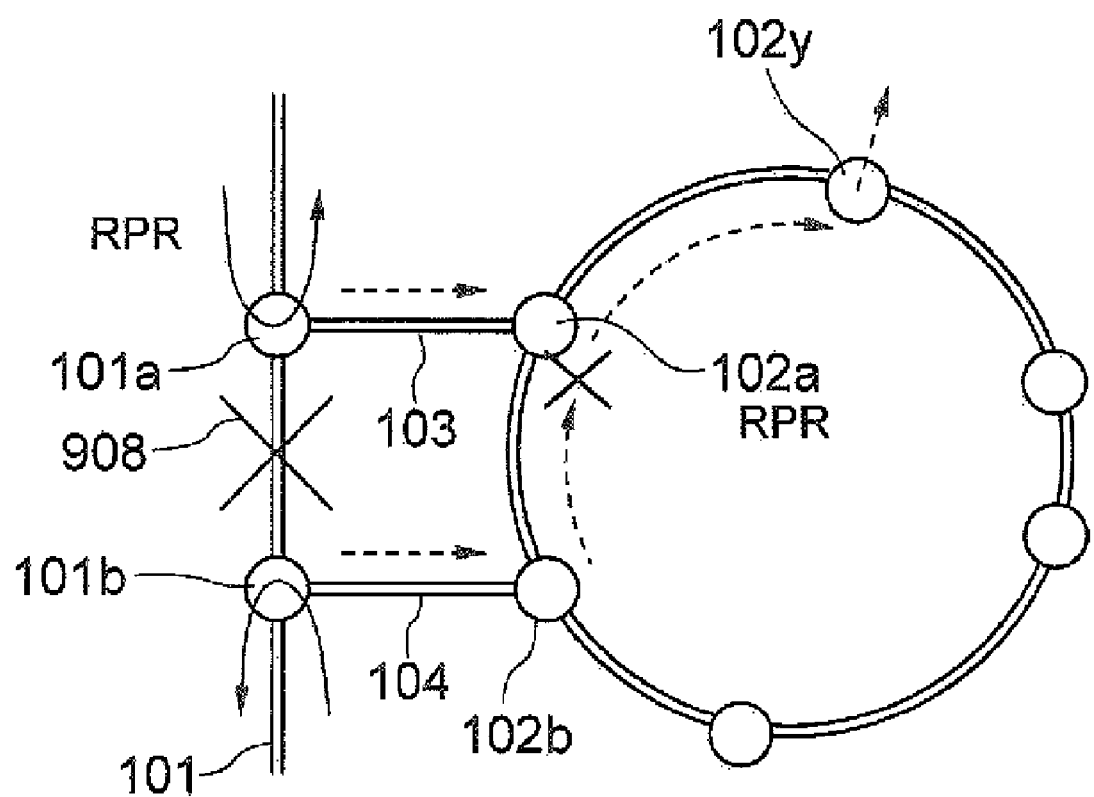
FIG. 31 is an illustration showing an operation when a failure occurs in an interval between ring connecting nodes of one ring in the case where a unicast packet destined for an inter-ring connecting node or an unknown unicast packet is transferred in the ring.

FIG. 31 is an illustration showing an operation when, in the case that a unicast packet destined for an inter-ring connecting node or an unknown unicast packet is transferred in one ring, a failure occurs in an interval between ring connecting nodes in the ring. The ring 101 autonomously starts protective operation since a failure 908 has occurred in an interval between ring connecting nodes. With this protective operation, the inter-ring connecting nodes 101a and 101b can receive the RPR packet transmitted by the node 101x. Each of the inter-ring connecting nodes 101a and 101b transmits the user data packet to the inter-ring connecting node 102a or 102b, same as the case shown in FIG. 28. The operation of the inter-ring connecting nodes 102a and 102b receiving the user data packet is same as the case shown in FIG. 28. Note that FIG. 31 shows a case of selecting a ringlet in the same manner as that shown in FIG. 28(a).

Figure 32:
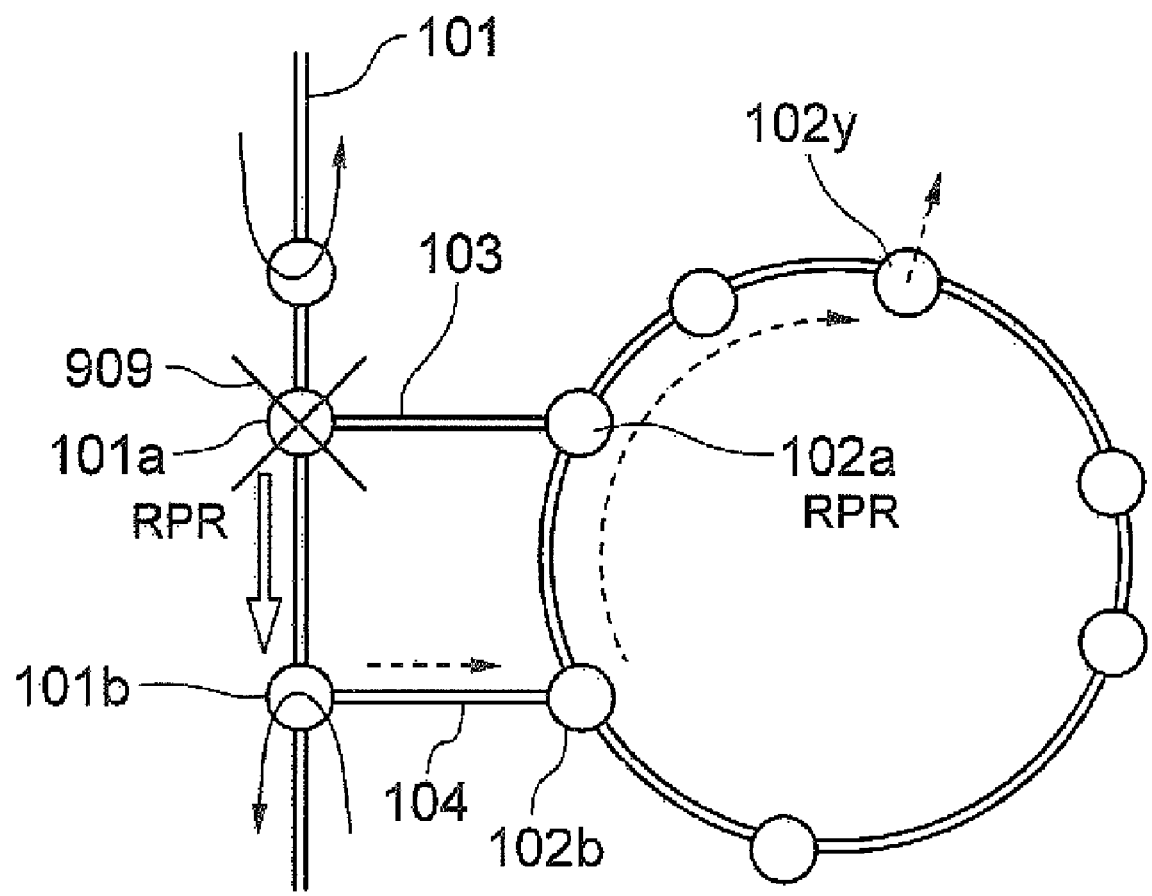
FIG. 32 is an illustration showing an operation when a failure occurs in an inter-ring connecting node of one ring in the case where a unicast packet destined for an inter-ring connecting node or an unknown unicast packet is transferred in the ring.

FIG. 32 is an illustration showing an operation in the case where a unicast packet destined for an inter-ring connecting node or an unknown unicast packet is transferred in one ring and a failure has occurred in an inter-ring connecting node in the ring. Assuming that a failure 909 occurs in the inter-ring connecting node 101a, the mode of the inter-ring connecting node 102a is immediately switched to the pass-thorough transfer mode. Further, the ring 101 autonomously starts protective operation since the failure 909 has occurred. The inter-ring connecting node 101b receives not only an RPR packet destined for itself but also an RPR packet in which the RPR MAC address of the inter-ring connecting node 101a is RPR MAC DA. Accordingly, the inter-ring connecting node 101b receives the unicast packet transmitted by the node 101x to the node 101a, and also receives the unknown unicast packet transmitted by the node 101x. The operation from the time that the inter-ring connecting node 101b receives a unicast packet or an unknown unicast packet from the node 101x until the node 102y receives the packet is same as that described in FIG. 29.

Figure 33:
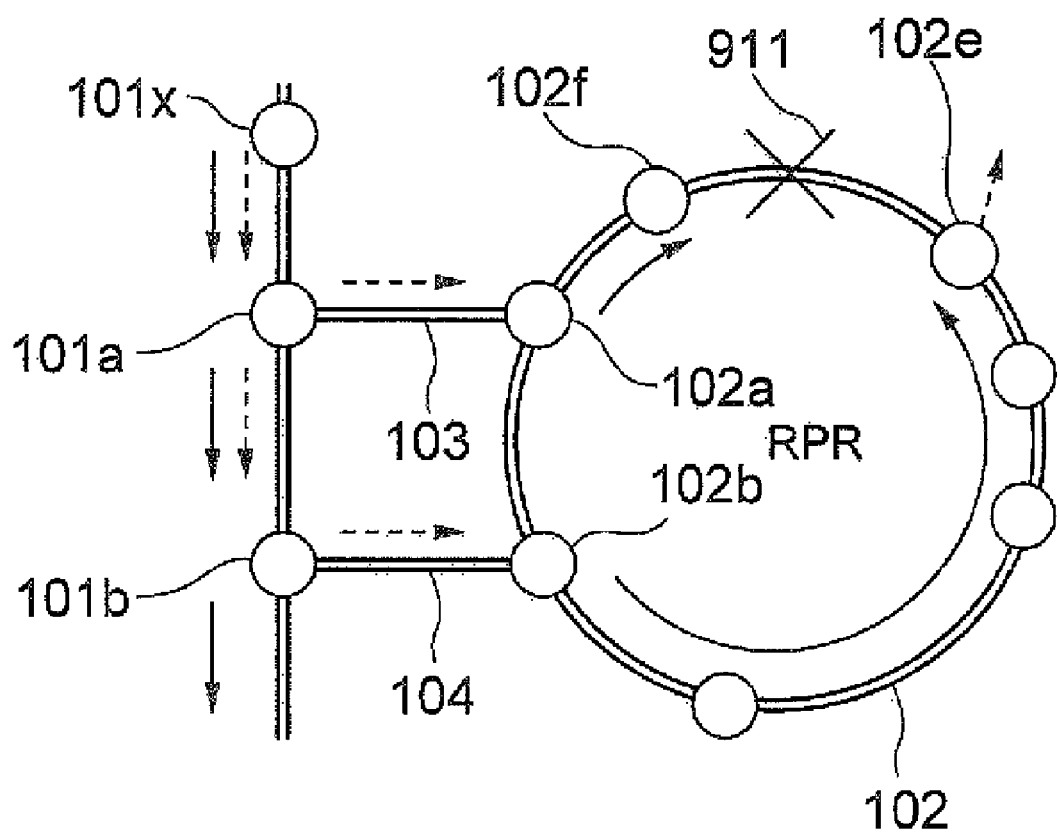
FIG. 33 is an illustration showing an operation when a failure occurs in the other ring in the case where a unicast packet destined for an inter-ring connecting node or an unknown unicast packet is transferred in one ring.

FIG. 33 is an illustration showing an operation when, in the case where a unicast packet destined for an inter-ring connecting node or an unknown unicast packet is transferred in one ring, a failure occurs in the other ring. However, it is assumed that this failure is not a failure in an inter-ring connecting node. For example, the failure is not the one such as the failure 907 shown in FIG. 30. When a failure occurs in a node other than the other inter-ring connecting node or in a link in the ring that it belongs to, each inter-ring connecting node operates as follows. That is, even if a node receives a user data packet in which MAC DA is not a broadcast address from the other ring, it generates an unknown unicast packet without searching for the RPR MAC address corresponding to the MAC DA. Accordingly, Even if it is possible to search for the RPR AMC address successfully and to generate a unicast packet, the node generates an unknown unicast packet. Then, the node selects both of the two ringlets, and performs bidirectional flooding to the unknown unicast packet. At this time, falsification of the address is performed in the same manner as that described above. Even if a failure occurs in a node other than the other inter-ring connecting node or in a link in the ring that it belongs to, the inter-ring connecting node starts protective operation. At this time, information of the failure occurred position is written in the topology management circuit 57 (see FIG. 23). Each inter-ring connecting node confirms the written contents in the topology management circuit 57, and if a failure occurs in a node other than the other inter-ring connecting node or a link, the node performs the operation described above.

Assuming that a failure 911 occurs in a part other than the inter-ring connecting nodes 102a and 102b in the ring 102, the ring 102 autonomously moves to the protective operation, and each node of the ring 102 writes the position where the failure occurred in the topology management circuit 57.

In this state, assuming that the node 101x transmits a unicast packet destined for the node 101a or the node 101b or an unknown unicast packet, the operation of each of the inter-ring connecting nodes 101a and 101b, which receives the RPR packet respectively and transmits the user data packet to the ring 102, is same as that of the normal state (see FIG. 28).

Each of the inter-ring connecting nodes 102a and 102b of the ring 102 receives the user data packet. The packet conversion circuit 61 in each of the inter-ring connecting node 102a and 102b refers to the topology management circuit 57, and when it confirms that a failure has occurred in a part other than the other inter-ring connecting node of the pair of inter-ring connecting nodes, it sets the broadcast address as RPR MAC DA without searching for the RPR MAC address corresponding to the MAC DA of the user data packet to thereby encapsulate the user data packet. In other words, even if it receives a user data packet which makes the node to generate a user data packet in the case in a normal state, the node generates an unknown unicast packet instead of a unicast packet. Further, the ringlet selecting circuit 64 in each of the inter-ring connecting node 102a and 102b refers to the topology management circuit 57, and when it confirms that a failure has occurred in a part other than the other inter-ring connecting node of the pair of inter-ring connecting nodes, it selects both of the two ringlets. Then, each of the inter-ring connecting nodes 102a and 102b transmits the unknown unicast packet to the selected two ringlets (bidirectional flooding). Note that each of the inter-ring connecting nodes 102a and 102b falsifies the RPR MAC SA in the same manner as the normal state. That is, each of the inter-ring connecting nodes 102a and 102b sets the RPR AMC address of the other inter-ring connecting node as the RPR MAC SA. Further, each of the inter-ring connecting nodes 102a and 102b sets TTL such that the unknown unicast packet arrives immediately before the failure occurred position.

The unknown unicast packet transmitted by the inter-ring connecting node 102a in a direction toward the inter-ring connecting node 102b is received by the inter-ring connecting node 102b. The RPR AMC SA of the unknown unicast packet is the RPR AMC address of the node 102b, so the inter-ring connecting node 102b eliminates the packet. Accordingly, the packet will never be transferred beyond the inter-ring connecting node 102b. On the other hand, the unknown unicast packet transmitted by the inter-ring connecting node 102a in a direction opposite to the inter-ring connecting node 102b is transferred up to the node 102f immediately before the failure 911.

Similarly, the unknown unicast packet transmitted by the inter-ring connecting node 102b in a direction of the inter-ring connecting node 102a is received by the inter-ring connecting node 102a. Since the RPR MAC SA of the unknown unicast packet is the RPR MAC address of the node 102a, the inter-ring connecting node 102a eliminates this packet. Accordingly, the packet will never be transferred beyond the inter-ring connecting node 102a. On the other hand, the unknown unicast packet transmitted by the inter-ring connecting node 102b in a direction opposite to the inter-ring connecting node 102*a* is transferred up to the node 102*e* immediately before the failure 911.

Accordingly, it is possible to transfer the packet to a desired destination node while preventing duplicate reception.

Even if a failure of various kinds as shown in FIGS. 29 to 33 occur, there is no need to perform an operation of eliminating the MAC address of a node which has been active from the FDB as the conventional art, so failure recovery can be realized at a high speed.

Note that although an operation of transferring a packet from the ring 101 to the ring 102 is described in FIGS. 29 and 30, an operation of transferring a packet from the ring 102 to the ring 101 is same.

In the third exemplary embodiment, the first transfer unit described in the claims is realized by the outside forwarding circuit 65 and the packet conversion circuit 61. The second transfer unit is realized by the inside forwarding circuit 66 and the packet conversion circuit 62. The source address setting unit is realized by the packet conversion circuit 61 and the RPR AMC SA setting circuit 63. The transmitting direction selecting unit is realized by the ringlet selecting circuit 64. The transmission unit is realized by the multiplexing circuits 53 and 54.

Fourth Exemplary Embodiment

The configuration of a packet ring network system in a fourth exemplary embodiment of the present invention is same as that of the third exemplary embodiment (that is, the configuration exemplary shown in FIG. 1). However, the operations of the inter-ring connecting nodes 101*a*, 101*b*, 102*a* and 102*b* are different in part from those of the third exemplary embodiment.

In the fourth exemplary embodiment, when each of the inter-ring connecting nodes 101*a*, 101*b*, 102*a* and 102*b* transmits a packet, transferred from the other ring where it does not belongs, into the ring where it belongs, the node uses the RPR MAC address of itself as RPR MAC SA. In other words, the node will not falsify the source (RPR MAC SA) as the third exemplary embodiment.

Further, when each of the inter-ring connecting node 101*a*, 101*b*, 102*a* and 102*b* receives an RPR packet in which the RPR AMC address of the other inter-ring connecting node of the pair of inter-ring connecting nodes including itself is the RPR MAC SA, it eliminates the RPR packet from the ring irrespective of the type (broadcast packet, unknown unicast packet, or unicast packet) of the RPR packet. However, when each of the inter-ring connecting nodes 101*a*, 101*b*, 102*a* and 102*b* is in the pass-through transfer mode, it does not eliminate but transfers the RPR packet to the next node even if it is an RPR packet in which RPR MAC SA is the RPR MAC address of the other inter-ring connecting node of the pair of inter-ring connecting nodes including itself. In other words, it prioritizes the operation of the pass-through mode over the operation of eliminating the packet.

Hereinafter, description will be given with a specific example. Assuming that each of the inter-ring connecting nodes 102*a* and 102*b* selects the same ringlet (in this case, the ringlet 120*a* which transfers a packet in a clockwise direction) and transmits a unicast packet or an unknown unicast packet, the inter-ring connecting nodes 102*b* transmits the RPR packet in which RPR MAC SA is the RPR MAC address of itself, and the inter-ring connecting node 102*a* receives the unicast packet of the unknown packet transmitted by the inter-ring connecting node 102*b*. Since the RPR MAC SA of the RPR packet is the RPR AMC address of the inter-ring connecting node 102*b* forming a pair of inter-ring connecting nodes together with the inter-ring connecting node 102*a*, the inter-ring connecting nodes 102*a* eliminates the packet from the ring. On the other hand, the inter-ring connecting node 102*a* transmits a unicast packet or an unknown unicast packet in a direction opposite to the inter-ring connecting node 101*b*. If the inter-ring connecting node 102*a* transmits a unicast packet, the unicast packet is transferred to the destination node. Further, if the inter-ring connecting node 102*a* transmits an unknown unicast packet, the RPR packet goes round the ring 102. Even in this case, it is transferred to the destination node.

As described above, the RPR packet transmitted by the inter-ring connecting node 101*b* is eliminated at the inter-ring connecting node 101*a*, and the RPR packet transmitted by the inter-ring connecting node 101*b* is transferred to the destination node. Accordingly, it is possible to transfer the packet to the desired destination node while preventing duplicate reception, so the effect same as that of the third exemplary embodiment can be achieved.

Further, when an inter-ring connecting node detects a failure in a link linking the rings or an inter-ring connecting node connected via the link, the mode of the inter-ring connecting node is immediately switched to the pass-through transfer mode. It is assumed that one of the two inter-ring connecting nodes on the ring becomes to be in the pass-through transfer mode, and the other one transmits a unicast packet or an unknown unicast packet. If the RPR packet is transmitted in a direction opposite to the inter-ring connecting node in the pass-through transfer mode, the RPR packet can arrive at the desired destination node. Further, assuming that the other inter-ring connecting node transmits the RPR packet to the side of the inter-ring connecting node in the pass-through transfer mode, the inter-ring connecting node in the pass-through transfer mode transfers the RPR packet to the next node. Therefore, even in this case, the RPR packet can arrive at the desired destination node.

The transferring state of the RPR packet as described above is same as that of the third exemplary embodiment. Further, this example shows a case where an inter-ring connecting node transmits a unicast packet or an unknown unicast packet in which the source is itself. The operation that an inter-ring connecting node transmits a broadcast packet, in which the source is itself, is same as that of the second exemplary embodiment, so the description is omitted.

Further, the configuration of an inter-ring connecting node in the fourth exemplary embodiment may be the same configuration as that shown in FIG. 23. However, in the case where transit to the pass-through transfer mode is realized so as to shorten the time taken from failure to recovery, a physical interface interruption detecting circuit same as the physical interface interruption detecting circuit 62 shown in FIG. 3 is also provided. Further, the operation of the forwarding circuits 65 and 66 is different in part from the operation in the third exemplary embodiment. Further, the operation of the RPR MAC SA setting circuit 63 is different from the operation in the third exemplary embodiment.

When each of the forwarding circuits 65 and 66 receives an RPR packet in which RPR MAC SA is the RPR MAC address of the other inter-ring connecting node of the pair of inter-ring connecting nodes including itself, it eliminates the RPR packet. In this case, each of the forwarding circuits 65 and 66 eliminates the RPR packet irrespective of the type of the RPR packet. However, if it is in the pass-through transfer mode, it transfers the transferred RPR packet to the next node.

The RPR MAC SA setting circuit 63 sets the RPR MAC SA of the packet transmitted from the packet conversion circuit

61. In the fourth exemplary embodiment, the RPR MAC setting circuit 63 sets the RPR MAC address of the self node to be the RPR MAC SA.

Note that even in the present exemplary embodiment, if a failure occurs in a part other than inter-ring connecting nodes in the ring to which it belongs, each inter-ring connecting node generates an unknown unicast packet even though the MAC DA of the user data packet shows a prescribed address (that is, even though it is no a broadcast address), and performs bidirectional flooding to the unknown unicast packet, in the same manner as the third exemplary embodiment. The operation of the packet conversion circuit 61 and the operation of the ringlet selecting circuit 64 are same as the operation described in FIG. 33. Further, the transferring state of the unknown unicast packet, to which bidirectional flooding is performed, at this time is same as that shown in FIG. 33, so it is possible to transfer the packet to the desired destination node while preventing duplicate reception.

In the present exemplary embodiment, those other than the aspects described as being different from the aspects of the third exemplary embodiment are same as the third exemplary embodiment. Accordingly, the paths through which packets are transferred and the operations when a failure occurs are same as those of the third exemplary embodiment, and the same effects as those of the third exemplary embodiment can be achieved.

In the fourth exemplary embodiment, the first transfer unit described in the claims is realized by the outside forwarding circuit 65 and the packet conversion circuit 61. The second transfer unit is realized by the inside forwarding circuit 66 and the packet conversion circuit 61. The source address setting unit is realized by the packet conversion unit 61 and the RPR MAC SA setting circuit 63. The transmitting direction selecting unit is realized by the ringlet selecting circuit 64. The transmission unit is realized by the multiplexing circuits 53 and 54. The packet elimination unit is realized by the forwarding circuit 65 and 66.

Fifth Exemplary Embodiment

Figure 34:
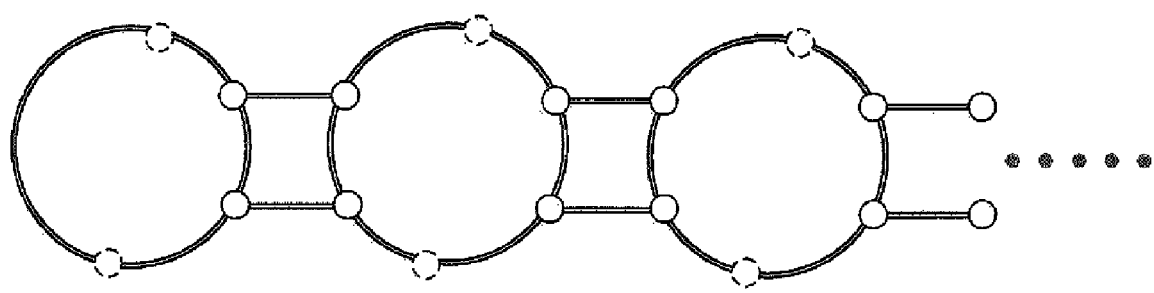
FIG. 34 is an illustration showing an example of a packet ring network system in which three or more rings are connected linearly.

The exemplary embodiments described above show a case where a packet ring network system includes two rings. The number of rings included in a packet ring network system is not limited to two, and it may be three or more. For example, a configuration in which three or more rings are connected linearly, as shown in FIG. 34, is acceptable. However, the rings are connected with a plurality of links (two in this example), same as the first exemplary embodiment. Note that in FIG. 34 and FIGS. 35 and 36 described later, inter-ring connecting nodes are indicated by solid lines and other nodes are indicated by broken lines.

Figure 35:
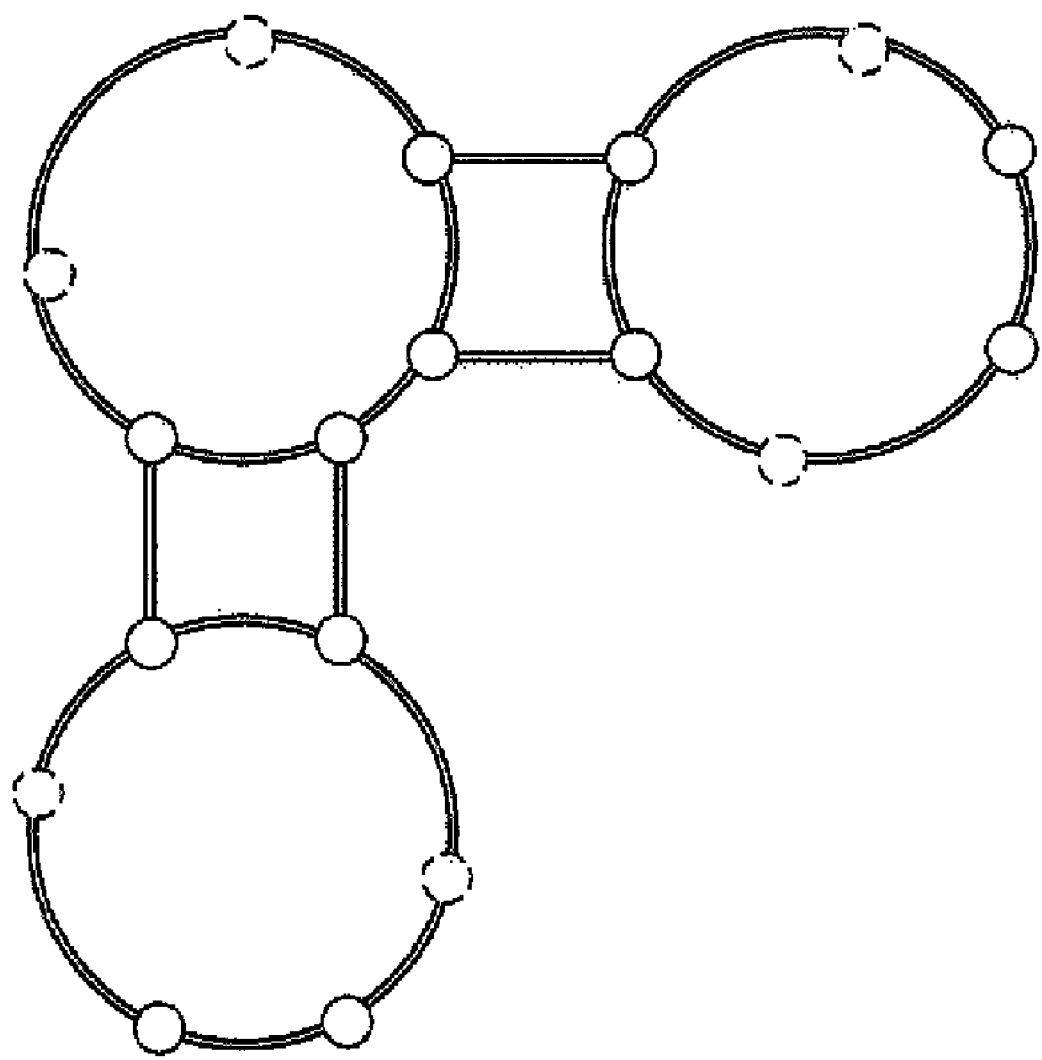
FIG. 35 is an illustration showing a packet ring network system in which a plurality of rings are connected to one ring.

FIG. 35 shows an exemplary configuration in which a plurality of rings (two rings in this example) are connected to one ring. Even in this case, the rings are connected with a plurality of links (two in this example).

Figure 36:
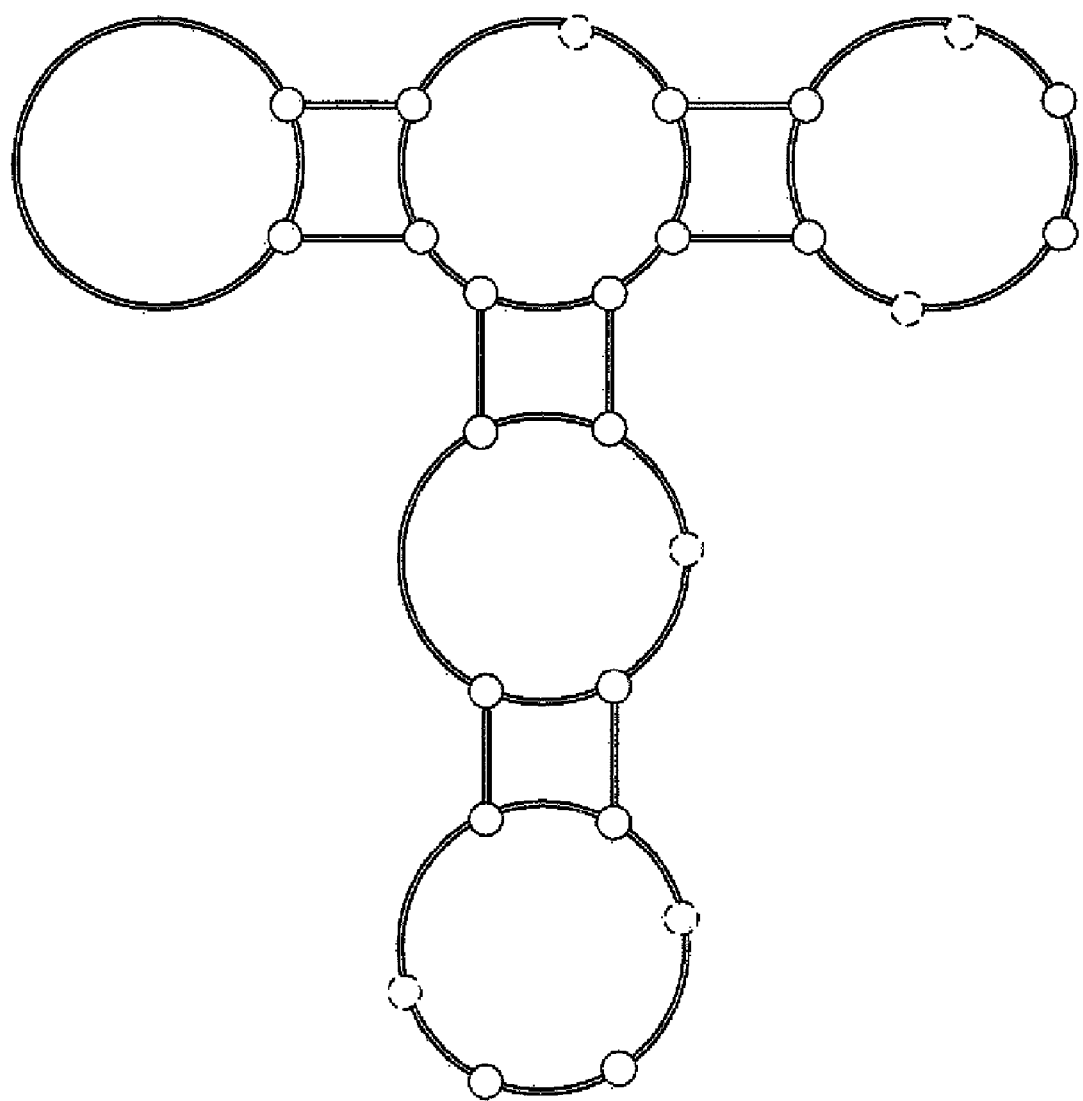
FIG. 36 is an illustration showing an example of a packet ring network system in which a configuration including rings connected linearly and a configuration that a plurality of rings are connected to one ring are combined.
Figure 37:
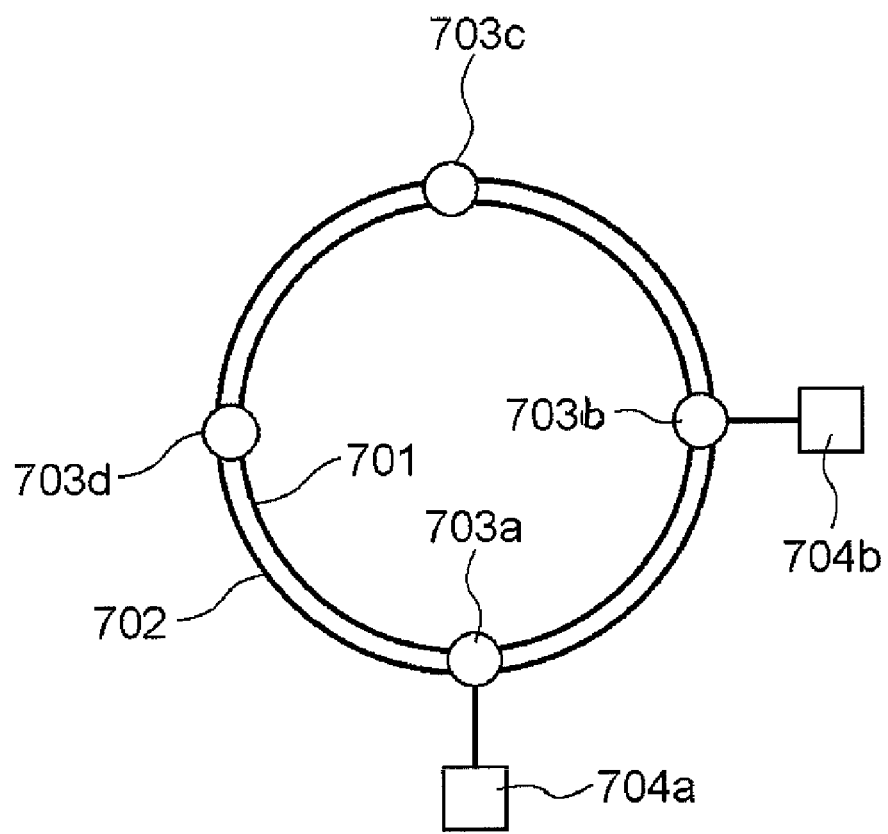
FIG. 37 is an illustration showing an exemplary network configuration of RPR.

Further, as shown in FIG. 36, a configuration including rings connected linearly and a configuration in which a plurality of rings are connected to one ring may be combined.

As shown in FIGS. 34 and 35, even in the case where a packet ring network system includes three or more rings, the operation of each ring which transmits a packet to another ring and the operation of each ring to which a packet is transferred from another ring are same as any of those described in the first to fourth exemplary embodiments.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2005-054301, filed on Feb. 28, 2005, the disclosure of which is incorporated herein in its entirety by reference.

What is claimed is:

1. A packet ring network system comprising a first packet ring and a second packet ring in which the second packet ring includes a plurality of inter-ring connecting nodes and the first packet ring includes a plurality of inter-ring connecting nodes and each of the plurality of inter-ring connecting nodes of the second packet ring is connected with a corresponding node of the plurality of inter-ring connecting nodes of the first packet ring, one node of the inter-ring connecting nodes provided in the second packet ring comprising:

packet transfer circuits that receive a data packet from the first packet ring, encapsulate the data packet to output a broadcast packet and transfer the broadcast packet to the second packet ring;

an address setting circuit that sets an address of another inter-ring connecting node provided in the second packet ring as a source address of the broadcast packet to be transmitted to the second packet ring;

a TTL (Time To Live) setting circuit that sets a predetermined arrival point with respect to the broadcast packet to be transmitted to the second packet ring; and bidirectional broadcast packet transmitting circuits that transmit the broadcast packet, in which the address of the other inter-ring connecting node is set as the source address by the address setting circuit and the arrival point is set by the TTL setting circuit, in a direction to the other inter-ring connecting node and an opposite direction, respectively.

2. The packet ring network system according to claim 1, wherein the one node of the inter-ring connecting nodes provided in the second packet ring further comprises:

a failure detection circuit that detects a failure in an inter-ring connecting node of the first packet ring which is connected with the one inter-ring connecting node of the second packet ring, or a failure in a link with the first packet ring; and pass-through transfer circuits that, when the failure detection circuit detects the failure, transfer a packet transferred from the second packet ring to a next node in the second packet ring; and receiving circuits that receive a packet in which an address of the one inter-ring connecting node is set as a destination address, and also receive a packet in which an address of the other inter-ring connecting node provided in the second packet ring is set as a destination address, wherein the packet transfer circuits transfer data packet included in the packet received by the receiving circuits to the second packet ring.

3. A packet ring network system comprising a first packet ring and a second packet ring in which the second packet ring includes a plurality of inter-ring connecting nodes and the first packet ring includes a plurality of inter-ring connecting nodes and each of the plurality of inter-ring connecting nodes of the second packet ring is connected with a corresponding node of the plurality of inter-ring connecting nodes of the first packet ring, one node of the inter-ring connecting nodes provided in the second packet ring comprising:

packet transfer circuits that receive a data packet from the first packet ring, encapsulate the data packet to output a broadcast packet and transfer the broadcast packet to the second packet ring;

a source address setting circuit that sets an address of the one node of the inter-ring connecting nodes of the second packet ring as a source address of the packet to be transmitted to the second packet ring;

a TTL (Time To Live) setting circuit that sets a predetermined arrival point with respect to the broadcast packet transmitted to the second packet ring;

bidirectional broadcast packet transmitting circuits that transmit the broadcast packet in which the address of the one inter-ring connecting node of the second packet ring is set as the source address by the source address setting circuit and the arrival point is set by the TTL setting circuit in a direction of another inter-ring connecting node provided in the second packet ring and a direction opposite to the other inter-ring connecting node, respectively; and packet elimination circuits that, when a source address of a broadcast packet transferred from the second packet ring is an address of the other inter-ring connecting node, eliminate the transferred broadcast packet from the second packet ring.

4. A packet ring network system comprising a first packet ring and a second packet ring in which the second packet ring includes a plurality of inter-ring connecting nodes and the first packet ring includes a plurality of inter-ring connecting nodes and each of the plurality of inter-ring connecting nodes of the second packet ring is connected with a corresponding node of the plurality of inter-ring connecting nodes of the first packet ring, one node of the inter-ring connecting nodes provided in the second packet ring comprising:

a packet transfer means for receiving a data packet from the first packet ring, for encapsulating the data packet to output a broadcast packet and for transferring the broadcast packet to the second packet ring;

an address falsifying means for setting an address of another inter-ring connecting node provided in the second packet ring as a source address of the broadcast packet to be transmitted to the second packet ring;

an arrival point setting means that sets a predetermined arrival point with respect to the broadcast packet to be transmitted to the second packet ring; and a bidirectional broadcast packet transmitting means that transmits the broadcast packet, in which the address of the other inter-ring connecting node of the second packet ring is set as the source address by the address falsifying means and the arrival point is set by the arrival point setting means, in a direction to the other inter-ring connecting node and an opposite direction, respectively.

5. A packet ring network system comprising a first packet ring and a second packet ring in which the second packet ring includes a plurality of inter-ring connecting nodes and the first packet ring includes a plurality of inter-ring connecting nodes and each of the plurality of inter-ring connecting nodes of the second packet ring is connected with a corresponding node of the plurality of inter-ring connecting nodes of the first packet ring, one node of the inter-ring connecting nodes provided in the second packet ring comprising:

a packet transfer means for receiving a data packet from the first packet ring, for encapsulating the data packet to output a broadcast packet and for transferring the broadcast packet to the second packet ring;

a source address setting means for setting an address of the one node of the inter-ring connecting nodes of the second packet ring as a source address of the packet to be transmitted to the second packet ring;

an arrival point setting means for setting a predetermined arrival point with respect to the broadcast packet transmitted to the second packet ring;

a bidirectional broadcast packet transmitting means for transmitting the broadcast packet in which the address of the one inter-ring connecting node of the second packet ring is set as the source address by the source address setting means and the arrival point is set by the arrival point setting means in a direction to another inter-ring connecting node provided in the second packet ring and an opposite direction, respectively; and a packet elimination means, when a source address of a broadcast packet transferred from the second packet ring is an address of the other inter-ring connecting node, for eliminating the transferred broadcast packet from the second packet ring.

6. A packet transfer method applied to a packet ring network system comprising a first packet ring and a second packet ring in which the second packet ring includes a plurality of inter-ring connecting nodes and the first packet ring includes a plurality of inter-ring connecting nodes and each of the plurality of inter-ring connecting nodes of the second packet ring is connected with a corresponding node of the plurality of inter-ring connecting nodes of the first packet ring, the method being performed by one node of the inter-ring connecting nodes provided in the second packet ring and comprising:

receiving a data packet from the first packet ring and encapsulating the data packet to output a broadcast packet;

transferring the broadcast packet to the second packet ring;

setting an address of another inter-ring connecting node provided in the second packet ring as a source address of the broadcast packet to be transmitted to the second packet ring;

setting a predetermined arrival point with respect to the broadcast packet to be transmitted to the second packet ring; and transmitting the broadcast packet, in which the address of the other inter-ring connecting node is set as the source address and the arrival point is set, in a direction to the other inter-ring connecting node and an opposite direction, respectively.

7. The packet transfer method, according to claim 6, further comprising;

detecting a failure in an inter-ring connecting node of the first packet ring which is connected with the one inter-ring connecting node of the second packet ring, or a failure in a link with the first packet ring;

when the failure is detected, transferring a packet transferred from the second packet ring to a next node in the second packet ring;

receiving a packet in which an address of the one inter-ring connecting node is set as a destination address, and also receives a packet in which an address of the other inter-ring connecting node provided in the second packet ring is set as a destination address; and transferring data packet included in the received packet to the second packet ring.

8. A packet transfer method applied to a packet ring network system comprising a first packet ring and a second packet ring in which the second packet ring includes a plurality of inter-ring connecting nodes and the first packet ring includes a plurality of inter-ring connecting nodes and each of the plurality of inter-ring connecting nodes of the second packet ring is connected with a corresponding node of the plurality of inter-ring connecting nodes of the first packet ring, the method being performed by one node of the inter-ring connecting nodes provided in the second packet ring and comprising:

receiving a data packet from the first packet ring and encapsulating the data packet to output a broadcast packet;

transferring the broadcast packet to the second packet ring;

setting an address of the one node of the inter-ring connecting nodes of the second packet ring as a source address of the packet to be transmitted to the second packet ring;

setting a predetermined arrival point with respect to the broadcast packet to be transmitted to the second packet ring;

transmitting the broadcast packet, in which the address of the one node of the inter-ring connecting nodes of the second packet ring is set as the source address and the arrival point is set, in a direction to another inter-ring connecting node provided in the second packet ring and an opposite direction, respectively; and if a source address of a broadcast packet transferred from the second packet ring is the address of the other inter-ring connecting node, eliminating the transferred broadcast packet from the second ring.

9. An inter-ring connecting node applied to a packet ring network system comprising a first packet ring and a second packet ring in which the second packet ring includes a plurality of inter-ring connecting nodes and the first packet ring includes a plurality of inter-ring connecting nodes and each of the plurality of inter-ring connecting nodes of the second packet ring is connected with a corresponding node of the plurality of inter-ring connecting nodes of the first packet ring, the node being one node of the plurality of inter-ring connecting nodes of the second packet ring and comprising:

packet transfer circuits that receive a data packet from the first packet ring, encapsulate the data packet to output a broadcast packet and transfer the broadcast packet to the second packet ring;

an address setting circuit that sets an address of another inter-ring connecting node provided in the second packet ring as a source address of the broadcast packet to be transmitted to the second packet ring;

a TTL (Time To Live) setting circuit that sets a predetermined arrival point with respect to the broadcast packet to be transmitted to the second packet ring; and bidirectional broadcast packet transmitting circuits that transmit the broadcast packet, in which the address of the other inter-ring connecting node is set as the source address by the address setting circuit and the arrival point is set by the TTL setting circuit, in a direction to the other inter-ring connecting node and an opposite direction, respectively.

10. The inter-ring connecting node according to claim 9, further comprising:

a failure detection circuit that detects a failure in an inter-ring connecting node of the first packet ring which is connected with the one inter-ring connecting node of the second packet ring, or a failure in a link with the first packet ring; and pass-through transfer circuits that, when the failure detection circuit detects the failure, transfer a packet transferred from the second packet ring to a next node in the second packet ring; and receiving circuits that receive a packet in which an address of the one inter-ring connecting node is set as a destination address, and also receive a packet in which an address of the other inter-ring connecting node provided in the second packet ring is set as a destination address, wherein the packet transfer circuits transfer data packet included in the packet received by the receiving circuits to the second packet ring.

11. An inter-ring connecting node applied to a packet ring network system comprising a first packet ring and a second packet ring in which the second packet ring includes a plurality of inter-ring connecting nodes and the first packet ring includes a plurality of inter-ring connecting nodes and each of the plurality of inter-ring connecting nodes of the second packet ring is connected with a corresponding node of the plurality of inter-ring connecting nodes of the first packet ring, the node being one node of the plurality of inter-ring connecting nodes of the second packet ring and comprising:

packet transfer circuits that receive a data packet from the first packet ring, encapsulate the data packet to output a broadcast packet and transfer the broadcast packet to the second packet ring;

a source address setting circuit that sets an address of the one node of the inter-ring connecting nodes of the second packet ring as a source address of the packet to be transmitted to the second packet ring;

a TTL (Time To Live) setting circuit that sets a predetermined arrival point with respect to the broadcast packet transmitted to the second packet ring;

bidirectional broadcast packet transmitting circuits that transmit the broadcast packet in which the address of the one inter-ring connecting node of the second packet ring is set as the source address by the source address setting circuit and the arrival point is set by the TTL setting circuit in a direction of another inter-ring connecting node provided in the second packet ring and a direction opposite to the other inter-ring connecting node, respectively; and packet elimination circuits that, when a source address of a broadcast packet transferred from the second packet ring is an address of the other inter-ring connecting node, eliminate the transferred broadcast packet from the second packet ring.

12. An inter-ring connecting node applied to a packet ring network system comprising a first packet ring and a second packet ring in which the second packet ring includes a plurality of inter-ring connecting nodes and the first packet ring includes a plurality of inter-ring connecting nodes and each of the plurality of inter-ring connecting nodes of the second packet ring is connected with a corresponding node of the plurality of inter-ring connecting nodes of the first packet ring, the node being one node of the plurality of inter-ring connecting nodes of the second packet ring and comprising:

a packet transfer means for receiving a data packet from the first packet ring, for encapsulating the data packet to output a broadcast packet and for transferring the broadcast packet to the second packet ring;

an address falsifying means for setting an address of another inter-ring connecting node provided in the second packet ring as a source address of the broadcast packet to be transmitted to the second packet ring;

an arrival point setting means that sets a predetermined arrival point with respect to the broadcast packet to be transmitted to the second packet ring; and a bidirectional broadcast packet transmitting means that transmits the broadcast packet, in which the address of the other inter-ring connecting node of the second packet ring is set as the source address by the address falsifying means and the arrival point is set by the arrival point setting means, in a direction to the other inter-ring connecting node and an opposite direction, respectively.

13. An inter-ring connecting node applied to a packet ring network system comprising a first packet ring and a second packet ring in which the second packet ring includes a plurality of inter-ring connecting nodes and the first packet ring includes a plurality of inter-ring connecting nodes and each of the plurality of inter-ring connecting nodes of the second packet ring is connected with a corresponding node of the plurality of inter-ring connecting nodes of the first packet ring, the node being one node of the plurality of inter-ring connecting nodes of the second packet ring and comprising:

a packet transfer means for receiving a data packet from the first packet ring, for encapsulating the data packet to output a broadcast packet and for transferring the broadcast packet to the second packet ring;

a source address setting means for setting an address of the one node of the inter-ring connecting nodes of the second packet ring as a source address of the packet to be transmitted to the second packet ring;

an arrival point setting means for setting a predetermined arrival point with respect to the broadcast packet transmitted to the second packet ring;

a bidirectional broadcast packet transmitting means for transmitting the broadcast packet in which the address of the one inter-ring connecting node of the second packet ring is set as the source address by the source address setting means and the arrival point is set by the arrival point setting means in a direction to another inter-ring connecting node provided in the second packet ring and an opposite direction, respectively; and a packet elimination means, when a source address of a broadcast packet transferred from the second packet ring is an address of the other inter-ring connecting node, for eliminating the transferred broadcast packet from the second packet ring.

* * * * *

UNITED STATES PATENT AND TRADEMARK OFFICE
CERTIFICATE OF CORRECTION

PATENT NO.         : 7,848,340 B2                                             Page 1 of 1
APPLICATION NO.    : 11/816149
DATED              : December 7, 2010
INVENTOR(S)        : Masahiro Sakauchi, Daisaku Ogasahara and Kazuo Takagi It is certified that error appears in the above-identified patent and that said Letters Patent is hereby corrected as shown below:

The Title Item [54] should read:
PACKET RING NETWORK SYSTEM, METHOD FOR CONNECTING PACKET RINGS,
AND INTER-RING CONNECTION NODE Signed and Sealed this
Seventeenth Day of May, 2011

David J. Kappos
*Director of the United States Patent and Trademark Office*

UNITED STATES PATENT AND TRADEMARK OFFICE
CERTIFICATE OF CORRECTION

PATENT NO. : 7,848,340 B2
APPLICATION NO. : 11/816149
DATED : December 7, 2010
INVENTOR(S) : Masahiro Sakauchi, Daisaku Ogasahara and Kazuo Takagi It is certified that error appears in the above-identified patent and that said Letters Patent is hereby corrected as shown below:

Title Page, Item (54) and at Column 1, lines 1-3, title should read:
PACKET RING NETWORK SYSTEM, METHOD FOR CONNECTING PACKET RINGS,
AND INTER-RING CONNECTION NODE This certificate supersedes the Certificate of Correction issued May 17, 2011.

Signed and Sealed this
Twenty-first Day of June, 2011

David J. Kappos
*Director of the United States Patent and Trademark Office*